US012586126B2

(12) United States Patent (10) Patent No.: US 12,586,126 B2

Cornell, III et al. (45) Date of Patent: Mar. 24, 2026

(54) METHODS AND APPARATUSES FOR GENERATING A NEW CREDIT FILE AND ADDING TRADELINES

(71) Applicant: ConsumerInfo.com, Inc., Costa Mesa, CA (US)

(72) Inventors: John Haviland Cornell, III, Laguna Beach, CA (US); Aaron Jordan Kline, San Diego, CA (US); Jazmin Adriana Quezada, Santa Ana, CA (US); Lucy Okamuro, Costa Mesa, CA (US); Christopher Brian Orchid, Irvine, CA (US); Debbie Hsu, Irvine, CA (US); Michelle Felice-Steele, Woodland Hills, CA (US); Matt Nobar, Irvine, CA (US)

(73) Assignee: ConsumerInfo.com, Inc., Costa Mesa, CA (US)

( * ) Notice: Subject to any disclaimer, the term of this patent is extended or adjusted under 35 U.S.C. 154(b) by 0 days.

(21) Appl. No.: 18/051,846

(22) Filed: Nov. 1, 2022

(65) Prior Publication Data

US 2023/0140214 A1     May 4, 2023

Related U.S. Application Data

(60) Provisional application No. 63/302,479, filed on Jan. 24, 2022, provisional application No. 63/263,499, filed on Nov. 3, 2021.

(51) Int. Cl.
 *G06Q 40/00*        (2023.01)
 *G06Q 40/03*        (2023.01)
(52) U.S. Cl.
 CPC ................................... *G06Q 40/03* (2023.01)

(58) Field of Classification Search
 CPC ...................................................... G06Q 40/03
 See application file for complete search history.

(56)                References Cited

U.S. PATENT DOCUMENTS 3,316,395 A     4/1967  Lavin et al.
4,346,442 A     8/1982  Musmanno
                (Continued)

FOREIGN PATENT DOCUMENTS

CN         101452555        6/2009
CN         102096886        6/2011
                (Continued)

OTHER PUBLICATIONS

Sanction Scanner (https://www.sanctionscanner.com/blog/6-identity-verification-methods-272, p. 1, second paragraph, Nov. 12, 2020) (Year: 2020).*

(Continued)

*Primary Examiner* — Mark H Gaw

(74) *Attorney, Agent, or Firm* — KNOBBE, MARTENS, OLSON & BEAR, LLP

(57)                ABSTRACT

The present disclosure describes systems and methods for providing new credit files for individuals without a credit file by generating header information and assigning a personal identifier (or PIN) for the newly created header file without any negative impacts on the new credit file (such as a credit inquiry). The credit system can recommend the addition of new tradelines, such as through review of transaction data from financial institutions to identify a new tradeline, or recommending new credit cards curated for individuals with new credit files. The credit system can infer an open date for a new tradeline found in the transaction data by identifying the earliest transaction date for the set of transactions that correspond to a particular category.

20 Claims, 14 Drawing Sheets

(56) References Cited

U.S. PATENT DOCUMENTS

| | | | |
|---|---|---|---|
| 4,491,725 A | 1/1985 | Pritchard | |
| 4,774,664 A | 9/1988 | Campbell et al. | |
| 4,812,628 A | 3/1989 | Boston et al. | |
| 4,872,113 A | 10/1989 | Dinerstein | |
| 4,891,503 A | 1/1990 | Jewell | |
| 4,947,028 A | 8/1990 | Gorog | |
| 5,239,462 A | 8/1993 | Jones et al. | |
| 5,274,547 A | 12/1993 | Zoffel et al. | |
| 5,301,105 A | 4/1994 | Cummings, Jr. | |
| 5,500,513 A | 3/1996 | Langhans et al. | |
| 5,557,514 A | 9/1996 | Seare et al. | |
| 5,583,760 A | 12/1996 | Klesse | |
| 5,590,038 A | 12/1996 | Pitroda | |
| 5,611,052 A | 3/1997 | Dykstra et al. | |
| 5,640,577 A | 6/1997 | Scharmer | |
| 5,644,778 A | 7/1997 | Burks et al. | |
| 5,649,114 A | 7/1997 | Deaton et al. | |
| 5,659,725 A | 8/1997 | Levy et al. | |
| 5,696,907 A | 12/1997 | Tom | |
| 5,699,527 A | 12/1997 | Davidson | |
| 5,704,044 A | 12/1997 | Tarter et al. | |
| 5,739,512 A | 4/1998 | Tognazzini | |
| 5,754,632 A | 5/1998 | Smith | |
| 5,754,939 A | 5/1998 | Herz et al. | |
| 5,764,923 A | 6/1998 | Tallman et al. | |
| 5,774,883 A | 6/1998 | Andersen | |
| 5,819,291 A | 10/1998 | Haimowitz et al. | |
| 5,822,410 A | 10/1998 | McCausland et al. | |
| 5,828,837 A | 10/1998 | Eikland | |
| 5,832,068 A | 11/1998 | Smith | |
| 5,832,447 A | 11/1998 | Rieker et al. | |
| 5,842,211 A | 11/1998 | Horadan et al. | |
| 5,844,218 A | 12/1998 | Kawan et al. | |
| 5,870,721 A | 2/1999 | Norris | |
| 5,878,403 A | 3/1999 | DeFrancesco | |
| 5,884,287 A | 3/1999 | Edesess | |
| 5,903,830 A | 5/1999 | Joao et al. | |
| 5,903,881 A | 5/1999 | Schrader et al. | |
| 5,907,828 A | 5/1999 | Meyer et al. | |
| 5,924,082 A | 7/1999 | Silverman et al. | |
| 5,926,800 A | 7/1999 | Baronowski et al. | |
| 5,930,759 A | 7/1999 | Moore et al. | |
| 5,930,776 A | 7/1999 | Dykstra et al. | |
| 5,933,809 A | 8/1999 | Hunt et al. | |
| 5,940,812 A | 8/1999 | Tengel et al. | |
| 5,950,179 A | 9/1999 | Buchanan et al. | |
| 5,956,693 A | 9/1999 | Geerlings | |
| 5,960,430 A | 9/1999 | Haimowitz et al. | |
| 5,961,593 A | 10/1999 | Gabber et al. | |
| 5,966,699 A | 10/1999 | Zandi | |
| 5,970,478 A | 10/1999 | Walker et al. | |
| 5,978,780 A | 11/1999 | Watson | |
| 5,995,947 A | 11/1999 | Fraser et al. | |
| 5,999,596 A | 12/1999 | Walker et al. | |
| 6,006,333 A | 12/1999 | Nielsen | |
| 6,014,632 A | 1/2000 | Gamble et al. | |
| 6,018,723 A | 1/2000 | Siegel et al. | |
| 6,021,397 A | 2/2000 | Jones et al. | |
| 6,029,149 A | 2/2000 | Dykstra et al. | |
| 6,038,551 A | 3/2000 | Barlow et al. | |
| 6,044,351 A | 3/2000 | Jones | |
| 6,044,352 A | 3/2000 | Deavers | |
| 6,067,522 A | 5/2000 | Warady et al. | |
| 6,070,241 A | 5/2000 | Edwards et al. | |
| 6,073,104 A | 6/2000 | Field | |
| 6,073,106 A | 6/2000 | Rozen et al. | |
| 6,073,140 A | 6/2000 | Morgan et al. | |
| 6,088,686 A | 7/2000 | Walker et al. | |
| 6,098,052 A | 8/2000 | Kosiba et al. | |
| 6,108,641 A | 8/2000 | Kenna et al. | |
| 6,119,103 A | 9/2000 | Basch et al. | |
| 6,128,602 A | 10/2000 | Northington et al. | |
| 6,129,273 A | 10/2000 | Shah | |
| 6,144,948 A | 11/2000 | Walker et al. | |
| 6,154,729 A | 11/2000 | Cannon et al. | |
| 6,157,707 A | 12/2000 | Baulier et al. | |
| 6,163,770 A | 12/2000 | Gamble et al. | |
| 6,171,112 B1 | 1/2001 | Clark et al. | |
| 6,182,229 B1 | 1/2001 | Nielsen | |
| 6,185,543 B1 | 2/2001 | Galperin et al. | |
| 6,208,973 B1 | 3/2001 | Boyer et al. | |
| 6,233,566 B1 | 5/2001 | Levine et al. | |
| 6,253,202 B1 | 6/2001 | Gilmour | |
| 6,253,203 B1 | 6/2001 | O'Flaherty et al. | |
| 6,263,447 B1 | 7/2001 | French et al. | |
| 6,269,369 B1 | 7/2001 | Robertson | |
| 6,275,824 B1 | 8/2001 | O'Flaherty et al. | |
| 6,282,658 B2 | 8/2001 | French et al. | |
| 6,298,348 B1 | 10/2001 | Eldering | |
| 6,304,860 B1 | 10/2001 | Martin et al. | |
| 6,311,169 B2 | 10/2001 | Duhon | |
| 6,321,205 B1 | 11/2001 | Eder | |
| 6,321,339 B1 | 11/2001 | French et al. | |
| 6,343,279 B1 | 1/2002 | Bissonette et al. | |
| 6,374,229 B1 | 4/2002 | Lowrey et al. | |
| 6,374,230 B1 | 4/2002 | Walker et al. | |
| 6,384,844 B1 | 5/2002 | Stewart et al. | |
| 6,385,594 B1 | 5/2002 | Lebda et al. | |
| 6,393,406 B1 | 5/2002 | Eder | |
| 6,397,197 B1 | 5/2002 | Gindlesperger | |
| 6,397,224 B1 | 5/2002 | Zubeldia et al. | |
| 6,405,181 B2 | 6/2002 | Lent et al. | |
| 6,424,878 B1 | 7/2002 | Barker et al. | |
| 6,453,297 B1 | 9/2002 | Burks et al. | |
| 6,456,983 B1 | 9/2002 | Keyes et al. | |
| 6,463,533 B1 | 10/2002 | Calamera et al. | |
| 6,496,827 B2 | 12/2002 | Kozam et al. | |
| 6,496,936 B1 | 12/2002 | French et al. | |
| 6,513,018 B1 | 1/2003 | Culhane | |
| 6,523,021 B1 | 2/2003 | Monberg et al. | |
| 6,523,041 B1 | 2/2003 | Morgan et al. | |
| 6,532,450 B1 | 3/2003 | Brown et al. | |
| 6,543,683 B2 | 4/2003 | Hoffman | |
| 6,564,210 B1 | 5/2003 | Korda et al. | |
| 6,581,059 B1 | 6/2003 | Barrett et al. | |
| 6,587,841 B1 | 7/2003 | DeFrancesco | |
| 6,598,030 B1 | 7/2003 | Siegel et al. | |
| 6,601,173 B1 | 7/2003 | Mohler | |
| 6,611,816 B2 | 8/2003 | Lebda et al. | |
| 6,622,131 B1 | 9/2003 | Brown et al. | |
| 6,629,245 B1 | 9/2003 | Stone et al. | |
| 6,647,383 B1 | 11/2003 | August et al. | |
| 6,658,393 B1 | 12/2003 | Basch et al. | |
| 6,684,093 B2 | 1/2004 | Kuth | |
| 6,714,944 B1 | 3/2004 | Shapiro et al. | |
| 6,734,886 B1 | 5/2004 | Hagan et al. | |
| 6,750,985 B2 | 6/2004 | Rhoads | |
| 6,754,665 B1 | 6/2004 | Futagami et al. | |
| 6,766,327 B2 | 7/2004 | Morgan, Jr. et al. | |
| 6,766,946 B2 | 7/2004 | Iida et al. | |
| 6,795,812 B1 | 9/2004 | Lent et al. | |
| 6,804,346 B1 | 10/2004 | Mewhinney | |
| 6,805,287 B2 | 10/2004 | Bishop et al. | |
| 6,807,533 B1 | 10/2004 | Land et al. | |
| 6,823,319 B1 | 11/2004 | Lynch et al. | |
| 6,826,535 B2 | 11/2004 | Wood et al. | |
| 6,845,448 B1 | 1/2005 | Chaganti et al. | |
| 6,847,942 B1 | 1/2005 | Land et al. | |
| 6,857,073 B2 | 2/2005 | French et al. | |
| 6,873,972 B1 | 3/2005 | Marcial et al. | |
| 6,901,406 B2 | 5/2005 | Nabe et al. | |
| 6,910,624 B1 | 6/2005 | Natsuno | |
| 6,934,714 B2 | 8/2005 | Meinig | |
| 6,950,807 B2 | 9/2005 | Brock | |
| 6,950,858 B2 | 9/2005 | Ogami | |
| 6,954,757 B2 | 10/2005 | Zargham et al. | |
| 6,968,319 B1 | 11/2005 | Remington et al. | |
| 6,983,379 B1 | 1/2006 | Spalink et al. | |
| 6,985,887 B1 | 1/2006 | Sunstein et al. | |
| 6,988,085 B2 | 1/2006 | Hedy | |
| 6,999,941 B1 | 2/2006 | Agarwal | |
| 7,003,491 B2 | 2/2006 | Starkman | |
| 7,028,052 B2 | 4/2006 | Chapman et al. | |
| 7,039,607 B2 | 5/2006 | Watarai et al. | |

(56) References Cited

U.S. PATENT DOCUMENTS

| | | | |
|---|---|---|---|
| 7,058,817 B1 | 6/2006 | Ellmore |
| 7,065,566 B2 | 6/2006 | Menard et al. |
| 7,069,240 B2 | 6/2006 | Spero et al. |
| 7,069,249 B2 | 6/2006 | Stolfo et al. |
| 7,072,842 B2 | 7/2006 | Provost et al. |
| 7,076,462 B1 | 7/2006 | Nelson et al. |
| 7,107,241 B1 | 9/2006 | Pinto |
| 7,117,172 B1 | 10/2006 | Black |
| 7,124,144 B2 | 10/2006 | Christianson et al. |
| 7,133,840 B1 | 11/2006 | Kenna et al. |
| 7,133,935 B2 | 11/2006 | Hedy |
| 7,171,371 B2 | 1/2007 | Goldstein |
| 7,174,302 B2 | 2/2007 | Patricelli et al. |
| 7,181,427 B1 | 2/2007 | DeFrancesco |
| 7,188,169 B2 | 3/2007 | Buus et al. |
| 7,191,150 B1 | 3/2007 | Shao et al. |
| 7,191,451 B2 | 3/2007 | Nakagawa |
| 7,197,468 B1 | 3/2007 | Patricelli et al. |
| 7,206,768 B1 | 4/2007 | deGroeve et al. |
| 7,212,995 B2 | 5/2007 | Schulkins |
| 7,234,156 B2 | 6/2007 | French et al. |
| 7,234,160 B2 | 6/2007 | Vogel et al. |
| 7,236,950 B2 | 6/2007 | Savage et al. |
| 7,240,363 B1 | 7/2007 | Ellingson |
| 7,246,067 B2 | 7/2007 | Austin et al. |
| 7,246,068 B2 | 7/2007 | Thomas, Jr. |
| 7,249,076 B1 | 7/2007 | Pendleton et al. |
| 7,249,096 B1 | 7/2007 | Lasater et al. |
| 7,249,113 B1 | 7/2007 | Continelli et al. |
| 7,251,625 B2 | 7/2007 | Anglum |
| 7,263,497 B1 | 8/2007 | Wiser et al. |
| 7,277,869 B2 | 10/2007 | Starkman |
| 7,280,980 B1 | 10/2007 | Hoadley et al. |
| 7,281,652 B2 | 10/2007 | Foss |
| 7,289,971 B1 | 10/2007 | O'Neil et al. |
| 7,295,988 B1 | 11/2007 | Reeves |
| 7,298,872 B2 | 11/2007 | Glisson |
| 7,302,420 B2 | 11/2007 | Aggarwal et al. |
| 7,305,359 B2 | 12/2007 | Bonnell |
| 7,310,617 B1 | 12/2007 | Cunningham |
| 7,313,538 B2 | 12/2007 | Wilmes et al. |
| 7,328,276 B2 | 2/2008 | Alisuag |
| 7,333,937 B2 | 2/2008 | Baldwin, Jr. et al. |
| 7,340,424 B2 | 3/2008 | Gang et al. |
| 7,340,434 B2 | 3/2008 | Schnall |
| 7,343,295 B2 | 3/2008 | Pomerance |
| 7,346,576 B2 | 3/2008 | Lent et al. |
| 7,356,506 B2 | 4/2008 | Watson et al. |
| 7,356,516 B2 | 4/2008 | Richey et al. |
| 7,366,694 B2 | 4/2008 | Lazerson |
| 7,370,044 B2 | 5/2008 | Mulhern et al. |
| 7,376,603 B1 * | 5/2008 | Mayr ................. G06Q 30/0202 |
| | | 705/35 |
| 7,379,913 B2 | 5/2008 | Steele et al. |
| 7,380,707 B1 | 6/2008 | Fredman |
| 7,383,988 B2 | 6/2008 | Slonecker, Jr. |
| 7,392,216 B1 | 6/2008 | Palmgren et al. |
| 7,395,273 B2 | 7/2008 | Khan et al. |
| 7,403,923 B2 | 7/2008 | Elliott et al. |
| 7,403,942 B1 | 7/2008 | Bayliss |
| 7,409,369 B1 | 8/2008 | Homuth et al. |
| 7,433,864 B2 | 10/2008 | Malik |
| 7,451,113 B1 | 11/2008 | Kasower |
| 7,460,857 B2 | 12/2008 | Roach, Jr. |
| 7,467,401 B2 | 12/2008 | Cicchitto |
| 7,478,157 B2 | 1/2009 | Bohrer et al. |
| 7,479,949 B2 | 1/2009 | Jobs et al. |
| 7,490,356 B2 | 2/2009 | Lieblich et al. |
| 7,505,939 B2 | 3/2009 | Lent et al. |
| 7,527,967 B2 | 5/2009 | Chao et al. |
| 7,529,698 B2 | 5/2009 | Joao |
| 7,536,329 B2 | 5/2009 | Goldberg et al. |
| 7,536,346 B2 | 5/2009 | Aliffi et al. |
| 7,536,348 B2 | 5/2009 | Shao et al. |
| 7,542,993 B2 | 6/2009 | Satterfield et al. |
| 7,543,739 B2 | 6/2009 | Brown et al. |
| 7,546,271 B1 | 6/2009 | Chmielewski et al. |
| 7,552,080 B1 | 6/2009 | Willard et al. |
| 7,552,086 B1 | 6/2009 | Rajasekar et al. |
| 7,556,192 B2 | 7/2009 | Wokaty, Jr. |
| 7,559,217 B2 | 7/2009 | Bass |
| 7,562,184 B2 | 7/2009 | Henmi et al. |
| 7,562,814 B1 | 7/2009 | Shao et al. |
| 7,571,138 B2 | 8/2009 | Miri et al. |
| 7,580,884 B2 | 8/2009 | Cook |
| 7,584,127 B2 | 9/2009 | Byrne et al. |
| 7,584,146 B1 | 9/2009 | Duhon |
| 7,587,366 B2 | 9/2009 | Grim, III et al. |
| 7,593,889 B2 | 9/2009 | Raines et al. |
| 7,593,891 B2 | 9/2009 | Kornegay et al. |
| 7,603,317 B2 | 10/2009 | Adler et al. |
| 7,603,701 B2 | 10/2009 | Gaucas |
| 7,606,725 B2 | 10/2009 | Robertson et al. |
| 7,610,229 B1 | 10/2009 | Kornegay |
| 7,617,116 B2 | 11/2009 | Amar et al. |
| 7,630,932 B2 | 12/2009 | Danaher et al. |
| 7,630,933 B2 | 12/2009 | Peterson et al. |
| 7,640,200 B2 | 12/2009 | Gardner et al. |
| 7,647,274 B2 | 1/2010 | Peterson et al. |
| 7,647,344 B2 | 1/2010 | Skurtovich, Jr. et al. |
| 7,653,592 B1 | 1/2010 | Flaxman et al. |
| 7,672,833 B2 | 3/2010 | Blume et al. |
| 7,676,410 B2 | 3/2010 | Petralia |
| 7,676,418 B1 | 3/2010 | Chung et al. |
| 7,689,505 B2 | 3/2010 | Kasower |
| 7,689,506 B2 | 3/2010 | Fei et al. |
| 7,690,032 B1 | 3/2010 | Peirce |
| 7,693,787 B2 | 4/2010 | Provinse |
| 7,698,214 B1 | 4/2010 | Lindgren |
| 7,698,217 B1 | 4/2010 | Phillips et al. |
| 7,698,445 B2 | 4/2010 | Fitzpatrick et al. |
| 7,707,102 B2 | 4/2010 | Rothstein |
| 7,711,635 B2 | 5/2010 | Steele et al. |
| 7,711,636 B2 | 5/2010 | Robida et al. |
| 7,720,750 B2 | 5/2010 | Brody |
| 7,725,385 B2 | 5/2010 | Royer et al. |
| 7,729,959 B1 | 6/2010 | Wells et al. |
| 7,734,522 B2 | 6/2010 | Johnson et al. |
| 7,739,139 B2 | 6/2010 | Robertson et al. |
| 7,747,559 B2 | 6/2010 | Leitner et al. |
| 7,752,132 B2 | 7/2010 | Stewart et al. |
| 7,756,789 B2 | 7/2010 | Welker et al. |
| 7,765,311 B2 | 7/2010 | Itabashi et al. |
| 7,769,696 B2 | 8/2010 | Yoda |
| 7,769,998 B2 | 8/2010 | Lynch et al. |
| 7,774,257 B2 | 8/2010 | Maggioncalda et al. |
| 7,774,270 B1 | 8/2010 | MacCloskey |
| 7,783,515 B1 | 8/2010 | Kumar et al. |
| 7,783,562 B1 | 8/2010 | Ellis |
| 7,792,715 B1 | 9/2010 | Kasower |
| 7,797,725 B2 | 9/2010 | Lunt et al. |
| 7,801,807 B2 | 9/2010 | DeFrancesco et al. |
| 7,801,828 B2 | 9/2010 | Candella et al. |
| 7,805,345 B2 | 9/2010 | Abrahams et al. |
| 7,814,004 B2 | 10/2010 | Haggerty et al. |
| 7,814,005 B2 | 10/2010 | Imrey et al. |
| 7,818,228 B1 | 10/2010 | Coulter |
| 7,818,229 B2 | 10/2010 | Imrey et al. |
| 7,832,006 B2 | 11/2010 | Chen et al. |
| 7,835,983 B2 | 11/2010 | Lefner et al. |
| 7,836,111 B1 | 11/2010 | Shan |
| 7,840,484 B2 | 11/2010 | Haggerty et al. |
| 7,841,008 B1 | 11/2010 | Cole et al. |
| 7,848,972 B1 | 12/2010 | Sharma |
| 7,848,978 B2 | 12/2010 | Imrey et al. |
| 7,849,004 B2 | 12/2010 | Choudhuri et al. |
| 7,849,014 B2 | 12/2010 | Erikson |
| 7,853,493 B2 | 12/2010 | DeBie et al. |
| 7,853,518 B2 | 12/2010 | Cagan |
| 7,853,984 B2 | 12/2010 | Antell et al. |
| 7,856,386 B2 | 12/2010 | Hazlehurst et al. |
| 7,860,782 B2 | 12/2010 | Cash et al. |
| 7,860,786 B2 | 12/2010 | Blackburn et al. |
| 7,870,078 B2 | 1/2011 | Clark et al. |

(56) References Cited

U.S. PATENT DOCUMENTS

| | | | |
|---|---|---|---|
| 7,877,304 B1 | 1/2011 | Coulter |
| 7,880,728 B2 | 2/2011 | de los Reyes et al. |
| 7,899,750 B1 | 3/2011 | Klieman et al. |
| 7,900,052 B2 | 3/2011 | Joans |
| 7,904,306 B2 | 3/2011 | Johnson et al. |
| 7,904,367 B2 | 3/2011 | Chung et al. |
| 7,908,242 B1 | 3/2011 | Achanta |
| 7,912,865 B2 | 3/2011 | Akerman et al. |
| 7,925,582 B1 | 4/2011 | Kornegay et al. |
| 7,930,195 B2 | 4/2011 | Heyns et al. |
| 7,930,252 B2 | 4/2011 | Bender et al. |
| 7,941,363 B2 | 5/2011 | Tanaka et al. |
| 7,966,192 B2 | 6/2011 | Pagliari et al. |
| 7,970,676 B2 | 6/2011 | Feinstein |
| 7,970,679 B2 | 6/2011 | Kasower |
| 7,970,698 B2 | 6/2011 | Gupta et al. |
| 7,979,908 B2 | 7/2011 | Millwee |
| 7,983,976 B2 | 7/2011 | Nafeh et al. |
| 7,983,979 B2 | 7/2011 | Holland, IV |
| 7,991,689 B1 | 8/2011 | Brunzell et al. |
| 8,001,034 B2 | 8/2011 | Chung et al. |
| 8,001,040 B2 | 8/2011 | Keithley |
| 8,001,042 B1 | 8/2011 | Brunzell et al. |
| 8,001,043 B1 | 8/2011 | Walker et al. |
| 8,001,153 B2 | 8/2011 | Skurtovich, Jr. et al. |
| 8,015,107 B2 | 9/2011 | Kornegay et al. |
| 8,019,828 B2 | 9/2011 | Cash et al. |
| 8,019,843 B2 | 9/2011 | Cash et al. |
| 8,024,778 B2 | 9/2011 | Cash et al. |
| 8,032,932 B2 | 10/2011 | Speyer et al. |
| 8,060,424 B2 | 11/2011 | Kasower |
| 8,060,441 B2 | 11/2011 | Stewart et al. |
| 8,064,586 B2 | 11/2011 | Shaffer et al. |
| 8,065,233 B2 | 11/2011 | Lee et al. |
| 8,065,234 B2 | 11/2011 | Liao et al. |
| 8,073,785 B1 | 12/2011 | Candella et al. |
| 8,078,524 B2 | 12/2011 | Crawford et al. |
| 8,078,527 B2 | 12/2011 | Cerise et al. |
| 8,078,528 B1 | 12/2011 | Vicente et al. |
| 8,082,202 B2 | 12/2011 | Weiss |
| 8,086,523 B1 | 12/2011 | Palmer |
| 8,095,443 B2 | 1/2012 | DeBie |
| 8,095,458 B2 | 1/2012 | Peterson et al. |
| 8,099,309 B1 | 1/2012 | Bober |
| 8,099,341 B2 | 1/2012 | Varghese |
| 8,104,679 B2 | 1/2012 | Brown |
| 8,127,982 B1 | 3/2012 | Casey et al. |
| 8,127,986 B1 | 3/2012 | Taylor et al. |
| 8,131,685 B1 | 3/2012 | Gedalius et al. |
| 8,135,642 B1 | 3/2012 | Krause |
| 8,160,960 B1 | 4/2012 | Fei et al. |
| 8,195,549 B2 | 6/2012 | Kasower |
| 8,201,257 B1 | 6/2012 | Andres et al. |
| 8,204,774 B2 | 6/2012 | Chwast et al. |
| 8,204,812 B2 | 6/2012 | Stewart et al. |
| 8,219,535 B1 | 7/2012 | Kobori et al. |
| 8,224,723 B2 | 7/2012 | Bosch et al. |
| 8,225,395 B2 | 7/2012 | Atwood et al. |
| 8,234,498 B2 | 7/2012 | Britti et al. |
| 8,239,130 B1 | 8/2012 | Upstill et al. |
| 8,255,978 B2 | 8/2012 | Dick |
| 8,285,656 B1 | 10/2012 | Chang et al. |
| 8,290,840 B2 | 10/2012 | Kasower |
| 8,296,229 B1 | 10/2012 | Yellin et al. |
| 8,312,033 B1 | 11/2012 | McMillan |
| 8,321,334 B1 | 11/2012 | Kornegay et al. |
| 8,321,339 B2 | 11/2012 | Imrey et al. |
| 8,327,429 B2 | 12/2012 | Speyer et al. |
| 8,335,741 B2 | 12/2012 | Kornegay et al. |
| 8,340,685 B2 | 12/2012 | Cochran et al. |
| 8,355,967 B2 | 1/2013 | Debie et al. |
| 8,364,518 B1 | 1/2013 | Blake et al. |
| 8,364,588 B2 | 1/2013 | Celka et al. |
| 8,380,618 B1 | 2/2013 | Kazenas et al. |
| 8,412,593 B1 | 4/2013 | Song et al. |
| 8,418,254 B2 | 4/2013 | Britti et al. |
| 8,433,512 B1 | 4/2013 | Lopatenko et al. |
| 8,433,648 B2 | 4/2013 | Keithley et al. |
| 8,442,886 B1 | 5/2013 | Haggerty et al. |
| 8,458,062 B2 | 6/2013 | Dutt et al. |
| 8,458,074 B2 | 6/2013 | Showalter |
| 8,464,939 B1 | 6/2013 | Taylor et al. |
| 8,473,354 B2 | 6/2013 | Psota et al. |
| 8,473,410 B1 | 6/2013 | Haggerty et al. |
| 8,515,844 B2 | 8/2013 | Kasower |
| 8,533,030 B2 | 9/2013 | Dhir et al. |
| 8,533,118 B2 | 9/2013 | Weller et al. |
| 8,538,869 B1 | 9/2013 | Haggerty et al. |
| 8,560,436 B2 | 10/2013 | Ingram et al. |
| 8,566,029 B1 | 10/2013 | Lopatenko et al. |
| 8,566,141 B1 | 10/2013 | Nagdev et al. |
| 8,571,971 B1 | 10/2013 | Brown et al. |
| 8,572,083 B1 | 10/2013 | Snell et al. |
| 8,589,069 B1 | 11/2013 | Lehman |
| 8,589,208 B2 | 11/2013 | Kruger et al. |
| 8,595,101 B1 | 11/2013 | Daukas et al. |
| 8,600,886 B2 | 12/2013 | Ramavarjula et al. |
| 8,606,694 B2 | 12/2013 | Campbell et al. |
| 8,621,562 B2 | 12/2013 | Antell et al. |
| 8,626,618 B2 | 1/2014 | Psota et al. |
| 8,631,242 B2 | 1/2014 | Britti et al. |
| 8,639,616 B1 | 1/2014 | Rolenaitis et al. |
| 8,646,101 B1 | 2/2014 | Millwee |
| 8,650,407 B2 | 2/2014 | Britti et al. |
| 8,671,107 B2 | 3/2014 | Scully et al. |
| 8,671,115 B2 | 3/2014 | Skurtovich, Jr. et al. |
| 8,694,420 B1 | 4/2014 | Oliai |
| 8,719,159 B2 | 5/2014 | Keithley |
| 8,725,613 B1 | 5/2014 | Celka et al. |
| 8,738,516 B1 | 5/2014 | Dean et al. |
| 8,744,956 B1 | 6/2014 | DiChiara et al. |
| 8,756,099 B2 | 6/2014 | Keithley et al. |
| 8,768,914 B2 | 7/2014 | Scriffignano et al. |
| 8,775,299 B2 | 7/2014 | Achanta et al. |
| 8,781,882 B1 | 7/2014 | Arboletti et al. |
| 8,781,951 B2 | 7/2014 | Lewis et al. |
| 8,781,953 B2 | 7/2014 | Kasower |
| 8,781,954 B2 | 7/2014 | Haggerty et al. |
| 8,806,218 B2 | 8/2014 | Hatakeda |
| 8,856,894 B1 | 10/2014 | Dean et al. |
| 8,930,251 B2 | 1/2015 | DeBie |
| 8,930,262 B1 | 1/2015 | Searson et al. |
| 8,931,058 B2 | 1/2015 | DiChiara et al. |
| 8,938,399 B1 | 1/2015 | Herman |
| 8,938,432 B2 | 1/2015 | Rossmark et al. |
| 8,949,981 B1 | 2/2015 | Trollope et al. |
| 9,043,930 B2 | 5/2015 | Britti et al. |
| 9,058,627 B1 | 6/2015 | Wasser et al. |
| 9,116,918 B1 | 8/2015 | Kim |
| 9,143,541 B1 | 9/2015 | Szamonek et al. |
| 9,147,042 B1 | 9/2015 | Haller et al. |
| 9,183,363 B1 | 11/2015 | Millwee |
| 9,189,789 B1 | 11/2015 | Hastings et al. |
| 9,251,541 B2 | 2/2016 | Celka et al. |
| 9,256,624 B2 | 2/2016 | Skurtovich, Jr. et al. |
| 9,256,904 B1 | 2/2016 | Haller et al. |
| 9,443,268 B1 | 9/2016 | Kapczynski et al. |
| 9,477,988 B2 | 10/2016 | Haggerty et al. |
| 9,489,694 B2 | 11/2016 | Haller et al. |
| 9,553,936 B2 | 1/2017 | Dijk et al. |
| 9,558,519 B1 | 1/2017 | Burger |
| 9,607,336 B1 | 3/2017 | Dean et al. |
| 9,652,802 B1 | 5/2017 | Kasower |
| 9,684,905 B1 | 6/2017 | Haller et al. |
| 9,697,263 B1 | 7/2017 | Girulat, Jr. |
| 9,710,523 B2 | 7/2017 | Skurtovich, Jr. et al. |
| 9,760,553 B1 | 9/2017 | Hecht-Nielse |
| 9,792,648 B1 | 10/2017 | Haller et al. |
| 9,830,646 B1 | 11/2017 | Wasser et al. |
| 9,922,094 B1 | 3/2018 | Perumal et al. |
| 10,102,526 B1 | 10/2018 | Madisetti |
| 10,115,155 B1 | 10/2018 | Haller et al. |
| 10,362,058 B2 | 7/2019 | Hu et al. |
| 10,402,792 B2 | 9/2019 | Lin et al. |

(56)　　　　References Cited

U.S. PATENT DOCUMENTS

| | | |
|---|---|---|
| 10,408,055 B2 | 9/2019 | Soofi et al. |
| 10,417,704 B2 | 9/2019 | Searson et al. |
| 10,460,378 B1 | 10/2019 | Malinen et al. |
| 10,579,647 B1 | 3/2020 | Allsopp et al. |
| 10,650,448 B1 | 5/2020 | Haller et al. |
| 10,735,183 B1 | 8/2020 | Mehta et al. |
| 10,757,154 B1 | 8/2020 | Jacobs et al. |
| 10,909,617 B2 | 2/2021 | Kasower |
| 10,984,404 B2 | 4/2021 | Nack et al. |
| 11,004,147 B1 | 5/2021 | Haller et al. |
| 11,159,593 B1 | 10/2021 | Jacobs et al. |
| 11,210,276 B1 * | 12/2021 | Smith ..................... G06F 16/22 |
| 11,227,001 B2 | 1/2022 | Rege et al. |
| 11,379,821 B2 | 7/2022 | Butvin et al. |
| 11,620,403 B2 | 4/2023 | Chen et al. |
| 11,636,540 B1 | 4/2023 | Haller et al. |
| 11,652,607 B1 | 5/2023 | Mehta et al. |
| 11,681,733 B2 | 6/2023 | Rege et al. |
| 11,729,230 B1 | 8/2023 | Jacobs et al. |
| 11,847,636 B2 | 12/2023 | Schmidt |
| 11,962,681 B2 | 4/2024 | Mehta et al. |
| 12,381,712 B2 | 8/2025 | Mehta et al. |
| 2001/0011247 A1 | 8/2001 | O'Flaherty et al. |
| 2001/0014868 A1 | 8/2001 | Herz et al. |
| 2001/0014878 A1 | 8/2001 | Mitra et al. |
| 2001/0029470 A1 | 10/2001 | Schultz et al. |
| 2001/0029482 A1 | 10/2001 | Tealdi et al. |
| 2001/0034618 A1 | 10/2001 | Kessler et al. |
| 2001/0034631 A1 | 10/2001 | Kiselik |
| 2001/0039523 A1 | 11/2001 | Iwamoto |
| 2001/0039532 A1 | 11/2001 | Coleman, Jr. et al. |
| 2001/0042785 A1 | 11/2001 | Walker et al. |
| 2001/0044729 A1 | 11/2001 | Pomerance |
| 2001/0044756 A1 | 11/2001 | Watkins et al. |
| 2001/0049620 A1 | 12/2001 | Blasko |
| 2002/0004736 A1 | 1/2002 | Roundtree et al. |
| 2002/0004774 A1 | 1/2002 | Defarlo |
| 2002/0010594 A1 | 1/2002 | Levine |
| 2002/0026519 A1 | 2/2002 | Itabashi et al. |
| 2002/0042763 A1 | 4/2002 | Pillay et al. |
| 2002/0052841 A1 | 5/2002 | Guthrie et al. |
| 2002/0055869 A1 | 5/2002 | Hegg |
| 2002/0069122 A1 | 6/2002 | Yun et al. |
| 2002/0077964 A1 | 6/2002 | Brody et al. |
| 2002/0087460 A1 | 7/2002 | Hornung |
| 2002/0091635 A1 | 7/2002 | Dilip et al. |
| 2002/0091650 A1 | 7/2002 | Ellis |
| 2002/0099635 A1 | 7/2002 | Guiragosian |
| 2002/0099641 A1 | 7/2002 | Mills et al. |
| 2002/0099824 A1 | 7/2002 | Bender et al. |
| 2002/0107765 A1 | 8/2002 | Walker |
| 2002/0107849 A1 | 8/2002 | Hickey et al. |
| 2002/0111816 A1 | 8/2002 | Lortscher et al. |
| 2002/0116247 A1 | 8/2002 | Tucker et al. |
| 2002/0119824 A1 | 8/2002 | Allen |
| 2002/0128962 A1 | 9/2002 | Kasower |
| 2002/0128981 A1 | 9/2002 | Kawan et al. |
| 2002/0133365 A1 | 9/2002 | Grey et al. |
| 2002/0133462 A1 | 9/2002 | Shteyn |
| 2002/0138297 A1 | 9/2002 | Lee |
| 2002/0138445 A1 | 9/2002 | Laage et al. |
| 2002/0138470 A1 | 9/2002 | Zhou |
| 2002/0147617 A1 | 10/2002 | Schoenbaum et al. |
| 2002/0147669 A1 | 10/2002 | Taylor et al. |
| 2002/0152166 A1 | 10/2002 | Dutta et al. |
| 2002/0156676 A1 | 10/2002 | Ahrens et al. |
| 2002/0156797 A1 | 10/2002 | Lee et al. |
| 2002/0161664 A1 | 10/2002 | Shaya et al. |
| 2002/0165757 A1 | 11/2002 | Lisser |
| 2002/0173994 A1 | 11/2002 | Ferguson, III |
| 2002/0174048 A1 | 11/2002 | Dheer et al. |
| 2002/0184054 A1 | 12/2002 | Cox et al. |
| 2002/0188478 A1 | 12/2002 | Breeland et al. |
| 2002/0194103 A1 | 12/2002 | Nabe |
| 2002/0194120 A1 | 12/2002 | Russell et al. |
| 2002/0198806 A1 | 12/2002 | Blagg et al. |
| 2002/0198830 A1 | 12/2002 | Randell et al. |
| 2003/0009418 A1 | 1/2003 | Green et al. |
| 2003/0009426 A1 | 1/2003 | Ruiz-Sanchez |
| 2003/0014336 A1 | 1/2003 | Dao et al. |
| 2003/0018558 A1 | 1/2003 | Heffner et al. |
| 2003/0027635 A1 | 2/2003 | Walker et al. |
| 2003/0028402 A1 | 2/2003 | Ulrich et al. |
| 2003/0036926 A1 | 2/2003 | Starkey et al. |
| 2003/0036995 A1 | 2/2003 | Lazerson |
| 2003/0037054 A1 | 2/2003 | Dutta et al. |
| 2003/0041019 A1 | 2/2003 | Vagim, III et al. |
| 2003/0041031 A1 | 2/2003 | Hedy |
| 2003/0046112 A1 | 3/2003 | Dutta et al. |
| 2003/0046311 A1 | 3/2003 | Baidya et al. |
| 2003/0050795 A1 | 3/2003 | Baldwin, Jr. et al. |
| 2003/0050796 A1 | 3/2003 | Baldwin, Jr. et al. |
| 2003/0065563 A1 | 4/2003 | Elliott et al. |
| 2003/0069839 A1 | 4/2003 | Whittington et al. |
| 2003/0078877 A1 | 4/2003 | Beirne et al. |
| 2003/0097342 A1 | 5/2003 | Whittingtom |
| 2003/0097380 A1 | 5/2003 | Mulhern et al. |
| 2003/0110111 A1 | 6/2003 | Nalebuff et al. |
| 2003/0126072 A1 | 7/2003 | Brock |
| 2003/0154162 A1 | 8/2003 | Danaher et al. |
| 2003/0163416 A1 | 8/2003 | Kitajima |
| 2003/0163483 A1 | 8/2003 | Zingher et al. |
| 2003/0195859 A1 | 10/2003 | Lawrence |
| 2003/0200184 A1 | 10/2003 | Dominguez et al. |
| 2003/0204752 A1 | 10/2003 | Garrison |
| 2003/0208412 A1 | 11/2003 | Hillestad et al. |
| 2003/0220858 A1 | 11/2003 | Lam et al. |
| 2003/0229507 A1 | 12/2003 | Perge |
| 2003/0233259 A1 | 12/2003 | Mistretta et al. |
| 2004/0006488 A1 | 1/2004 | Fitall et al. |
| 2004/0010443 A1 | 1/2004 | May et al. |
| 2004/0010458 A1 | 1/2004 | Friedman |
| 2004/0023637 A1 | 2/2004 | Johnson et al. |
| 2004/0024709 A1 | 2/2004 | Yu et al. |
| 2004/0030629 A1 | 2/2004 | Freeman et al. |
| 2004/0030649 A1 | 2/2004 | Nelson et al. |
| 2004/0039688 A1 | 2/2004 | Sulkowski et al. |
| 2004/0044563 A1 | 3/2004 | Stein |
| 2004/0044673 A1 | 3/2004 | Brady et al. |
| 2004/0049473 A1 | 3/2004 | Gower et al. |
| 2004/0050928 A1 | 3/2004 | Bishop et al. |
| 2004/0054619 A1 | 3/2004 | Watson et al. |
| 2004/0064402 A1 | 4/2004 | Dreyer et al. |
| 2004/0073456 A1 | 4/2004 | Gottlieb et al. |
| 2004/0078323 A1 | 4/2004 | Johnston et al. |
| 2004/0078324 A1 | 4/2004 | Lonnberg et al. |
| 2004/0088237 A1 | 5/2004 | Moenickheim et al. |
| 2004/0088255 A1 | 5/2004 | Zielke et al. |
| 2004/0103147 A1 | 5/2004 | Flesher et al. |
| 2004/0111305 A1 | 6/2004 | Gavan et al. |
| 2004/0111359 A1 | 6/2004 | Hudock |
| 2004/0117235 A1 | 6/2004 | Shacham |
| 2004/0117302 A1 | 6/2004 | Weichert et al. |
| 2004/0128150 A1 | 7/2004 | Lundegren |
| 2004/0128230 A1 | 7/2004 | Oppenheimer et al. |
| 2004/0133460 A1 | 7/2004 | Berlin et al. |
| 2004/0133509 A1 | 7/2004 | McCoy et al. |
| 2004/0133513 A1 | 7/2004 | McCoy et al. |
| 2004/0133515 A1 | 7/2004 | McCoy et al. |
| 2004/0138994 A1 | 7/2004 | DeFrancesco et al. |
| 2004/0139025 A1 | 7/2004 | Coleman |
| 2004/0143546 A1 | 7/2004 | Wood et al. |
| 2004/0153437 A1 | 8/2004 | Buchan |
| 2004/0153521 A1 | 8/2004 | Kogo |
| 2004/0158523 A1 | 8/2004 | Dort |
| 2004/0159700 A1 | 8/2004 | Khan et al. |
| 2004/0167793 A1 | 8/2004 | Masuoka et al. |
| 2004/0177030 A1 | 9/2004 | Shoham |
| 2004/0177114 A1 | 9/2004 | Friedman et al. |
| 2004/0193538 A1 | 9/2004 | Raines |
| 2004/0199456 A1 | 10/2004 | Flint et al. |
| 2004/0199458 A1 | 10/2004 | Ho |
| 2004/0199462 A1 | 10/2004 | Starrs |
| 2004/0215553 A1 | 10/2004 | Gang et al. |

(56)          References Cited

U.S. PATENT DOCUMENTS

| | | |
|---|---|---|
| 2004/0215554 A1 | 10/2004 | Kemper et al. |
| 2004/0215555 A1 | 10/2004 | Kemper et al. |
| 2004/0215556 A1 | 10/2004 | Merkley, Jr. et al. |
| 2004/0215584 A1 | 10/2004 | Yao |
| 2004/0220865 A1 | 11/2004 | Lozowski et al. |
| 2004/0220896 A1 | 11/2004 | Finlay et al. |
| 2004/0220918 A1 | 11/2004 | Scriffignano et al. |
| 2004/0225545 A1 | 11/2004 | Turner et al. |
| 2004/0225594 A1 | 11/2004 | Nolan, III et al. |
| 2004/0225597 A1 | 11/2004 | Oppenheimer et al. |
| 2004/0225643 A1 | 11/2004 | Alpha et al. |
| 2004/0230534 A1 | 11/2004 | McGough |
| 2004/0243450 A1 | 12/2004 | Bernard, Jr. et al. |
| 2004/0243588 A1 | 12/2004 | Tanner et al. |
| 2004/0267660 A1 | 12/2004 | Greenwood et al. |
| 2004/0267714 A1 | 12/2004 | Frid et al. |
| 2005/0004855 A1 | 1/2005 | Jenson et al. |
| 2005/0004870 A1 | 1/2005 | McGaughey |
| 2005/0010513 A1 | 1/2005 | Duckworth et al. |
| 2005/0027633 A1 | 2/2005 | Fortuna et al. |
| 2005/0027983 A1 | 2/2005 | Klawon |
| 2005/0027995 A1 | 2/2005 | Menschik et al. |
| 2005/0055231 A1 | 3/2005 | Lee |
| 2005/0055275 A1 | 3/2005 | Newman et al. |
| 2005/0058262 A1 | 3/2005 | Timmins et al. |
| 2005/0071328 A1 | 3/2005 | Lawrence |
| 2005/0086071 A1 | 4/2005 | Fox, Jr. et al. |
| 2005/0086072 A1 | 4/2005 | Fox, Jr. et al. |
| 2005/0086126 A1 | 4/2005 | Patterson |
| 2005/0091164 A1 | 4/2005 | Varble |
| 2005/0091337 A1 | 4/2005 | Reasor |
| 2005/0097017 A1 | 5/2005 | Hanratty |
| 2005/0097039 A1 | 5/2005 | Kulcsar et al. |
| 2005/0097320 A1 | 5/2005 | Golan et al. |
| 2005/0102180 A1 | 5/2005 | Gailey et al. |
| 2005/0102206 A1 | 5/2005 | Savasoglu et al. |
| 2005/0125291 A1 | 6/2005 | Demkiw Grayson et al. |
| 2005/0125397 A1 | 6/2005 | Gross et al. |
| 2005/0137899 A1 | 6/2005 | Davies et al. |
| 2005/0137912 A1 | 6/2005 | Rao et al. |
| 2005/0154617 A1 | 7/2005 | Ruggieri et al. |
| 2005/0154664 A1 | 7/2005 | Guy et al. |
| 2005/0154665 A1 | 7/2005 | Kerr |
| 2005/0154738 A1 | 7/2005 | Thomas |
| 2005/0154769 A1 | 7/2005 | Eckart et al. |
| 2005/0197953 A1 | 9/2005 | Broadbent et al. |
| 2005/0209880 A1 | 9/2005 | Drelicharz et al. |
| 2005/0209922 A1 | 9/2005 | Hofmeister |
| 2005/0216953 A1 | 9/2005 | Ellingson |
| 2005/0228748 A1 | 10/2005 | Togher et al. |
| 2005/0251474 A1 | 11/2005 | Shinn et al. |
| 2005/0267840 A1 | 12/2005 | Holm-Blagg et al. |
| 2005/0273423 A1 | 12/2005 | Kiai et al. |
| 2005/0273431 A1 | 12/2005 | Abel et al. |
| 2005/0276401 A1 | 12/2005 | Madill et al. |
| 2005/0279827 A1 | 12/2005 | Mascavage et al. |
| 2005/0288998 A1 | 12/2005 | Verma et al. |
| 2006/0014129 A1 | 1/2006 | Coleman et al. |
| 2006/0015425 A1 | 1/2006 | Brooks |
| 2006/0029107 A1 | 2/2006 | McCullough et al. |
| 2006/0031158 A1 | 2/2006 | Orman |
| 2006/0032909 A1 | 2/2006 | Seegar |
| 2006/0036543 A1 | 2/2006 | Blagg et al. |
| 2006/0059086 A1 | 3/2006 | Mulhern |
| 2006/0069635 A1 | 3/2006 | Ram et al. |
| 2006/0074793 A1 | 4/2006 | Hibbert et al. |
| 2006/0080139 A1 | 4/2006 | Mainzer |
| 2006/0080233 A1 | 4/2006 | Mendelovich et al. |
| 2006/0080251 A1 | 4/2006 | Fried et al. |
| 2006/0085334 A1 | 4/2006 | Murphy |
| 2006/0089842 A1 | 4/2006 | Medawar |
| 2006/0095363 A1 | 5/2006 | May |
| 2006/0100944 A1 | 5/2006 | Reddin et al. |
| 2006/0100954 A1 | 5/2006 | Schoen |
| 2006/0106670 A1 | 5/2006 | Cai et al. |
| 2006/0123461 A1 | 6/2006 | Lunt et al. |
| 2006/0131390 A1 | 6/2006 | Kim |
| 2006/0155573 A1 | 7/2006 | Hartunian |
| 2006/0155639 A1 | 7/2006 | Lynch et al. |
| 2006/0173772 A1 | 8/2006 | Hayes et al. |
| 2006/0177226 A1 | 8/2006 | Ellis, III |
| 2006/0178971 A1 | 8/2006 | Owen et al. |
| 2006/0178983 A1 | 8/2006 | Nice et al. |
| 2006/0184410 A1 | 8/2006 | Ramamurthy et al. |
| 2006/0184440 A1 | 8/2006 | Britti et al. |
| 2006/0184585 A1 | 8/2006 | Grear et al. |
| 2006/0202012 A1 | 9/2006 | Grano et al. |
| 2006/0204051 A1 | 9/2006 | Holland, IV |
| 2006/0206418 A1 | 9/2006 | Byrne et al. |
| 2006/0212407 A1 | 9/2006 | Lyon |
| 2006/0229799 A1 | 10/2006 | Nimmo et al. |
| 2006/0229943 A1 | 10/2006 | Mathias et al. |
| 2006/0229961 A1 | 10/2006 | Lyftogt et al. |
| 2006/0235743 A1 | 10/2006 | Long et al. |
| 2006/0242046 A1 | 10/2006 | Haggerty et al. |
| 2006/0271457 A1 | 11/2006 | Romain et al. |
| 2006/0277092 A1 | 12/2006 | Williams |
| 2006/0277141 A1 | 12/2006 | Palmer |
| 2006/0278704 A1 | 12/2006 | Saunders et al. |
| 2006/0282359 A1 | 12/2006 | Nobili et al. |
| 2006/0287764 A1 | 12/2006 | Kraft |
| 2006/0287766 A1 | 12/2006 | Kraft |
| 2006/0287767 A1 | 12/2006 | Kraft |
| 2006/0288090 A1 | 12/2006 | Kraft |
| 2006/0294199 A1 | 12/2006 | Bertholf |
| 2007/0011083 A1 | 1/2007 | Bird et al. |
| 2007/0016500 A1 | 1/2007 | Chatterji et al. |
| 2007/0016517 A1 | 1/2007 | Solomon |
| 2007/0016520 A1 | 1/2007 | Gang et al. |
| 2007/0022141 A1 | 1/2007 | Singleton et al. |
| 2007/0027778 A1 | 2/2007 | Schellhammer et al. |
| 2007/0038483 A1 | 2/2007 | Wood |
| 2007/0038497 A1 | 2/2007 | Britti et al. |
| 2007/0038568 A1 | 2/2007 | Greene et al. |
| 2007/0043654 A1 | 2/2007 | Libman |
| 2007/0045402 A1 | 3/2007 | Rothschild |
| 2007/0045405 A1 | 3/2007 | Rothschild |
| 2007/0067207 A1 | 3/2007 | Haggerty et al. |
| 2007/0067297 A1 | 3/2007 | Kublickis |
| 2007/0083460 A1 | 4/2007 | Bachenheimer |
| 2007/0083463 A1 | 4/2007 | Kraft |
| 2007/0088950 A1 | 4/2007 | Wheeler et al. |
| 2007/0094137 A1 | 4/2007 | Phillips et al. |
| 2007/0094230 A1 | 4/2007 | Subramaniam et al. |
| 2007/0094241 A1 | 4/2007 | M. Blackwell et al. |
| 2007/0106582 A1 | 5/2007 | Baker et al. |
| 2007/0112668 A1 | 5/2007 | Celano et al. |
| 2007/0118410 A1 | 5/2007 | Nadai |
| 2007/0130070 A1 | 6/2007 | Williams |
| 2007/0156692 A1 | 7/2007 | Rosewarne |
| 2007/0162414 A1 | 7/2007 | Horowitz et al. |
| 2007/0192121 A1 | 8/2007 | Routson et al. |
| 2007/0192122 A1 | 8/2007 | Routson et al. |
| 2007/0198336 A1 | 8/2007 | Thompson |
| 2007/0198407 A1 | 8/2007 | Winter |
| 2007/0208640 A1 | 9/2007 | Banasiak et al. |
| 2007/0214000 A1 | 9/2007 | Shahrabi et al. |
| 2007/0226047 A1 | 9/2007 | Ward |
| 2007/0226093 A1 | 9/2007 | Chan et al. |
| 2007/0250459 A1 | 10/2007 | Schwarz et al. |
| 2007/0255654 A1 | 11/2007 | Whipple et al. |
| 2007/0255655 A1 | 11/2007 | Kemper et al. |
| 2007/0258626 A1 | 11/2007 | Reiner |
| 2007/0261114 A1 | 11/2007 | Pomerantsev |
| 2007/0262137 A1 | 11/2007 | Brown |
| 2007/0266439 A1 | 11/2007 | Kraft |
| 2007/0279187 A1 | 12/2007 | Hekmatpour et al. |
| 2007/0282730 A1 | 12/2007 | Carpenter et al. |
| 2007/0284433 A1 | 12/2007 | Domenica et al. |
| 2007/0288360 A1 | 12/2007 | Seeklus |
| 2007/0294195 A1 | 12/2007 | Curry et al. |
| 2007/0294431 A1 | 12/2007 | Adelman et al. |
| 2007/0299699 A1 | 12/2007 | Policelli et al. |
| 2008/0010203 A1 | 1/2008 | Grant |

(56)         References Cited

U.S. PATENT DOCUMENTS

| | | |
|---|---|---|
| 2008/0010206 A1 | 1/2008 | Coleman |
| 2008/0015954 A1 | 1/2008 | Huber et al. |
| 2008/0015979 A1 | 1/2008 | Bentley |
| 2008/0022281 A1 | 1/2008 | Dubhashi et al. |
| 2008/0033742 A1 | 2/2008 | Bernasconi |
| 2008/0046351 A1 | 2/2008 | Wiener et al. |
| 2008/0052182 A1 | 2/2008 | Marshall |
| 2008/0052244 A1 | 2/2008 | Tsuei et al. |
| 2008/0059317 A1 | 3/2008 | Chandran et al. |
| 2008/0059352 A1 | 3/2008 | Chandran |
| 2008/0059364 A1 | 3/2008 | Tidwell et al. |
| 2008/0086400 A1 | 4/2008 | Ardelean et al. |
| 2008/0091519 A1 | 4/2008 | Foss |
| 2008/0097768 A1 | 4/2008 | Godshalk |
| 2008/0103959 A1 | 5/2008 | Carroll et al. |
| 2008/0103972 A1 | 5/2008 | Lanc |
| 2008/0109315 A1 | 5/2008 | Huang et al. |
| 2008/0109740 A1 | 5/2008 | Prinsen et al. |
| 2008/0109875 A1 | 5/2008 | Kraft |
| 2008/0115191 A1 | 5/2008 | Kim et al. |
| 2008/0120133 A1 | 5/2008 | Krishnaswami et al. |
| 2008/0162383 A1 | 7/2008 | Kraft |
| 2008/0172324 A1 | 7/2008 | Johnson |
| 2008/0177655 A1 | 7/2008 | Zalik |
| 2008/0184270 A1 | 7/2008 | Cole et al. |
| 2008/0189202 A1 | 8/2008 | Zadoorian et al. |
| 2008/0195548 A1 | 8/2008 | Chu et al. |
| 2008/0201257 A1 | 8/2008 | Lewis et al. |
| 2008/0205655 A1 | 8/2008 | Wilkins et al. |
| 2008/0205774 A1 | 8/2008 | Brinker et al. |
| 2008/0208610 A1 | 8/2008 | Thomas et al. |
| 2008/0208726 A1* | 8/2008 | Tsantes .................. G06Q 40/00 705/35 |
| 2008/0208873 A1 | 8/2008 | Boehmer |
| 2008/0221972 A1 | 9/2008 | Megdal et al. |
| 2008/0222015 A1 | 9/2008 | Megdal et al. |
| 2008/0222027 A1 | 9/2008 | Megdal et al. |
| 2008/0222706 A1 | 9/2008 | Renaud et al. |
| 2008/0255922 A1 | 10/2008 | Feldman et al. |
| 2008/0263058 A1 | 10/2008 | Peden |
| 2008/0270209 A1 | 10/2008 | Mauseth et al. |
| 2008/0270294 A1 | 10/2008 | Lent et al. |
| 2008/0270295 A1 | 10/2008 | Lent et al. |
| 2008/0288283 A1 | 11/2008 | Baldwin, Jr. et al. |
| 2008/0294501 A1 | 11/2008 | Rennich et al. |
| 2008/0294540 A1 | 11/2008 | Celka et al. |
| 2008/0301016 A1 | 12/2008 | Durvasula et al. |
| 2008/0306750 A1 | 12/2008 | Wunder et al. |
| 2008/0319832 A1 | 12/2008 | Liebe |
| 2008/0319889 A1 | 12/2008 | Hammad |
| 2008/0319909 A1 | 12/2008 | Perkins et al. |
| 2009/0012889 A1 | 1/2009 | Finch |
| 2009/0024428 A1 | 1/2009 | Hudock, Jr. |
| 2009/0030776 A1 | 1/2009 | Walker et al. |
| 2009/0031426 A1 | 1/2009 | Dal Lago et al. |
| 2009/0043691 A1 | 2/2009 | Kasower |
| 2009/0044279 A1 | 2/2009 | Crawford et al. |
| 2009/0055322 A1 | 2/2009 | Bykov et al. |
| 2009/0055894 A1 | 2/2009 | Lorsch |
| 2009/0060343 A1 | 3/2009 | Rosca |
| 2009/0089190 A1 | 4/2009 | Girulat |
| 2009/0094674 A1 | 4/2009 | Schwartz et al. |
| 2009/0112650 A1 | 4/2009 | Iwane |
| 2009/0119199 A1 | 5/2009 | Salahi |
| 2009/0138335 A1 | 5/2009 | Lieberman |
| 2009/0150166 A1 | 6/2009 | Leite et al. |
| 2009/0150238 A1 | 6/2009 | Marsh et al. |
| 2009/0158030 A1 | 6/2009 | Rasti |
| 2009/0164232 A1 | 6/2009 | Chmielewski et al. |
| 2009/0164380 A1 | 6/2009 | Brown |
| 2009/0172815 A1 | 7/2009 | Gu et al. |
| 2009/0222308 A1 | 9/2009 | Zoldi et al. |
| 2009/0222379 A1 | 9/2009 | Choudhuri et al. |
| 2009/0234775 A1 | 9/2009 | Whitney et al. |
| 2009/0240624 A1 | 9/2009 | James et al. |
| 2009/0248573 A1 | 10/2009 | Haggerty et al. |
| 2009/0254971 A1 | 10/2009 | Herz et al. |
| 2009/0271248 A1 | 10/2009 | Sherman et al. |
| 2009/0271265 A1 | 10/2009 | Lay et al. |
| 2009/0276244 A1 | 11/2009 | Baldwin, Jr. et al. |
| 2009/0276435 A1 | 11/2009 | Whitten |
| 2009/0289110 A1 | 11/2009 | Regen et al. |
| 2009/0328173 A1 | 12/2009 | Jakobson et al. |
| 2010/0009663 A1 | 1/2010 | Chang |
| 2010/0010930 A1 | 1/2010 | Allen |
| 2010/0011428 A1 | 1/2010 | Atwood et al. |
| 2010/0023434 A1 | 1/2010 | Bond |
| 2010/0023448 A1 | 1/2010 | Eze |
| 2010/0030677 A1 | 2/2010 | Melik-Aslanian et al. |
| 2010/0042517 A1 | 2/2010 | Paintin et al. |
| 2010/0042583 A1 | 2/2010 | Gervais |
| 2010/0049803 A1 | 2/2010 | Ogilvie et al. |
| 2010/0107225 A1 | 4/2010 | Spencer et al. |
| 2010/0114724 A1 | 5/2010 | Ghosh et al. |
| 2010/0114744 A1 | 5/2010 | Gonen |
| 2010/0122316 A1 | 5/2010 | Lyon |
| 2010/0142698 A1 | 6/2010 | Spottiswoode et al. |
| 2010/0145836 A1 | 6/2010 | Baker et al. |
| 2010/0174638 A1 | 7/2010 | Debie et al. |
| 2010/0185546 A1 | 7/2010 | Pollard |
| 2010/0188684 A1 | 7/2010 | Kumara |
| 2010/0205087 A1 | 8/2010 | Hubler et al. |
| 2010/0217837 A1 | 8/2010 | Ansari et al. |
| 2010/0223168 A1 | 9/2010 | Haggerty et al. |
| 2010/0228658 A1 | 9/2010 | Ketelsen et al. |
| 2010/0250411 A1 | 9/2010 | Ogrodski |
| 2010/0250497 A1 | 9/2010 | Redlich et al. |
| 2010/0250509 A1 | 9/2010 | Andersen |
| 2010/0253686 A1 | 10/2010 | Alsbury et al. |
| 2010/0257102 A1 | 10/2010 | Perlman |
| 2010/0262535 A1 | 10/2010 | Lent et al. |
| 2010/0268660 A1 | 10/2010 | Ekdahl |
| 2010/0293090 A1 | 11/2010 | Domenikos et al. |
| 2010/0299262 A1 | 11/2010 | Handler |
| 2010/0325035 A1 | 12/2010 | Hilgers et al. |
| 2011/0029427 A1 | 2/2011 | Haggerty et al. |
| 2011/0035315 A1 | 2/2011 | Langley |
| 2011/0040736 A1 | 2/2011 | Kalaboukis |
| 2011/0054981 A1 | 3/2011 | Faith et al. |
| 2011/0060654 A1 | 3/2011 | Elliott et al. |
| 2011/0087692 A1 | 4/2011 | Masone |
| 2011/0125632 A1 | 5/2011 | Neel |
| 2011/0126275 A1 | 5/2011 | Anderson et al. |
| 2011/0131123 A1 | 6/2011 | Griffin et al. |
| 2011/0161218 A1 | 6/2011 | Swift |
| 2011/0166988 A1 | 7/2011 | Coulter |
| 2011/0173116 A1 | 7/2011 | Yan et al. |
| 2011/0178841 A1 | 7/2011 | Rane et al. |
| 2011/0178899 A1 | 7/2011 | Huszar |
| 2011/0184838 A1 | 7/2011 | Winters et al. |
| 2011/0196791 A1 | 8/2011 | Dominguez |
| 2011/0270779 A1 | 11/2011 | Showalter |
| 2011/0270925 A1 | 11/2011 | Mina |
| 2012/0005070 A1 | 1/2012 | McFall et al. |
| 2012/0023011 A1 | 1/2012 | Hurwitz |
| 2012/0030771 A1 | 2/2012 | Pierson et al. |
| 2012/0066065 A1 | 3/2012 | Switzer |
| 2012/0066084 A1 | 3/2012 | Sneyders |
| 2012/0072464 A1 | 3/2012 | Cohen |
| 2012/0101938 A1 | 4/2012 | Kasower |
| 2012/0101939 A1 | 4/2012 | Kasower |
| 2012/0108274 A1 | 5/2012 | Acebo Ruiz et al. |
| 2012/0109990 A1 | 5/2012 | Yamasaki |
| 2012/0123942 A1 | 5/2012 | Song et al. |
| 2012/0136763 A1 | 5/2012 | Megdal et al. |
| 2012/0136774 A1 | 5/2012 | Imrey et al. |
| 2012/0150678 A1 | 6/2012 | Dyor |
| 2012/0158574 A1 | 6/2012 | Brunzell et al. |
| 2012/0158654 A1 | 6/2012 | Behren et al. |
| 2012/0173406 A1 | 7/2012 | Fei et al. |
| 2012/0173417 A1 | 7/2012 | Lohman et al. |
| 2012/0198556 A1 | 8/2012 | Patel et al. |
| 2012/0204026 A1 | 8/2012 | Shi et al. |
| 2012/0215682 A1 | 8/2012 | Lent et al. |

(56)　　　　　　References Cited

U.S. PATENT DOCUMENTS

| 2012/0226916 A1 | 9/2012 | Hahn et al. |
| 2012/0232958 A1 | 9/2012 | Silbert |
| 2012/0239553 A1 | 9/2012 | Gonen et al. |
| 2012/0239583 A1 | 9/2012 | Dobrowolski |
| 2012/0246060 A1 | 9/2012 | Conyack, Jr. et al. |
| 2012/0253852 A1 | 10/2012 | Pourfallah et al. |
| 2012/0265607 A1 | 10/2012 | Belwadi |
| 2012/0284118 A1 | 11/2012 | Mamich, Jr. et al. |
| 2012/0290660 A1 | 11/2012 | Rao et al. |
| 2012/0317016 A1 | 12/2012 | Hughes |
| 2012/0324388 A1 | 12/2012 | Rao et al. |
| 2013/0007891 A1 | 1/2013 | Mogaki |
| 2013/0018811 A1 | 1/2013 | Britti et al. |
| 2013/0031624 A1 | 1/2013 | Britti et al. |
| 2013/0060603 A1 | 3/2013 | Wagner |
| 2013/0066775 A1 | 3/2013 | Milam |
| 2013/0110565 A1 | 5/2013 | Means et al. |
| 2013/0117087 A1 | 5/2013 | Coppinger |
| 2013/0124263 A1 | 5/2013 | Amaro et al. |
| 2013/0173449 A1 | 7/2013 | Ng et al. |
| 2013/0173451 A1 | 7/2013 | Kornegay et al. |
| 2013/0185189 A1* | 7/2013 | Stewart .................. G06Q 40/02 |
|  |  | 705/38 |
| 2013/0185293 A1 | 7/2013 | Boback |
| 2013/0205135 A1 | 8/2013 | Lutz |
| 2013/0211986 A1 | 8/2013 | Debie et al. |
| 2013/0226706 A1 | 8/2013 | Haggerty et al. |
| 2013/0226753 A1 | 8/2013 | Haggerty et al. |
| 2013/0226779 A1 | 8/2013 | Haggerty et al. |
| 2013/0226782 A1 | 8/2013 | Haggerty et al. |
| 2013/0268357 A1 | 10/2013 | Heath |
| 2013/0332338 A1 | 12/2013 | Yan et al. |
| 2013/0332342 A1 | 12/2013 | Kasower |
| 2013/0332467 A1 | 12/2013 | Bornea et al. |
| 2013/0339249 A1 | 12/2013 | Weller et al. |
| 2014/0032265 A1 | 1/2014 | Paprocki et al. |
| 2014/0032300 A1 | 1/2014 | Zhang et al. |
| 2014/0032723 A1 | 1/2014 | Nema |
| 2014/0061302 A1 | 3/2014 | Hammad |
| 2014/0089167 A1 | 3/2014 | Kasower |
| 2014/0110477 A1 | 4/2014 | Hammad |
| 2014/0136422 A1 | 5/2014 | Jung et al. |
| 2014/0149314 A1 | 5/2014 | Blakely |
| 2014/0156500 A1 | 6/2014 | Lassen et al. |
| 2014/0156501 A1 | 6/2014 | Howe |
| 2014/0156503 A1 | 6/2014 | Lassen et al. |
| 2014/0157375 A1 | 6/2014 | Britti et al. |
| 2014/0258083 A1 | 9/2014 | Achanta et al. |
| 2014/0279329 A1 | 9/2014 | Dancel |
| 2015/0199757 A1 | 7/2015 | Lindholme et al. |
| 2015/0254329 A1 | 9/2015 | Agarwal et al. |
| 2015/0269506 A1 | 9/2015 | Britti et al. |
| 2015/0287091 A1 | 10/2015 | Koran |
| 2015/0295906 A1 | 10/2015 | Ufford et al. |
| 2015/0310543 A1 | 10/2015 | DeBie |
| 2015/0339769 A1 | 11/2015 | deOliveira et al. |
| 2016/0055487 A1 | 2/2016 | Votaw et al. |
| 2016/0071175 A1 | 3/2016 | Reuss et al. |
| 2016/0092997 A1 | 3/2016 | Shen et al. |
| 2017/0041296 A1 | 2/2017 | Ford et al. |
| 2017/0046526 A1 | 2/2017 | Chan et al. |
| 2017/0046652 A1 | 2/2017 | Haldenby et al. |
| 2017/0046664 A1 | 2/2017 | Haldenby et al. |
| 2017/0046693 A1 | 2/2017 | Haldenby et al. |
| 2017/0048021 A1 | 2/2017 | Yanovsky et al. |
| 2017/0061138 A1 | 3/2017 | Lambert |
| 2017/0109735 A1 | 4/2017 | Sheng et al. |
| 2017/0155515 A1 | 6/2017 | Androulaki |
| 2017/0200223 A1 | 7/2017 | Kasower |
| 2017/0249481 A1 | 8/2017 | Edison |
| 2017/0278182 A1 | 9/2017 | Kasower |
| 2017/0300627 A1 | 10/2017 | Giordano et al. |
| 2018/0060596 A1 | 3/2018 | Hamel et al. |
| 2018/0060600 A1 | 3/2018 | Hamel et al. |
| 2018/0062835 A1 | 3/2018 | Hamel et al. |
| 2018/0075527 A1 | 3/2018 | Nagla et al. |
| 2018/0183768 A1 | 6/2018 | Lobban et al. |
| 2018/0204279 A1 | 7/2018 | Painter et al. |
| 2018/0205707 A1 | 7/2018 | Bellala et al. |
| 2018/0218069 A1 | 8/2018 | Rege et al. |
| 2018/0239914 A1 | 8/2018 | Chen et al. |
| 2018/0253702 A1 | 9/2018 | Dowding |
| 2018/0276661 A1 | 9/2018 | van Wingerden |
| 2018/0302215 A1 | 10/2018 | Salgueiro et al. |
| 2018/0309567 A1 | 10/2018 | Wooden |
| 2018/0337915 A1 | 11/2018 | Tewari |
| 2019/0043127 A1 | 2/2019 | Mahapatra |
| 2019/0147544 A1 | 5/2019 | Pecoraro et al. |
| 2019/0251558 A1 | 8/2019 | Liu et al. |
| 2019/0288850 A1 | 9/2019 | Beecham et al. |
| 2019/0333142 A1 | 10/2019 | Thomas |
| 2019/0347627 A1 | 11/2019 | Lin et al. |
| 2019/0387002 A1 | 12/2019 | Ford |
| 2020/0143363 A1 | 5/2020 | Schmidt |
| 2020/0153627 A1 | 5/2020 | Wentz |
| 2020/0211103 A1 | 7/2020 | Searson et al. |
| 2020/0226284 A1 | 7/2020 | Yin |
| 2020/0349639 A1 | 11/2020 | Mousseau |
| 2020/0387973 A1* | 12/2020 | Blankinship ......... G06Q 20/204 |
| 2021/0065160 A1 | 3/2021 | Butvin et al. |
| 2022/0084023 A1 | 3/2022 | Song |
| 2022/0138238 A1 | 5/2022 | Rege et al. |
| 2023/0322487 A1 | 10/2023 | Patel |
| 2024/0005393 A1 | 1/2024 | Haller et al. |
| 2024/0045989 A1 | 2/2024 | Chen et al. |
| 2024/0061873 A1 | 2/2024 | Rege et al. |
| 2024/0413972 A1 | 12/2024 | Mehta et al. |

FOREIGN PATENT DOCUMENTS

| CN | 102663650 | 9/2012 |
| EP | 0 554 083 | 8/1993 |
| EP | 0 919 942 | 6/1999 |
| EP | 1 028 401 | 8/2000 |
| EP | 1 988 501 | 11/2008 |
| GB | 1 322 809 | 7/1973 |
| KR | 10-2004-0078798 | 9/2004 |
| KR | 10-2013-0107394 | 10/2013 |
| RU | 2 181 216 | 4/2002 |
| WO | WO 94/012943 | 6/1994 |
| WO | WO 95/012857 | 5/1995 |
| WO | WO 99/046710 | 9/1999 |
| WO | WO 00/055778 | 9/2000 |
| WO | WO 00/065469 | 11/2000 |
| WO | WO 01/004821 | 1/2001 |
| WO | WO 01/039589 | 6/2001 |
| WO | WO 01/041355 | 6/2001 |
| WO | WO 01/084281 | 11/2001 |
| WO | WO 02/013047 | 2/2002 |
| WO | WO 02/071176 | 9/2002 |
| WO | WO 2004/114160 | 12/2004 |
| WO | WO 2005/022348 | 3/2005 |
| WO | WO 2005/124619 | 12/2005 |
| WO | WO 2006/099081 | 9/2006 |
| WO | WO 2007/004158 | 1/2007 |
| WO | WO 2008/021061 | 2/2008 |
| WO | WO 2008/147918 | 12/2008 |
| WO | WO 2009/117468 | 9/2009 |
| WO | WO 2013/009920 | 1/2013 |
| WO | WO 2013/066633 | 5/2013 |
| WO | WO 2014/088895 | 6/2014 |
| WO | WO 2014/137759 | 9/2014 |
| WO | WO 2018/144612 | 8/2018 |
| WO | WO 2020/146667 | 7/2020 |
| WO | WO 2023/081165 | 5/2023 |

OTHER PUBLICATIONS

U.S. Appl. No. 11/227,001, filed Jan. 18, 2022, Rege et al.

U.S. Appl. No. 11/379,821, filed Jul. 5, 2022, Butvin et al.

U.S. Appl. No. 12/705,489, filed Feb. 12, 2010, Bargoli et al.

U.S. Appl. No. 12/705,511, filed Feb. 12, 2010, Bargoli et al.

(56)                    References Cited

OTHER PUBLICATIONS

"A New Approach to Fraud Solutions", BasePoint Science Solving Fraud, pp. 8, 2006.
"ACS Company Birch & Davis Wins Texas CHIP Contract," PR Newswire, Section: Financial News, May 17, 2000, Dallas, TX, pp. 3.
Aharony et al., "Social Area Networks: Data Networking of the People, by the People, for the People," 2009 International Conference on Computational Science and Engineering, May 2009, pp. 1148-1155.
"An Even Better Solution to Financing Elective Surgery . . . ", Unicorn Financial, pp. 7, http://web.archive.org/web/20000816161359/http://www.unicornfinancial.com/, as downloaded Oct. 15, 2008.
"Authorizing Safety Net Public Health Programs," Hearing before the Subcommittee on Health of the Committee on Energy and Commerce, House of Representatives, One Hundred Seventh Congress, First Session, Serial No. 107-57, dated Aug. 1, 2001, 226 pgs.
An Expert System for Determining Medicaid Eligibility, Journal of Medical Systems, vol. 12, Nov. 5, 1988, in 10 pages.
Announcing TrueProfiler, http://web.archive.org/web/20021201123646/http://www.truecredit.com/index.asp, dated Dec. 1, 2002, 1 page.
Anonymous, "Credit-Report Disputes Await Electronic Resolution," Credit Card News, Chicago, Jan. 15, 1993, vol. 5, No. 19, p. 5.
Anonymous, "MBNA Offers Resolution of Credit Card Disputes," Hempstead, Feb. 2002, vol. 68, No. 2, p. 47.
Antonopoulos, Andreas M., "Mastering Bitcoin: Unlocking Digital Crypto-Currencies", O'Reilly, Dec. 2014, First Edition, pp. 282.
Barry, Ellen, "Life, Liberty, and the Pursuit of Lipo," The Boston Phoenix, News & Opinion, dated Apr. 6, 1998, as downloaded at http://weeklywire.com/ww/04-06-98/boston_feature_1.html (1 of 12) [Oct. 15, 2008 2:35:25 PM].
Belford, Terrence, "Technology Quarterly: Computers, Internet Speeds Credit Checks System Tailored for Doctors, Dentists," The Globe and Mail (Canada), Section: Report on Business Special Reports, p. C10, Mar. 18, 1997.
"Beverly Hills Man Convicted of Operating 'Bust-Out' Schemes that Caused More than $8 Million in Losses", Department of Justice, Jul. 25, 2006, 2 Pgs.
Bienkowski, Nik, "A New Tool for Portfolio Risk Management—Gold Bullion", Apr. 2003, pp. 6.
"Birch & Davis Wins Texas CHIP Contract," Birch & Davis Press Release, dated Jan. 4, 2000, 3 pgs., as downloaded from http://web.archive.org/web/20010304065515/www.birchdavis.com/txchip.htm (1 of 3) [Oct. 20, 2008 9:49:18 AM].
Boss, Shira J. "Elective Surgery Without the Plastic: Low-Interest Medical Financing Provides Alternative to Credit Cards," factiva, Crain's New York Business, 2 pgs., dated Jun. 22, 1998.
Broward County CAP Grant Application, as printed on Aug. 10, 2009, 41 pgs.
Burr Ph.D., et al., "Utility Payments as Alternative Credit Data: A Reality Check", Asset Builders of America, Inc., Oct. 5, 2006, pp. 1-18, Washington, D.C.
"Bust-Out Schemes", Visual Analytics Inc. Technical Product Support, Newsletter vol. 4, Issue 1, Jan. 2005, pp. 7.
Calnan, Christopher, "Tenet, Fair Isaac invest $20M in startup," MHT, Mass High Tech: The Journal of New England Technology, dated Jul. 23, 2007, 2 pgs.
Capps et al., "Recent Changes in Texas Welfare and Work, Child Care and Child Welfare Systems," Assessing the New Federalism, The Urban Institute, State Update No. 1, 24 pgs., Jun. 2001.
CAPStone Newsletter, Sep. 2001, 8 pgs., as downloaded from http://web.archive.org/web/20011213115738/www.capcommunity.hrsa.gov/Newsletter/Newsletter12.htm (1 of 8) [Oct. 18, 2008 2:39:47 PM].
Card Marketing, Use the Latest CRM Tools and Techniques, www.CardForum.com, vol. 5 No. 10, Dec. 2001.
Cheney, Karen, "Fix Your Nose, If You Wish, But Not With This New Loan," Money Magazine, vol. 27, No. 5, 1 pg., dated May 1, 1998.

CreditSesame; "FAQ's"; http://www.creditsesame.com/how-we-help/faqs/#cb printed Dec. 5, 2011 in 8 pages.
CreditSesame; "Promote Your Financial Responsibility to Get an Edge in Life"; http://www.creditsesame.com/credit-badge/ printed Dec. 2, 2011 in 1 page.
CreditToolkit, Digital Matrix Systems, as printed out Mar. 4, 2008, pp. 2.
"Credit Information Bureaus and 'CIBIL'", http://www.icicibank.com/cibil.html printed Aug. 22, 2012 in 3 pages.
"Consumers Gain Immediate and Full Access to Credit Score Used by Majority of U.S. Lenders", PR Newswire, ProQuest Copy, Mar. 19, 2001, p. 1.
"CreditCheck Monitoring Services," Dec. 11, 2000, pp. 1, lines 21-23.
"D&B Corporate Family Linkage", D&B Internet Access for U.S. Contract Customers, https://www.dnb.com/ecomp/help/linkage.htm as printed Dec. 17, 2009, pp. 1.
"Data Loss Prevention (DLP) Software", http://www.symantec.com/data-loss-prevention/ printed Apr. 8, 2013 in 8 pages.
"Data Protection", http://compliantprocessing.com/data-protection/ printed Apr. 8, 2013 in 4 pages.
"Debt Settlement: Watch Video on how to Pay Your Debt Faster", http://www.debtconsolidationcare.com/debt-settlement.html printed Jan. 9, 2013 in 6 pages.
DentalFinancing.com, "Financial services for patients and dental professionals,", 7 pgs., as downloaded from http://web.archive.org/web/20010607151954/www.dentalfinancing.com/dentist/index.asp (1 of 2) [Oct. 15, 2008 3:55:16 PM].
Dibartolomeo, Dan, "Portfolio Optimization: The Robust Solution," Prudential Securities Quantitative Conference, Dec. 21, 1993, pp. 8.
Dietz, Ellen, "Dental Office Management," 8 pgs., pp. 316-321, Jul. 16, 1999.
Downes et al., Dictionary of Finance and Investment Terms, Fifth Edition, Nov. 1, 1998, pp. 332-333.
Dymi, Amilda, Need for Leads Spurs Some Upgrades, Origination News—Special Report, May 1, 2008, vol. vol. 17, Issue No. 8, Pages p. 24, Atlanta, Copyright 2008 SourceMedia, Inc.
EFunds Introduces QualiFileSM, Deluxe Corporation, eFunds Press Release and Product Launch, Sep. 23, 1999, Milwaukee, WI.
Electronic Privacy Information Center, "The Fair Credit Reporting Act" 15 USC 1681 (1992), 10 pgs., as downloaded from http://epic.org/privacy/financial/fcra.html on Mar. 19, 2008.
Ellwood, Marilyn, "The Medicaid Eligibility Maze: Coverage Expands, but Enrollment Problems Persist, Findings from a Five-State Study," Mathematica Policy Research, Inc., Occasional Paper No. 30, 56 pgs., Dec. 1999.
Equifax Consumer Credit Report http://www.equifax.com/home/, as retrieved on Sep. 17, 2008.
Ettorre, "Paul Kahn on Exceptional Marketing," Management Review, vol. 83, No. 11, Nov. 1994, pp. 48-51.
Expensr.com http://www.expensr.com/, as retrieved on Sep. 17, 2008.
Experian Consumer Credit Report http://www.experian.com/, as retrieved on Sep. 17, 2008.
Experian, Custom Strategist and Qualifile from Funds, Jun. 2000, in 2 pages.
Experian, "Enabling e-business", White Paper, Jan. 2001, pp. 21.
Experian, "Instant Prescreen: Offer preapproved credit at the point of sale", Oct. 2000, pp. 2, http://www.cdillinois.com/pdf_file/instant_prescreen_ps.pdf.
Experian, "Experian Rental Payment Data," http://www.experian.com/rentbureau/rental-data.html printed Nov. 22, 2013 in 2 pages.
FamilySecure.com; "Identity Theft Protection for the Whole Family | FamilySecure.com" http://www.familysecure.com/, as retrieved on Nov. 5, 2009.
Fan et al., "Design of Customer Credit Evaluation System for E-Business", 2004 IEEE International Conference on Systems, Man and Cybernetics, 2004, pp. 392-397.
Felsenthal, Edward, "Health Costs; Managed Care Helps Curb Costs, Study Says," The Wall Street Journal, dated Aug. 12, 1991.
"Fictitious Business Name Records", Westlaw Database Directory, http://directory.westlaw.com/scope/default.asp?db=FBN-ALL&RS-W...&VR=2.0 as printed Dec. 17, 2009, pp. 5.

(56)          References Cited

OTHER PUBLICATIONS

"Fighting the New Face of Fraud", FinanceTech, http://www.financetech.com/showArticle.jhtml?articleID=167100405, Aug. 2, 2005.
"Financing Medical Procedures A Lucrative But Risky Business," Credit Risk Management Report, vol. 10, Issue 15, 2 pgs., dated Aug. 7, 2000.
Fisher, Joseph, "Access to Fair Credit Reports: Current Practices and Proposed Legislation," American Business Law Journal, Fall 1981, vol. 19, No. 3, p. 319.
"Fund Manager," Portfolio Management Software website, indexed into Google on Jan. 7, 2005, Retrieved Oct. 24, 2014 http://www.fundmanagersoftware.com/, http://www.fundmanagersoftware.com/help/gph_tp_pieasset.html, http://www.fundmanagersoftware.com/demo2.html.
Gilje, Shelby, "Credit Agency Moving Into Health Care," NewsRoom, The Seattle Times, Section: Scene, Mar. 22, 1995, pp. 3, http://web2.westlaw.com/result/documenttext.aspx?rs=WLW8.03&ss+CNT&rp=%2fWelc . . . .
Gionis et al., "Similarity Search in High Dimensions via Hashing", Sep. 7, 1999, pp. 518-529.
Giudici, Paolo, "Bayesian Data Mining, with Application to Benchmarking and Credit Scoring," Applied Stochastic Models in Business and Industry, 2001, vol. 17, pp. 69-81.
"GLBA Compliance and FFIEC Compliance" http://www.trustwave.com/financial-services.php printed Apr. 8, 2013 in 1 page.
Goldstein, Jacob, "The Newest Vital Sign: Your Credit Score," The Wall Street Journal, Health Blog, as viewed at http://blogs.wsj.com/health/2008/03/18/the-newest-vital-sign-your-cr, Mar. 18, 2008, pp. 3.
Gualtieri et al., "The Forrester Wave™: Big Data Streaming Analytics, Q1 2016", Forrester®, Mar. 30, 2016, pp. 14, https://www.sas.com/content/dam/SAS/en_us/doc/analystreport/forrester-big-data-streaming-analytics-108218.pdf.
Henry, M.D., Kimberly A., "The Face-Lift Sourcebook," Oct. 11, 2000, 3 pgs. (p. 207).
Herron, Janna, "Social Media-Based Credit Score?", http://www.bankrate.com/financing/credit-cards/social-media-based-credit-score/, posted Friday, Jan. 13, 2012, printed Nov. 22, 2013 in 2 pages.
ID Analytics, "ID Analytics® Consumer Notification Service" printed Apr. 16, 2013 in 2 pages.
Ideon, Credit-Card Registry that Bellyflopped this Year, Is Drawing some Bottom-Fishers, The Wall Street Journal, Aug. 21, 1995, pp. C2.
"Improving the Implementation of State Children's Health Insurance Programs for Adolescents Report of an Invitational Conference Sponsored by the American Academy of Pediatrics, Section on Adolescent Health," Pediatrics, Official Journal of the American Academy of Pediatrics, Section on Adolescent Health, Sep. 26-27, 1999, 9 pages.
IndicareTM, On-Line Patient Assistant Program, Website Users Manual, JBI Associates, LLC, Jan. 1997, pp. 17.
Kauffman et al., "Research Directions on the Role an Impact of ICT in Microfinance", Proceedings of the 43rd Hawaii International Conference on System Sciences, 2010, pp. 10.
Kent, Heather, "Huge declines in price as competition heats up in Vancouver's booming laser-surgery market," CMAJ, Oct. 5, 1999; 161 (7), pp. 857-858.
Lan, Joe, "The Top Portfolio Management Software," http://www.aaii.com/computerizedinvesting/article/the-top-portfolio-management-software, Includes Discussion thread, Fourth Quarter 2011, pp. 17.
Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.
Lavelle, Marianne, "Health Plan Debate Turning to Privacy Some Call for Safeguards on Medical Disclosure. is a Federal Law Necessary?," The National Law Journal, vol. 16, No. 39, dated May 30, 1994, as downloaded from http://web2.westlaw.com/result/.

LendingTree.com, "Lender Ratings & Reviews," http://web.archive.org/web/20091015043716/http://www.lendingtree.com/lender-reviews/, Oct. 15, 2009, in 21 pages.
Letter to Donald A. Robert from Carolyn B. Maloney, dated Oct. 31, 2007, pp. 2.
Letter to Donald A. Robert from Senator Charles E. Schumer, dated Oct. 11, 2007, pp. 2.
Letter to Harry C. Gambill from Carolyn B. Maloney, dated Oct. 31, 2007, pp. 2.
Letter to Harry C. Gambill from Senator Charles E. Schumer, dated Oct. 11, 2007, pp. 2.
Letter to Richard F. Smith from Carolyn B. Maloney, dated Oct. 31, 2007, pp. 2.
Letter to Richard F. Smith from Senator Charles E. Schumer, dated Oct. 11, 2007, pp. 2.
Li et al., "Automatic Verbal Information Verification for User Authentication", IEEE Transactions on Speech and Audio Processing, vol. 8, No. 5, Sep. 2000, pp. 585-596.
Littwin, Angela, "Beyond Usury: A Study of Credit-Card Use and Preference Among Low-Income Consumers", Texas Law Review, vol. 86, No. 3, pp. 451-506; Feb. 2008.
Lorette, Kristie, "How to Successfully Dispute Inaccuracies on Your Credit Report," http://web.archive.org/web/20110531184149/http://www.quizzle.com/blog/2011/03/how-to-successfully-dispute-inaccuracies-on-your-credit-report/, Mar. 25, 2011, in * pages.
Magid, Lawrence, J., Business Tools: When Selecting an ASP Ensure Data Mobility, Los Angeles Times, Los Angeles, CA, Feb. 26, 2001, vol. C, Issue 4, pp. 3.
Mathematica Policy Research, Inc., "1998 Health Care Survey of DoD Beneficiaries: Technical Manual," Jul. 1999.
McGovern, Celeste, Jayhawk Medical Acceptance. (Brief Article), Alberta Report, 1 pg., dated Aug. 23, 1999.
McLaughlin, Nancy H., "Homeless, pregnant and alone Dana Sides knows her baby is likely to come in a month, but she has no idea where she will go after leaving the hospital," NewsRoom, Greensboro News & Record (NC), Section: General News, dated Dec. 6, 2001.
"MediCredit Announces Major Investment from Medstone; Financing Will Enable Dramatic Expansion of Online Services," Business Wire, pp. 2, dated May 12, 2000.
MediCredit, Patient Financing, "Thought you couldn't afford Cosmetic Surgery?," 3 pgs., as downloaded from http://web.archive.org/web/19970601060333/http://www.medicredit.com/ (1 of 2) [Oct. 15, 2008 3:16:31 PM].
Medick et al., "German Agency to Mine Facebook to Assess Creditworthiness", Jun. 7, 2012, http://www.spiegel.de/international/germany/german-credit-agency-plans-to-analyze-individual-facebook-pages-a-837539.html printed Nov. 22, 2013 in 2 pages.
Menge, Falko, "Enterprise Service Bus", Free and Open Source Software Conference, 2007, pp. 6.
Merriam Webster's Collegiate Dictionary, 10th Edition, Jan. 1, 1993, p. 79.
MicroBilt, "PRBC Credit Reporting Agency—Payment Reporting Builds Credit," retrieved from http://www.microbilt.com/nontraditional-credit-report.aspx and corresponding "Sample Report," retrieved from http://www.microbilt.com/pdfs/PRBC%20Sample%20 Report%20(complete).pdf printed Nov. 21, 2013 in 8 pages.
Microfinance Africa, "Philippines: Microfinance Players to get Their Own Credit Info Bureau," Apr. 5, 2011, http://microfinanceafrica.net/microfinance-around-the-world/philippines-microfinance-players-to-get-their-own-credit-info-bureau/ printed Nov. 22, 2013 in 2 pages.
Mint.com, http://www.mint.com/ printed Sep. 18, 2008 in 2 pages.
MS Money Software by Microsoft http://www.microsoft.com/Money/default.mspx as retrieved on Sep. 17, 2008 in 1 page.
My ID Alerts, "Why ID Alerts" http://www.myidalerts.com/why-id-alerts.jsps printed Apr. 3, 2012 in 2 pages.
My ID Alerts, "How it Works" http://www.myidalerts.com/how-it-works.jsps printed Apr. 3, 2012 in 3 pages.
MyReceipts, http://www.myreceipts.com/, printed Oct. 16, 2012 in 1 page.
MyReceipts—How it Works, http://www.myreceipts.com/howItWorks.do, printed Oct. 16, 2012 in 1 page.

(56)            References Cited

OTHER PUBLICATIONS

"Name Availability Records", Westlaw Database Directory, http://directory.westlaw.com/scope/default.asp?db=NA-ALL&RS=W...&VR=2.0 as printed Dec. 17, 2009, pp. 5.

Newsroom, "CIGNA Report Withdrawn As Foe Sees Opening," Insurance Regulator, State Survey, Sep. 9, 1996, vol. 8, Issue 34, pp. 4.

"New for Investors: Asset Allocation, Seasoned Returns and More," Prosper, http://blog.prosper.com/2011/10/27/new-for-investors-asset-allocation-seasoned-returns-and-more/, Oct. 27, 2011, pp. 4.

Next Card: About Us, http://web.cba.neu.edu/~awatson/NextCardCase/NextCardAboutUs.htm printed Oct. 23, 2009 in 10 pages.

Organizing Maniac's Blog—Online Receipts Provided by MyQuickReceipts.com, http://organizingmaniacs.wordpress.com/2011/01/12/online-receipts-provided-by-myquickreceipts.com/ dated Jan. 12, 2011 printed Oct. 16, 2012 in 3 pages.

Pagano, et al., "Information Sharing in Credit Markets," Dec. 1993, The Journal of Finance, vol. 48, No. 5, pp. 1693-1718.

Partnoy, Frank, Rethinking Regulation of Credit Rating Agencies: An Institutional Investor Perspective, Council of Institutional Investors, Apr. 2009, pp. 21.

Paustian, Chuck, "Every Cardholder a King Customers get the Full Treatment at Issuers' Web Sites," Card Marketing, New York, Mar. 2001, vol. 5, No. 3, pp. 4.

Pennsylvania Law Weekly, "Discriminating Against Victims Admitting Domestic Abuse Can Lead to Denial of Insurance Coverage," vol. XVIII, No. 26, dated Jun. 26, 1996, 2 pgs., as downloaded from http://web2.westlaw.com/result/documenttext.aspx?rs=WLW8.

Phinisee, Tamarind, "Banks, FTC Step Up Efforts to Address Identity Theft", San Antonio Business Journal; San Antonio, Jul. 5, 2002, vol. 16, No. 24, pp. 5.

Planet Receipt—Home, http://www.planetreceipt.com/home printed Oct. 16, 2012 in 1 page.

Planet Receipt—Solutions & Features, http://www.planetreceipt.com/solutions-features printed Oct. 16, 2012 in 2 pages.

"Qualifying For Debt Settlement", http://www.certifieddebt.com/debt/settlement-qualifications.shtml printed Jan. 9, 2013 in 2 pages.

Quantix Software, "Investment Account Manager," available at https://www.youtube.com/watch?v=1UwNTEER1Kk, as published Mar. 21, 2012.

Quicken Online by Intuit http://www.quicken.intuit.com/, as retrieved on Sep. 17, 2008.

"Quicken Support", http://web.archive.org/web/20071231040130/http://web.intuit.com/support/quicken/docs/d_qif.html as archived Dec. 31, 2007 in 6 pages.

Ramaswamy, Vinita M., Identity-Theft Toolkit, The CPA Journal, Oct. 1, 2006, vol. 76, Issue 10, pp. 66-70.

RAP Interactive, Inc. and Web Decisions: Proudly Presents Live Decisions, A Powerful New Information and Technology Resource that Revolutionizes Interactive Marketing, downloaded from www.webdecisions.com/pdf/LiveDecisions_Bro.pdf, as printed on Aug. 13, 2007.

"Recognition and use by Appraisers of Energy-Performance Benchmarking Tools for Commercial Buildings," prepared by the Institute for Market Transformation, NYSERDA, Feb. 2003, pp. 6.

Repici et al., "The Comma Separated Value (CSV) File Format", http://creativyst.com/Doc/Articles/CSV/CSV01.htm, Creativyst, Inc., 2002, pp. 10.

"Resolve Debt for Less: With Help from Freedom Financial" http://www.debtsettlementusa.com/ printed Jan. 9, 2013 in 6 pages.

Roth, Andrew, "CheckFree to Introduce E-Mail Billing Serving," American Banker, New York, Mar. 13, 2001, vol. 166, No. 49, pp. 3.

Rubin, Rita, "Cosmetic Surgery On Credit, Finance plans let patients reconstruct now, pay later," The Dallas Morning News, 2 pgs., dated Sep. 10, 1988.

Screenshot for Investment Account Manager v.2.8.3, published at http://www.aaii.com/objects/get/1642.gif by at least Aug. 30, 2011 in 1 page.

SearchAmerica, "Payment Advisor Suite TM", Solutions, 2009, pp. 2.

Selz, Michael, "Lenders Find Niche In Cosmetic Surgery That Isn't Insured—But Since You Can't Repossess A Nose Job, Risks Aren't Restricted to the Patients," Wall Street Journal, New York, N.Y., Jan. 1997, p. A.1, 3 pgs.

"Settling Your Debts—Part 1 in Our Debt Settlement Series", http://www.creditinfocenter.com/debt/settle_debts.shtml printed Jan. 9, 2013 in 6 pages.

ShoeBoxed, https://www.shoeboxed.com/sbx-home/ printed Oct. 16, 2012 in 4 pages.

Simpson, Glyn, "Microsoft (MS) Money, MSMoney FAQ, Help and Information Pages", pp. 2, Copyright © Glyn Simpson 1998-2007, http://web.archive.org/web/20071018075531/http://money.mvps.org/faq/article/196.aspx.

"StarNet Financial, Inc. Acquires Proprietary Rights to Sub-Prime Underwriting System Through Strategic Alliance With TRAkkER Corporation", PR Newswire, Dallas, TX, Sep. 13, 1999.

State of Wisconsin, Division of Health Care Financing, Department of Health and Family Services: 1999-2001 Biennial Report, pp. 17-21.

Stein, Benchmarking Default Prediction Models: Pitfalls and Remedies in Model Validation, Moody's KMV, Revised Jun. 13, 2002, Technical Report #020305; New York.

Sumner, Anthony, "Tackling The Issue of Bust-Out Fraud", Experian: Decision Analytics, Dec. 18, 2007, pp. 24.

Sumner, Anthony, "Tackling The Issue of Bust-Out Fraud", e-News, Experian: Decision Analytics, pp. 4, [Originally Published in Retail Banker International Magazine Jul. 24, 2007].

Texas Department of Human Services, 1999 Annual Report, 60 Years of Progress, Medial Services 9P137, Publication No. DHS-600-FY99.

Thatlook.com, Cosmetic Surgery Financing, 3 pgs, as downloaded from http://web.archive.org/web/200001214113900/www.thatlook.com/cosmetic_surgery_financing.cfm (1 of 2) [Oct. 15, 2008 4:11:47 PM].

Thomas, David, "Report on Networks and Electronic Communications Newcourt Credit Turns to Extranet Services / A PC Connects To 1,200 Users At Once", The Globe and Mail (Canada), Section: Report on Business Special Report, Nov. 12, 1996, pp. 2.

TRAkkER Corporation website, trakkercorp.com, TRAkkER Software Description, May 26, 2000, available at http://web.archive.org/web/20000526234204/http://trakkercorp.com/page4.html.

TransUnion Consumer Credit Report http://www.transunion.com/, as retrieved on Sep. 17, 2008.

US Legal, Description, http://www.uslegalforms.com/us/US-00708-LTR.htm printed Sep. 4, 2007 in 2 pages.

Washington State Office of Public Defense, "Criteria and Standards for Determining and Verifying Indigency," dated Feb. 9, 2001.

Webpage printed from http://www.magnum.net/pdfs/RapUpBrochure.pdf as printed Mar. 3, 2008.

"We Eliminate Bad Debt", as printed from http://www.webcreditbureau.com/start/, dated Aug. 22, 2012, 1 Page.

"Web Site Fuels Elective Surgery Trend; The Complete Resource to Paying for Cosmetic Surgery, Laser Vision Correction and Cosmetic Dentistry," Business Wire, Apr. 7, 1999, pp. 2.

Wesabe.com http://www.wesabe.com/, as retrieved on Sep. 17, 2008.

White, Ron, "How Computers Work", Special 10th Anniversary, Seventh Edition, Que Corporation, Indianapolis, IN, Oct. 2003, pp. 23.

Wilson, Andrea, "Escaping the Alcatraz of Collections and Charge-Offs", http://www.transactionworld.net/articles/2003/october/riskMgmt1.asp, Oct. 2003.

Window on State Government, Susan Combs, Texas Comptroller of Public Accounts, Chapter 8: Health and Human Services, "Improve the Medicaid Eligibility Determination Process," 9 pgs., as downloaded Apr. 9, 2008 from http://www.window.state.tx.us/etexas2001/recommend/ch08.

Winsborough, William et al., "Automated Trust Negotiation", Conference: DARPA Information Survivability Conference and Exposition, DISCEX '00, Proceedings, vol. 1, Feb. 2000, pp. 15.

(56) References Cited

OTHER PUBLICATIONS

Wisconsin Department of Workforce Development, BadgerCare Medicaid Application Credit Report Authorization Form, dated Jun. 21, 2001, effective date, Jul. 1, 2001.

Wisconsin Department of Workforce Development, BadgerCare Medicaid Notification of Eligibility, dated Jul. 25, 2000, effective date, Jul. 1, 2000.

Wood, Greg, "Top Streaming Technologies for Data Lakes and Real-Time Data", http://blog.zaloni.com/top-streaming-technologies-for-data-lakes-and-real-time-data, Sep. 20, 2016 in 3 pages.

Zoot—Decision Engine, www.zootweb.com/decision_engine.html, as printed on Mar. 3, 2008.

Zoot—Pre-Built Standard Attributes, www.zootweb.com/credit_attributes.html as printed Mar. 3, 2008.

Official Communication in Australian Patent Application No. 2012281182, dated Jul. 8, 2014.

Official Communication in Australian Patent Application No. 2012281182, dated May 19, 2015.

Official Communication in Chinese Patent Application No. 201280041782.2, dated Mar. 4, 2016.

Official Communication in European Patent Application No. 12811546.6, dated Nov. 25, 2014.

Official Communication in European Patent Application No. 12811546.6, dated Sep. 18, 2015.

Official Communication in Indian Patent Application No. 490/DELNP/2014, dated Jun. 20, 2019.

Official Communication in Russian Patent Application No. 2014101674/08, dated Dec. 15, 2014.

International Search Report and Written Opinion for Application No. PCT/US2012/046316, dated Sep. 28, 2012.

International Preliminary Report on Patentability and Written Opinion for Application No. PCT/US2012/046316, dated Jan. 14, 2014.

Official Communication in Australian Patent Application No. 2013356451, dated Jun. 22, 2015.

Official Communication in Chinese Patent Application No. 201380006862.9, dated Aug. 2, 2016.

Official Communication in European Patent Application No. 13860724.7, dated May 21, 2015.

Official Communication in Russian Patent Application No. 2014127000, dated Dec. 23, 2015.

International Search Report and Written Opinion for Application No. PCT/US2013/072102, dated Apr. 18, 2014.

International Preliminary Report on Patentability and Written Opinion for Application No. PCT/US2013/072102, dated Jun. 9, 2015.

Official Communication in Australian Patent Application No. 2014203430, dated Aug. 15, 2015.

Official Communication in Chinese Patent Application No. 201480000626.0, dated Aug. 1, 2016.

Official Communication in European Patent Application No. 14733951.9, dated Sep. 11, 2015.

Official Communication in Russian Patent Application No. 2014127320, dated Jul. 5, 2016.

International Search Report and Written Opinion for Application No. PCT/US2014/019142, dated Jun. 20, 2014.

International Preliminary Report on Patentability and Written Opinion for Application No. PCT/US2014/019142, dated Sep. 17, 2015.

International Search Report and Written Opinion for Application No. PCT/US2017/048265, dated Dec. 5, 2017.

International Preliminary Report on Patentability in Application No. PCT/US2017/048265, dated Mar. 7, 2019.

Official Communication in Australian Patent Application No. 2018215082, dated Jan. 21, 2022.

Partial Supplementary European Search Report for Application No. EP12747205, dated May 14, 2020.

Extended European Search Report for Application No. EP12747205, dated Aug. 14, 2020.

Extended European Search Report for Application No. EP12747205, dated Feb. 11, 2022.

Official Communication in Indian Patent Application No. 201917029540, dated Jan. 7, 2022.

International Search Report and Written Opinion for Application No. PCT/US2018/016258, dated May 16, 2018.

International Preliminary Report on Patentability in Application No. PCT/US2018/016258, dated Aug. 15, 2019.

International Search Report and Written Opinion for Application No. PCT/US2020/012976, dated May 6, 2020.

International Preliminary Report on Patentability in Application No. PCT/US2020/012976, dated Jul. 22, 2021.

International Search Report and Written Opinion for Application No. PCT/US2022/048616, dated Mar. 14, 2023.

Provisional Application as filed in U.S. Appl. No. 60/168,272, filed Dec. 1, 1999 in 14 pages.

Provisional Application as filed in U.S. Appl. No. 60/168,276, filed Dec. 1, 1999 in 82 pages.

Provisional Application as filed in U.S. Appl. No. 60/213,367, filed Jun. 23, 2000 in 20 pages.

Application as filed in U.S. Appl. No. 09/653,595, filed Aug. 31, 2000.

Bogdanov et al., "Deploying Secure Multi-Party Computation for Financial Data Analysis", Financial Cryptography and Data Security: 16th International Conference, FC 2012, Kralendijk, Bonaire, Feb. 27-Mar. 2, 2012, Revised Selected Papers 16, pp. 57-64.

International Preliminary Report on Patentability in Application No. PCT/US2022/048616, dated May 16, 2024.

Al-Bassam, Mustafa, "SCPKI: A Smart Contract-Based PKI and Identity System", Abu Dhabi, UAE, Feb. 27, 2021, pp. 6.

Sakharova, Irina, "Payment Card Fraud: Challenges and Solutions", 2012 IEEE, ISI 2012, Jun. 11-14, 2012, Washington, D.C., USA, pp. 227-234.

* cited by examiner

100

INVISIBLE USER
No credit file linked to the user

— 102

ONLY CREDIT FILE
No tradelines, inquiries, or public records on credit file

— 104

UNSCORABLE
Credit history too short to generate a credit score

— 106

SCORABLE
Credit score available

— 108

200

Collect PII from the user and/or third-party databases — 202

Verify identity of the user using the PII — 204

Generate header data for a credit file — 206

Assign a PIN to the credit file — 208

Enroll in credit monitoring — 210

300

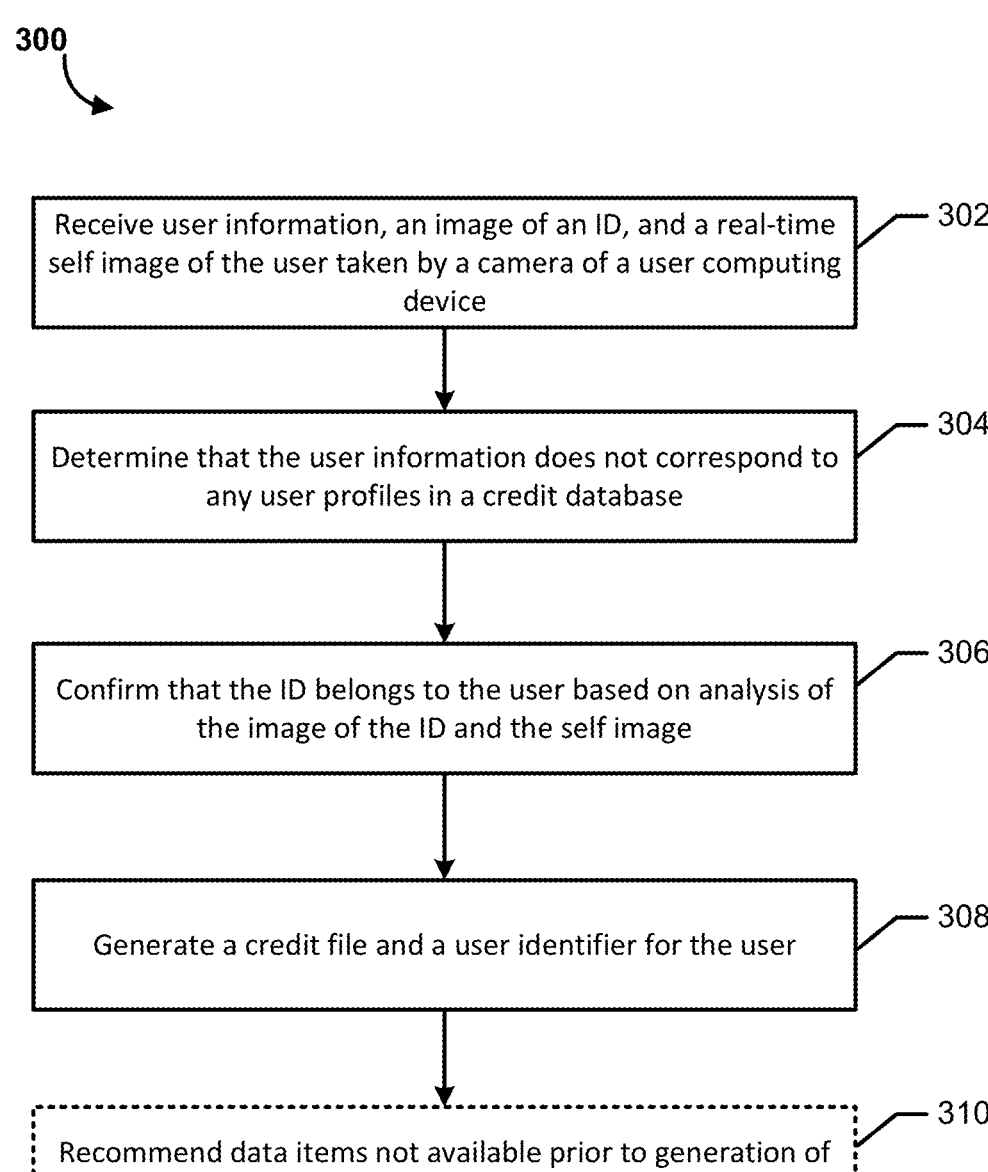

Receive user information, an image of an ID, and a real-time self image of the user taken by a camera of a user computing device ⎯ 302

Determine that the user information does not correspond to any user profiles in a credit database ⎯ 304

Confirm that the ID belongs to the user based on analysis of the image of the ID and the self image ⎯ 306

Generate a credit file and a user identifier for the user ⎯ 308

Recommend data items not available prior to generation of the credit file and/or user identifier ⎯ 310

502 — Determine there is no tradeline in a credit file

504 — Access transaction data of the user

506 — Determine that a category for a set of transactions is eligible as a tradeline in the credit file 508 — Set the earliest transaction date for the set of transactions as the inferred open date for the tradeline 510 — Add tradeline and inferred open date to the credit file of the user

600

602

Request access to transaction data of the user

604

Receive credential information from the user to access transaction data

606

Transmit an API token and credential information to a financial institution storing the transaction data

608

Access the transaction data of the user via an API channel associated with the financial institution

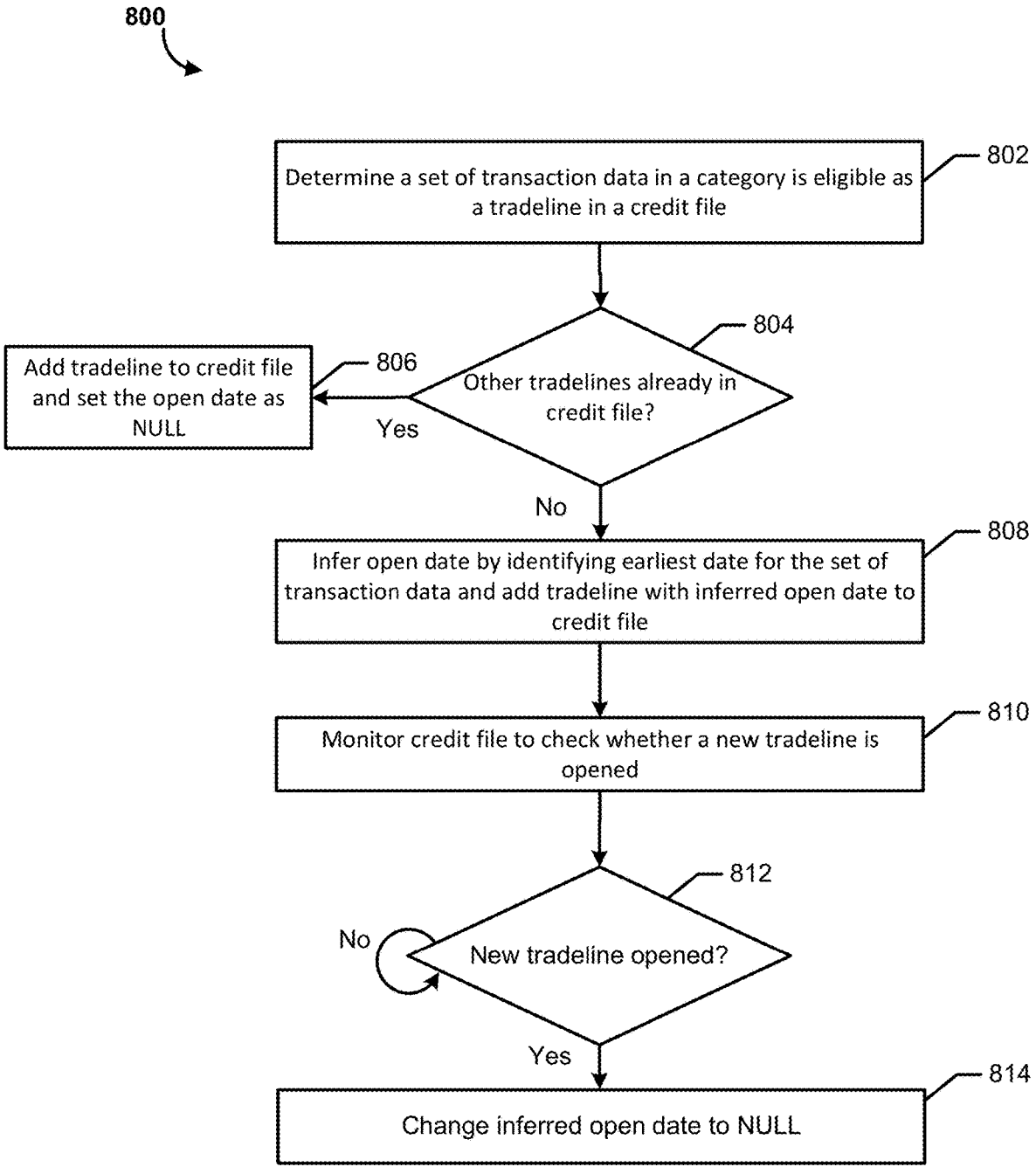

800

802 Determine a set of transaction data in a category is eligible as a tradeline in a credit file 806 Add tradeline to credit file and set the open date as NULL 804 Other tradelines already in credit file?

Yes

No

808 Infer open date by identifying earliest date for the set of transaction data and add tradeline with inferred open date to credit file 810 Monitor credit file to check whether a new tradeline is opened 812 New tradeline opened?

No

Yes

814 Change inferred open date to NULL

FIG. 8

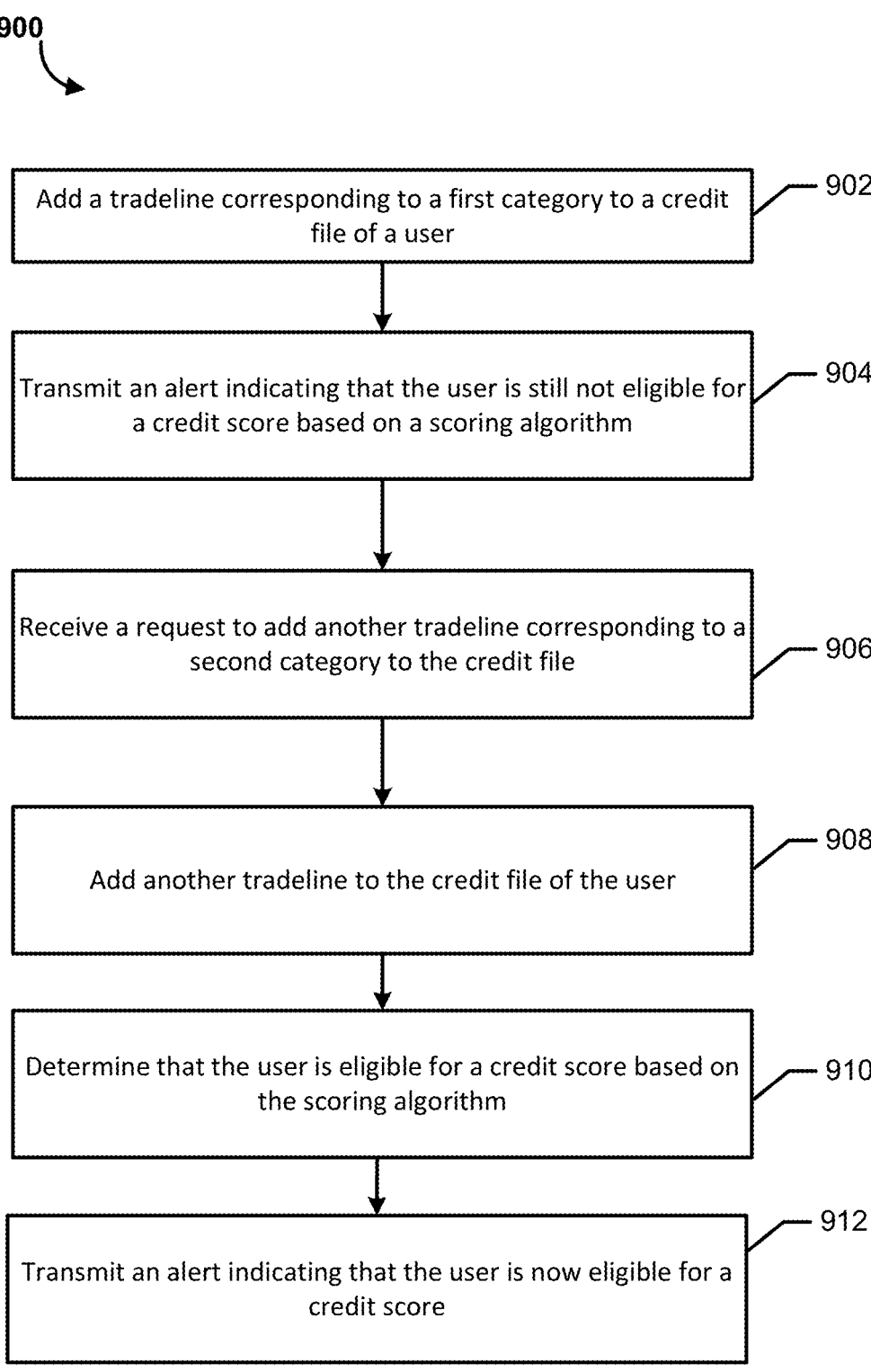

900

Add a tradeline corresponding to a first category to a credit file of a user — 902

Transmit an alert indicating that the user is still not eligible for a credit score based on a scoring algorithm — 904

Receive a request to add another tradeline corresponding to a second category to the credit file — 906

Add another tradeline to the credit file of the user — 908

Determine that the user is eligible for a credit score based on the scoring algorithm — 910

Transmit an alert indicating that the user is now eligible for a credit score — 912

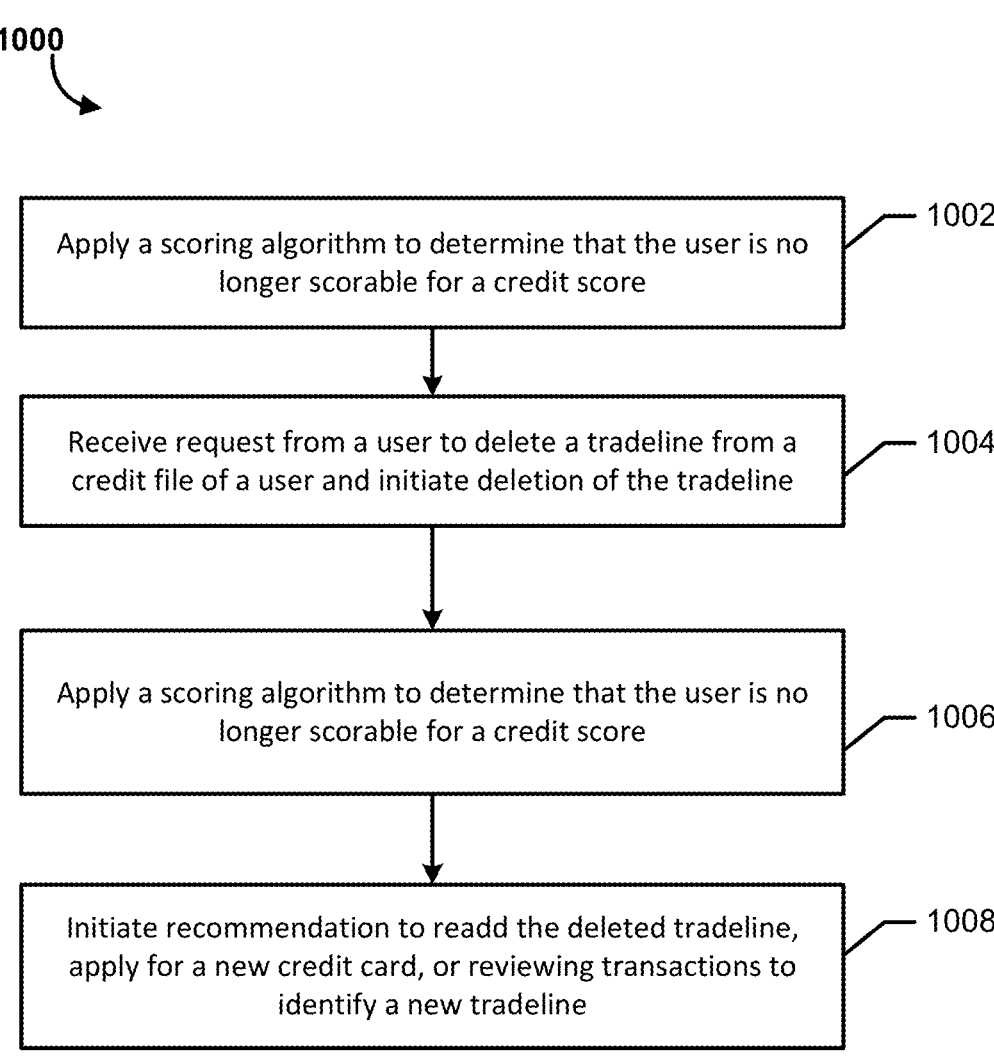

Apply a scoring algorithm to determine that the user is no longer scorable for a credit score — 1002

Receive request from a user to delete a tradeline from a credit file of a user and initiate deletion of the tradeline — 1004

Apply a scoring algorithm to determine that the user is no longer scorable for a credit score — 1006

Initiate recommendation to readd the deleted tradeline, apply for a new credit card, or reviewing transactions to identify a new tradeline — 1008

FIG. 10

METHODS AND APPARATUSES FOR GENERATING A NEW CREDIT FILE AND ADDING TRADELINES

CROSS-REFERENCE TO RELATED APPLICATIONS

This application claims priority to provisional U.S. Pat. App. No. 63/263,499, filed on Nov. 3, 2021 and provisional U.S. Pat. App. No. 63/302,479, filed Jan. 24, 2022, which are hereby incorporated by reference in their entirety.

BACKGROUND

Credit database technologies have provided consumers with a credit file that can be accessed by third party merchants to verify the creditworthiness of the consumers. However, individuals without a credit file have a difficult time establishing such a credit file using traditional credit database technologies. Traditional credit database technologies do not have features enabling individuals to start a new credit file directly with the credit bureau. New credit files are typically created based on a new account opening or an inquiry by a third-party lender, creditor or other account provider. For example, these credit files may be initially established in response to an inquiry by a third party requesting a credit file for an individual that desires to establish a credit account or loan, and a credit file is generated for the individual that includes the inquiry (e.g., such as a hard inquiry) that negatively affects the credit worthiness of the individual.

SUMMARY

The present disclosure describes systems and methods for providing credit files to consumers without credit files and/or to help consumers become scorable (e.g., have a credit file with sufficient information that it can be used to generate a credit score) when their credit file is without a tradeline or if their credit file does not have sufficient history of credit. Aspects of the present disclosure relate to improved systems and methods for causing a record of an individual to be generated and stored in a regulated credit database of a credit bureau, which may be initiated directly by the individual without applying for a loan, credit or other third party account which could negatively affect the credit worthiness of the individual.

In existing credit file creation data flows, new credit files are typically generated based in part on real life in-person inquiries at a third-party's location, such as a financial institution, lender or creditor with which the person is establishing or attempting to establish an account. In these cases, a human (such as an employee of a bank or merchant) typically receives a physical copy of a government issued identity document ("ID") and confirms that the government issued ID matches the person sitting in front of them. Traditional credit file database technologies do not include automated ID verification of an image or video stream captured by a user's device or comparing such an image or video with a government issued ID for the purposes of generating a new credit file.

Aspects of the present disclosure enable an individual to move from having no credit file to having a credit file without taking on debt, as well as going from having no credit score to becoming scorable by a credit scoring algorithm potentially in minutes without taking on debt. The user can go from having no credit file to becoming scorable all within the same browsing session.

Some embodiments include a computer-implemented method comprising: receiving Personal Identifiable Information ("PII") and a digital image of an identification document ("ID") from a computing device of a user, wherein the PII includes a name and an address of the user; determining that ID information extracted from the digital image of the ID corresponds to the PII provided by the user; determining that the PII does not correspond to any credit files in a credit file database; confirming that the ID belongs to the user based at least in part on analysis of a picture of the user captured by a camera of the computing device; generating a personal identifier and a credit file for the user; accessing transaction data of the user via an API communication channel established with one or more databases associated with a third-party entity storing the transaction data; identifying a new tradeline from a set of transactions within the transaction data that collectively relate to a tradeline category; and initiating addition of the new tradeline to the credit file of the user, wherein the new tradeline identifies the tradeline category.

In some embodiments, the digital image is captured by the camera of the computing device.

In some embodiments, the ID is a passport, a driver license, or a government issued ID of the user.

In some embodiments, the method further comprises recommending one or more data items to the user for which the user was not eligible prior to the generation of the credit file.

In some embodiments, the one or more data items comprise a feature to provide additional information related to improving the user's credit file.

In some embodiments, the one or more data items comprise a feature to monitor the credit file.

In some embodiments, the method further comprises providing the personal identifier to a third party for identity verification of the user by the third-party.

In some embodiments, the method further comprises verifying that the name and a social security number provided by the user via the computing device matches a name and social security number in at least one of the databases, wherein the at least one of the databases includes a government database.

Some embodiments include a system comprising: memory; and one or more hardware processors configured to: receive Personal Identifiable Information ("PII") and a digital image of an identification document ("ID") from a computing device of a user, wherein the PII includes a name and an address of the user; determine that ID information extracted from the digital image of the ID corresponds to the PII provided by the user; determine that the PII does not correspond to any credit files in a credit file database; confirm that the ID belongs to the user based at least in part on analysis of a picture of the user captured by a camera of the computing device; generate a personal identifier and a credit file for the user; and recommend one or more data items to the user for which the user was not eligible prior to the generation of the credit file.

In some embodiments, a credit score of the user was not available prior to the generation of the credit file.

In some embodiments, the credit file, upon generation of the credit file, includes does include data that only impacts the credit file negatively, wherein the data does not include a credit inquiry.

In some embodiments, the one or more hardware processors are further configured to: receive authorization to access transactions by the user from a financial institution account of a financial institution; access the transactions in the financial institution account; infer an account between a third-party entity and the user by applying an account identification rule to the transactions; and add the inferred account to the credit file of the user.

In some embodiments, the one or more hardware processors are further configured to determine whether the PII meets one or more threshold minimum requirements for generating the credit file for the user.

In some embodiments, the one or more hardware processors are further configured to determine that the name and the address of the user correspond to a name and address of one or more user profiles in one or more third-party databases.

In some embodiments, the personal identifier is specific to the credit file for the user, is not included in the ID information, and is not included in the PII provided by the user.

In some embodiments, the one or more data items comprise a feature to add accounts to the credit file of the user.

In some embodiments, the one or more hardware processors are further configured to: receive a selection of the feature to add accounts to the credit file of the user; add one or more accounts to the credit file of the user; generate a credit score of the user based on the credit file that includes the added one or more accounts; and provide the credit score to the user.

Some embodiments include a non-transitory computer storage medium storing computer-executable instructions that, when executed by one or more processors, causes the one or more processors to perform operations comprising: determine that a credit file of a user does not include any tradelines by accessing the credit file of the user; access transaction data of the user via an API communication channel established with one or more databases associated with a third-party entity storing the transaction data; identify a new tradeline for a set of transactions within the transaction data that collectively relate to a tradeline category; establish an earliest transaction date for the set of transactions as an inferred open date for the new tradeline; and initiating addition of the new tradeline to the credit file of the user, wherein the new tradeline identifies the tradeline category and the earliest transaction date.

In some embodiments, the operations further comprise: receiving credentials from the user for directly accessing, by proxy on behalf of the user via an Application Programming Interface (API), the transaction data associated with the user stored in one or more databases of a third-party entity; and transmitting at least an API token associated with the third-party entity and the credentials to the one or more databases of the third-party entity.

In some embodiments, the operations further comprise identifying a set of transactions within the transaction data that collectively relate to the tradeline category by: categorizing individual transactions of the transaction data into a plurality of categories based on recipients of the individual transactions; and determining that a first category of a set of the transaction data is eligible to be added as a tradeline in the credit file.

BRIEF DESCRIPTION OF THE DRAWINGS

FIG. 3A includes a flow diagram for confirming the identity of the individual, generating a credit file for the individual, and recommending new data items for the individual according to some embodiments.

FIG. 8 provides a flow diagram for inferring and nulling open dates according to some embodiments.

FIG. 9 provides a flow diagram for adding tradelines until the user has a credit score according to some embodiments.

FIG. 10 provides a flow diagram for alerting the user that the user is no longer scorable after deletion of a tradeline according to some embodiments.

DETAILED DESCRIPTION

There are 26 million credit invisible adults, or invisibles (e.g., individuals without credit files). A credit system as described herein can provide consumers features to enable them to initiate a credit bureau system to generate a credit file and to then enable the user to allow the system to add a tradeline to the credit file, such as by applying for a new tradeline or adding existing tradelines that show good payment history in transaction data to the credit file. Moreover, these invisibles can gain access to financial services and/or products that were not previously available prior to the generation of the credit file.

Systems and methods described herein improve on traditional credit systems by providing products and features for invisible consumers to add tradelines through assessment of transaction data, apply for curated credit card offers, and provide steps to improve the likelihood that their first credit score will be an improved credit score instead of an initial credit score using traditional systems with an already negative impacting inquiry on the credit file.

In some embodiments, the credit system can target certain focus groups. The focus groups can include invisibles over the age of 25, young adults, and/or individuals new to the United States (or other country in which a relevant credit bureau operates). The first focus group, invisibles that are over 25 years old, can include individuals who may have failed to make credit a priority early on, are unreceptive to credit features, or have actively opted out of such credit features, and thus may be a focus group that has, at a later stage in life, understood the importance of credit. The second focus group can include young adults who know little about the credit system where willingness to access and create credit can be less of a barrier. The third focus group can include individuals who are new to the United States, such as recent immigrants who have credit from a prior country but not in the United States, and may not have a social security number or credit in the new country where they are residing.

Example Illustrative Flow From Invisible User to Scorable

Figure 1:
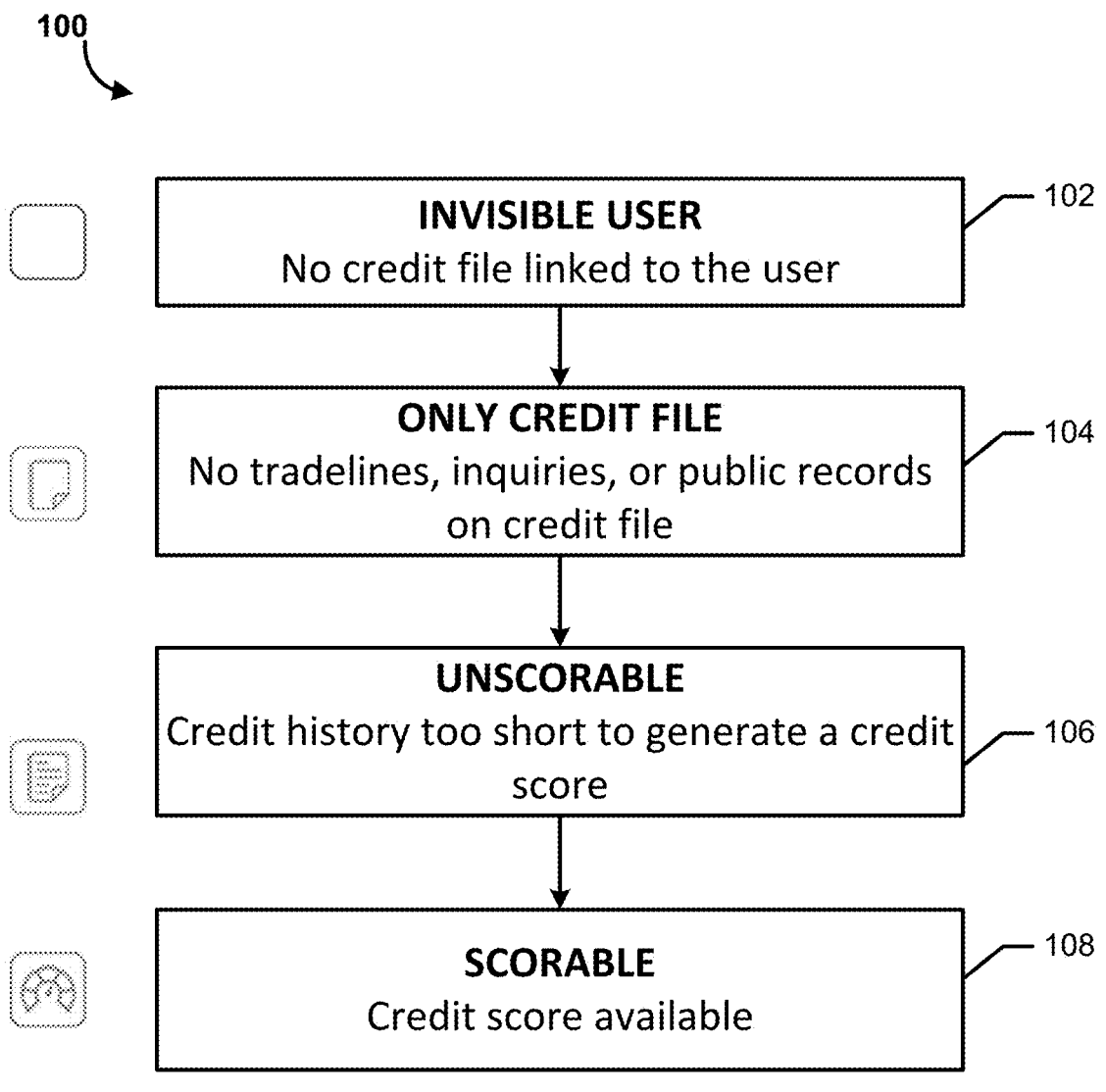
FIG. 1 illustrates a flow chart depicting a user's experience for growing the user's credit history according to some embodiments.

FIG. 1 illustrates a flow chart 100 on the user's experience or stages for growing the user's credit history according to some embodiments. Initially at block 102, the user is an invisible, without a credit file. At this stage, the credit system can generate a credit file for the user, as noted herein.

In some embodiments, the individual can transition to the "Only Credit File" phase at block 104 where the individual has a credit file (such as at least credit "header" information including identifying information for the individual), but no tradelines, inquiries, or public records on their credit file or report. In time, more accounts, tradelines, inquiries, and public records can be added to the credit file. For example, transactions of financial institutions can be assessed to identify new accounts that show timely payment to add to the credit file or a new tradeline can be opened by the user. Thus, the user can help a credit bureau to populate a credit file (e.g., add tradelines) by providing access to transactions of financial institutions. For example, the credit system can display a user interface to request credential information for an account of a user for a financial institution and the credit system can access transaction data via a secure communication channel with the financial institution system or server.

In some embodiments, the account can include transactions by the user with a financial institution, such as a bank. The credit system can receive authorization to access transactions by the user and access the transactions in the financial institution account. The credit system can infer an account between a third-party (such as a utility company, a landlord, or a streaming service) and the user by applying an account identification rule to the transactions in the financial institution account. The credit system can recommend adding the inferred account to the credit file of the user, and thus, improve the status of the credit file.

In some embodiments, with the addition of the inferred account, the individual can transition to the "unscorable" phase at block 106 where the credit history includes some data, such as a few trade lines, but the credit file is still too short for a credit score to be generated. As time progresses or as the credit system adds more tradelines for the user (e.g., recommending new credit cards, identifying more accounts in the user's transaction data to add), the credit file can expand, and the individual can transition to the "scorable" phase at block 108 where a credit score can be generated for the individual.

In other embodiments, as will be further discussed below, consumers that are in the "only credit file" category may be provided an opportunity to generate their first credit score right away. Advantageously, using approaches that will described further below, it is possible for someone who is new to credit to also see their first credit score in the same user session (e.g., in the same browsing session on a website) in order to go from having no credit file to becoming scorable in a matter of minutes in some instances. The credit system can display user interfaces that collect user information (e.g., user input, pictures of user identification documents or the user themselves), verify the user, open a credit file, recommend applying for a new credit card, connect to the user's financial institution account to access transaction data in order to identify accounts to add, apply a scoring algorithm, and provide the user's credit score all within the same browsing session.

The credit system can generate a graphical user interface and/or graphical user interface data that optimizes valuable user interface real estate. For example, the credit system can provide a handful of user interfaces to gather information from the user (such as personal information, images of documents or the user, credentials for user accounts). The credit system can generate a credit file, add tradelines (such as via new credit cards or by assessing transaction data to identify tradelines that can be added to the credit file), and apply a scoring algorithm to generate a credit score, all of which could be performed within the same browsing session on a website.

Such an improved display interface allows a user to more quickly access certain functions, such as enabling the credit system to access of the transaction data from third party financial institutions, storing such transaction data and categorizing the transaction data to identify a set of data corresponding to a category that is eligible to be added as a new tradeline into a credit file, in order to obtain a credit score. The user interfaces 706 and 708 (described in further detail below) illustrate visual indicators that include selectable functions (e.g. a button, a summary list, text, and/or radio button) or inputs of credentials that initiate an API communication channel with the financial institution to access the transaction data (described in further detail herein). The API communication channel is established between the credit system and the financial institution by sending the user's credentials and an API token to the financial institution.

Moreover, the user is saved from paging through multiple screens of financial institution websites that have their transaction data with websites corresponding to credit data, such as a credit bureau website, where the user interfaces described herein can enable the credit system to access relevant transaction data in response via a single user interface and a few clicks of the user. The credit system can display on their website options for the user to select which would connect the credit system with financial institution systems, separate from the communication channel between the credit system and the user.

Another advantage is that the consumer may be able to reach scorable status in this manner without taking on any debt. Accordingly, the consumer could start a browser session at the invisible stage or at the "only credit file" or "unscorable" stage and arrive at the scorable stage in the same browser session, based at least in part on the system adding tradelines to a credit file from an automated analysis of the consumers' transaction data (similar to credit boosting features described in co-owned U.S. application Ser. No. 16/445,647, for which the entirety of the disclosure is hereby incorporated herein by reference).

Figure 2:
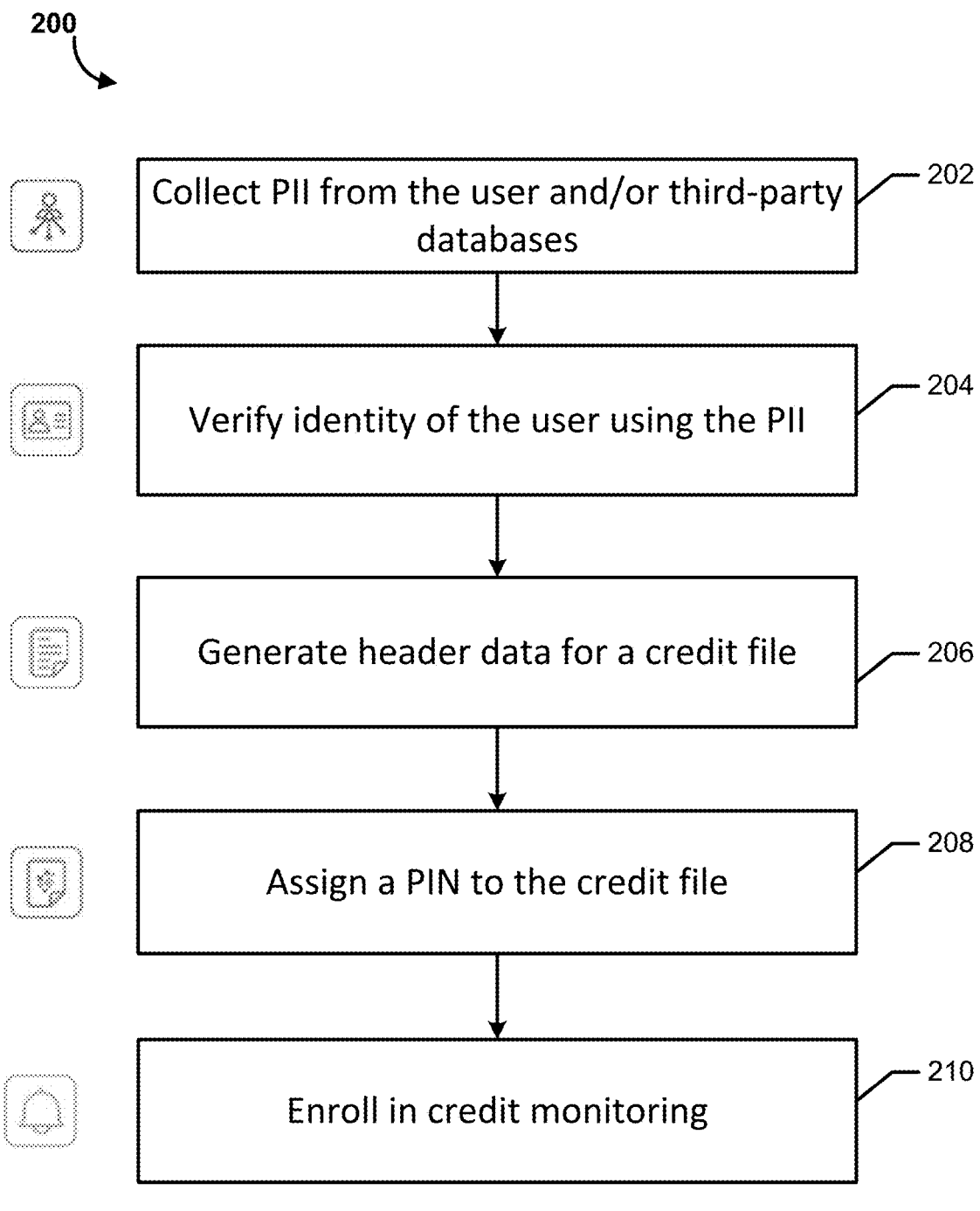
FIG. 2 illustrates a flow diagram for a credit system to generate a new credit file for the user and enroll the user in credit monitoring according to some embodiments.

Example Illustrative Flow to Generate a Credit File and Enroll in Credit Monitoring FIG. 2 illustrates a flow diagram 200 for the credit system to generate a new credit file for the user and enroll the user in credit monitoring according to some embodiments. At block 202, the credit system can collect Personal Identifiable Information ("PII") from the individual, which may include a name, address, social security number (or other government-issued identification number), and/or other PII. The credit system can display a user interface on a computing device of a user, wherein the user interface includes a request for PII information. For example, the credit system can request the individual to fill out a form of questions and answers requesting PII and/or can request upload of a digital image, such as an image of the user's driver's license, passport, or other government issued Identification Document ("ID").

In some embodiments, the credit system can access a third party database for user information (such as a credit file database, a government database, or a public records database). The credit file database can include credit files of individuals. The credit system can check whether the individual has a credit file by checking whether a credit file exists for the individual, such as by looking up the user's name, address, birth date, social security number and/or other provided information.

In some embodiments, if no credit file exists for the individual in the credit file database, the credit system can initiate the workflow to generate a new credit file for the individual. At block 204, the credit system can verify the identity of the individual. The credit system can verify the identity of the individual based on the received PII information. The credit system can check whether the name of the individual has been associated with the address by checking external sources. For example, the credit system can access third party databases to see if the individual "John Smith" lives on "123 Dale St., Irvine, CA 12345." The individual may have provided their legal name and address to other third parties, such as banks or car dealerships, or other third parties in the past and/or for other reasons, and the third parties may either have made this information available in public records or accessible by the credit system.

In some embodiments, the credit system can validate all or a subset of the individual's provided PII, such as a social security number. The credit system can access a government database. For example, the government database can include profiles of individuals, each profile including a name, birthdate, and social security number, in some instances. The credit system can verify that the individual's PII matches a profile stored in the government database, such as by matching the name, birth date, and social security number provided by the individual with a profile. The credit system can verify that the name and social security number provided by the user via the computing device matches the name and social security number in the government database.

In some embodiments, the credit system can further check whether certain requirements are met, such as whether the individual is at least 18 years old, before generating a credit file for the user.

In some embodiments, at block 206, the credit system can generate a header file. At block 208, the credit system can assign a PIN to the credit file or header file. In some embodiments, generation of the header file includes generation of a personal identifier or PIN (which may be an abbreviation of Personal Identification Number, but may be numeric, alphanumeric or in another format). In some embodiments, the PIN may be a unique number or alphanumeric string within the credit system that has not been assigned previously to any other individual, such that it uniquely represents the individual and/or the individual's credit file. In some embodiments, the header file or header portion of a credit file may include PII regarding the individual. For example, as is known with respect to credit files maintained by credit bureaus in the United States, header data associated with a credit file may include name, address, date of birth, and social security number, and may also include phone numbers, a driver's license number and/or other personal information. The header data would typically not include tradelines themselves, which is one way that header data is distinguished from other portions of the credit file (e.g., the header data may be used for identification purposes but is not itself indicative of credit-worthiness).

In some embodiments, the credit system can generate the personal identifier via a PIN-creation Application Programming Interface ("API"). The credit system can receive PII as noted above. The credit system can check for minimum requirements, such as whether the individual is at least 18 years old, whether PII was provided (such as a name, address, date of birth, and social security number), and/or the like.

In traditional systems, when a person without a credit report provides PII to a third-party merchant or lender, a credit report can ultimately be created (e.g., from a credit inquiry to a credit bureau being initiated by the lender and the bureau then adding record of the inquiry to a new credit file), but the new credit file can include a negative impact on the person's ability to be credit scorable because of the inquiry itself (e.g., the inquiry negatively impacts the credit file). In contrast, the credit system described herein can advantageously provide identity verification to be completed online and create a credit file without a negative inquiry on the new credit file.

Moreover, the credit system can provide features that were not previously available to the user before the credit file existed and allow the consumer to establish a credit report with tradelines, instead of a new credit file with negative credit score impacts as there was no inquiry stored by the credit bureau. Furthermore, the credit system can provide a curated experience and additional information to help build the consumer's newly created credit file. The credit system can then access the PIN-creation API to generate a personal identifier for the individual. The personal identifier can be used to activate the credit file for the individual.

In some embodiments, the credit system can transmit the PIN to third parties for the third parties to verify individuals applying for their goods and services. The third parties can use the PIN to perform certain features, such as to request or pull a credit file of an individual. In some embodiments, the credit system can store the correlation between the individual's identity information and the PIN internally, such as by assigning the PIN to the user's credit file or credit record. The credit system can perform identity verification for other third parties that want to verify the identity of an individual or perform credit monitoring of the individual via the PIN.

The credit system can recommend features that were not previously available to the individual without a credit file. For example, at block 210, the credit system can enroll the user in credit monitoring, provide recommendations to improve the credit file in order to get a credit score, add existing tradelines to the credit file, recommend tradelines or credit cards based on a match of the information available in the credit file, and/or the like. Some embodiments of the credit system can include features disclosed in U.S. application Ser. No. 16/445,647 and Ser. No. 16/685,481, which are hereby incorporated by reference in their entirety, which include features to improve a credit file.

Figure 3B:
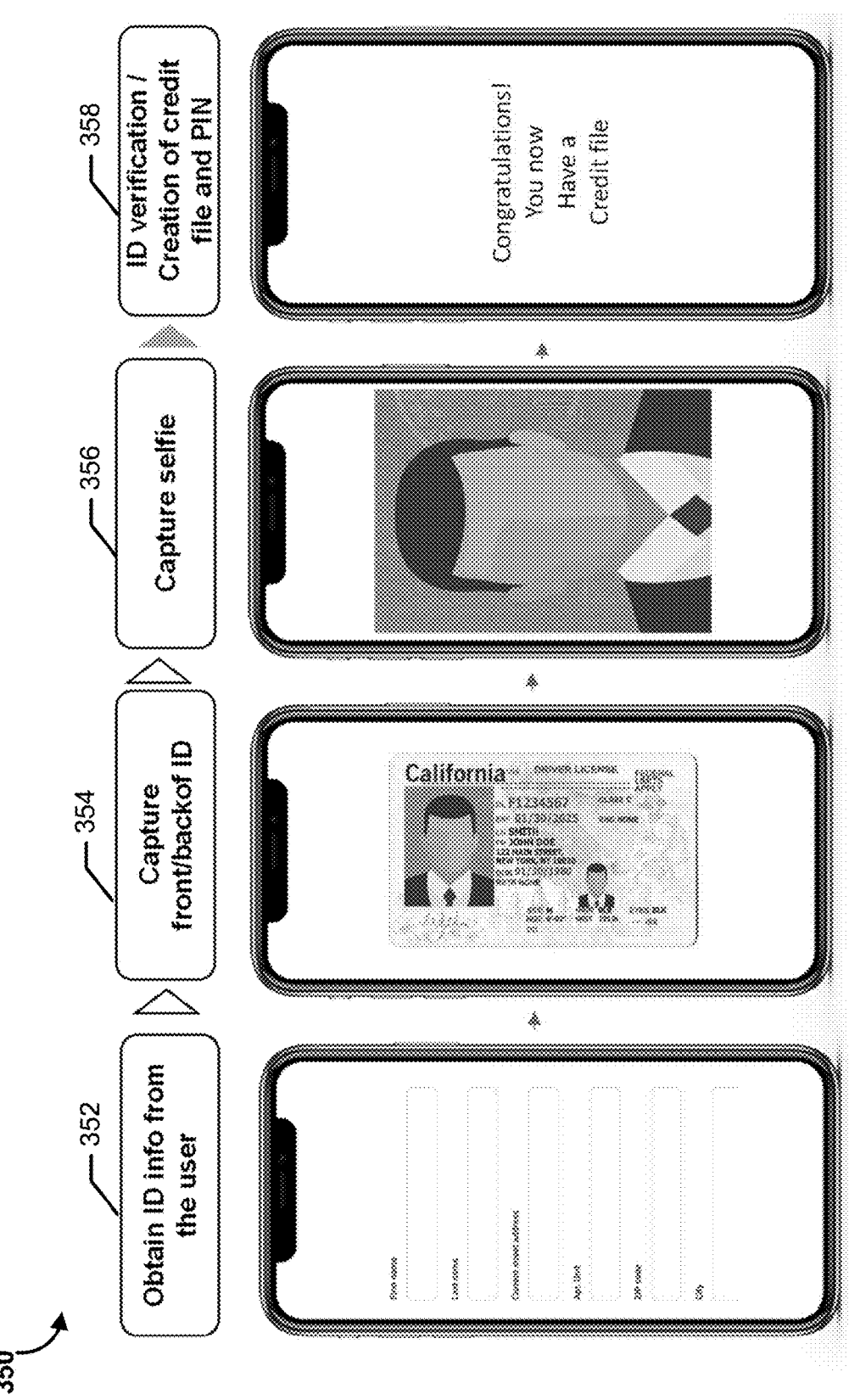
FIG. 3B includes user interfaces for confirming the identity of the individual and generating a credit file for the individual according to some embodiments.

Example Illustrative Flow to Confirm the Identity of an Individual, Generate a Credit File and Recommend Data Items FIG. 3A includes a flow diagram 300 for confirming the identity of an individual, generating a credit file for the individual, and recommending new data items for the individual according to some embodiments. FIG. 3B includes user interfaces 350 for confirming the identity of the individual and generating a credit file for the individual according to some embodiments.

In some embodiments, the credit system can verify that the individual that is applying for the credit file is actually the individual. At block 302, the credit system can request user information, an image of an ID, and/or a real-time self-image of the user taken by a camera of a user computing device.

In some embodiments, the credit system can display a user interface, such as user interface 352, requesting information on an individual, such as a name or address. The credit system can display another user interface (or within the same user interface) requesting further identity verification information, such as a birthdate and social security number, and offer to verify the identity of a consumer. The credit system can request an image of an Identification Document of the user such as via user interface 354. The credit system can access or initiate access to a camera of a user computing device, such as the camera of a mobile phone. The credit system can request an image of the front and back side of an ID, such as a driver's license.

In some embodiments, the credit system can request a selfie (e.g., a user taking a photo or picture of his or her own face), such as a live image of the individual, to be uploaded. The selfie image can be captured by a camera of the individual's computing device, such as a mobile phone. For example, the credit system can initiate display of user interface 356 for capturing a selfie image of the user. The credit system can display a user interface to initiate the capture of a selfie image or a life stream video. The credit system can access the camera and automatically or in response to a user interaction with a user interface element, initiate the capture of the image or the real-life stream video.

At block 304, the credit system can determine that the user information does not correspond to any user profiles in a credit database. For example, the credit system can compare the user information (such as social security number, name, address, etc.) received in block 302 with user profiles in a credit database. The credit system can determine that the user information does not correspond to any user profiles in the credit database and conclude that the user does not have a pre-existing credit file.

At block 306, the credit system can confirm that the ID belongs to the user based on an analysis of the image of the ID and the selfie image. The credit system can compare the digital image of the government issued ID with the captured selfie image to determine whether the images substantially correspond to the same individual. If the images substantially correspond above a certain predetermined threshold, the credit system can determine that the individual in the government issued ID is the same person as the individual in the captured selfie image.

In some embodiments, the steps for authenticating that a user really is the person shown on a government-issued identification document (such as based on receiving and analyzing image data of the user and the document) may be performed by a partner service or other third party system that communicates with the credit system (and optionally with the user's device), such as via an API.

In some embodiments, the credit system can extract ID information from the ID. For example, the credit system can perform Optical Character Recognition (OCR) on a driver's license to identify a full name, driver's license number, address, and/or the like. Such information can be used in features described herein, such as verifying this information with user information provided by the user or information in third party databases.

In some embodiments, the credit system can request a live video stream of an individual and/or a video clip, and the live video stream/video clip is assessed to determine whether the individual in the live video stream/video clip substantially corresponds to the individual in the government issued ID.

In some embodiments, the credit system can process the selfie image or video stream with the government issued ID through an algorithm to determine whether the individual in the selfie image or video stream substantially corresponds to the government issued ID. The algorithm can include a machine learning algorithm that is trained to determine whether two images, or an image and a video stream, represent the same individual. The algorithm can be performed by identifying geometry of the face of the individual in the selfie image/video stream and the geometry of the face of the individual in the government issued ID, and comparing the two identified geometries.

Systems and methods described herein include training a machine learning network to compare a government issued ID with a selfie. The machine learning network can be trained to compare a picture of an ID with a live video stream or a picture of the user via a camera on the user's mobile device. The machine learning algorithm can be trained using historical information that include pictures of IDs and selfies taken of users, and results of whether the pictures of the IDs in-fact correspond to the selfies taken of the users.

Training of models (described above and herein), such as artificial intelligence models is necessarily rooted in computer technology, and improves on models by using training data to train such models and thereafter applying the models to new inputs to make inferences on the new inputs. Here, the new inputs can be a front and back picture of a government issued ID of a new consumer and a selfie taken of the consumer. The trained machine learning model can determine whether the user is in-fact the same person on the government issued ID.

Such training involves complex processing that typically requires significant processor computing and extended periods of time with large training data sets, which are typically performed by large server systems. Training of models can require logistic regression and/or forward/backward propagating of training data that can include input data and expected output values that are used to adjust parameters of the models. Such training is the framework of machine learning algorithms that enable the models to be applied to new data (such as new consumer data) and make predictions that the model was trained for based on the weights or scores that were adjusted during training. Such training reduces false positives and increases the performance of correct user authentication.

At block 308, the credit system can generate a credit file and/or a personal identifier (such as a PIN). The credit system can display a notification to the user, such as user interface 358, that indicate completion of ID verification, creation of a credit file, and/or creation of a personal identifier or PIN.

At block 310, the credit system can recommend data items that were not previously available to the user prior to the generation of the credit file and/or the personal identifier. For example, the credit system can enroll the user in credit monitoring, provide recommendations to improve the credit file in order to get a credit score, add existing tradelines to the credit file, recommend tradelines or credit cards based on a match of the information available in the credit file, and/or the like.

Example Illustrative Flow for New to Credit Pin Creation

Figure 4A:
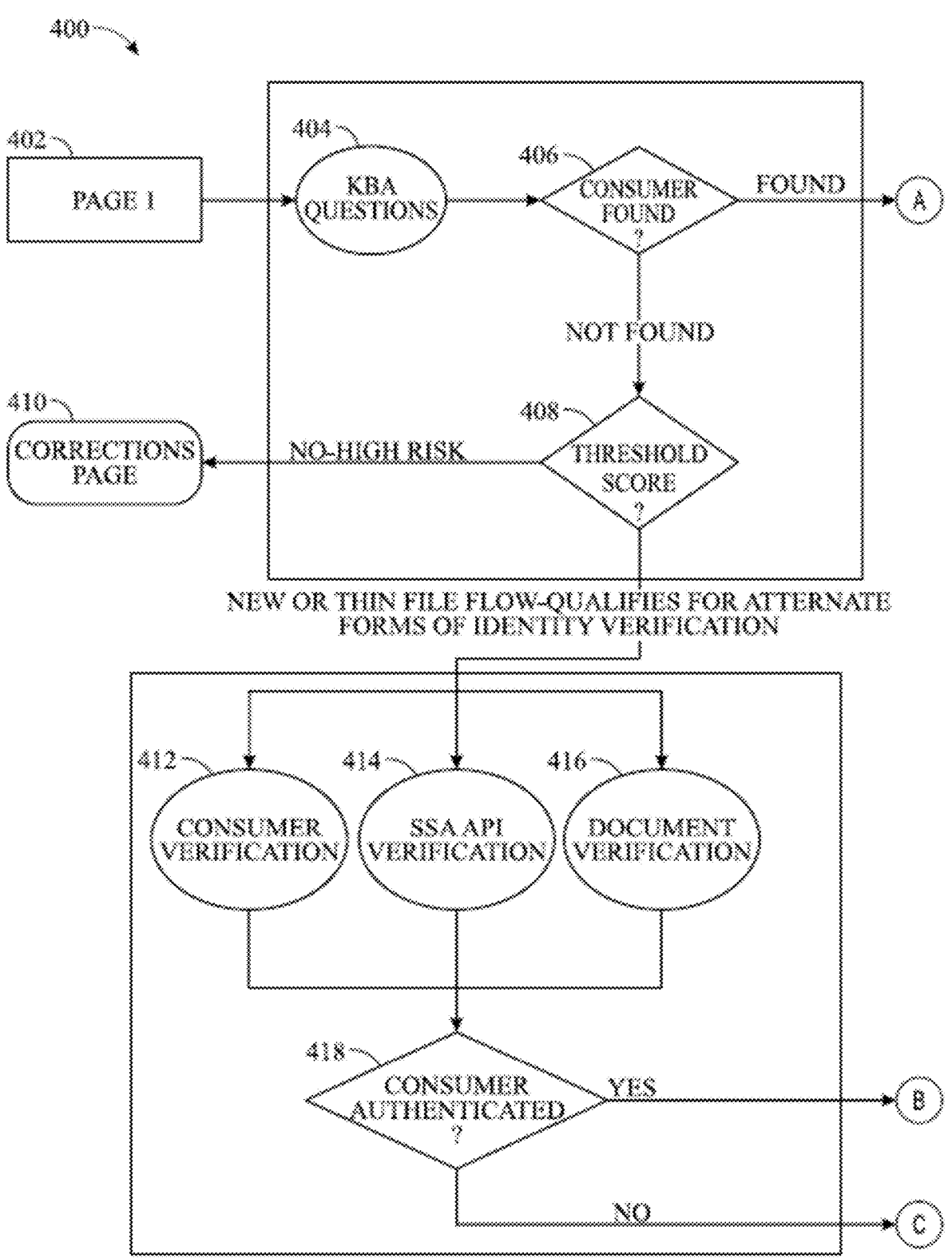
FIGS. 4A and 4B illustrate flow diagrams for new to credit PIN creation according to some embodiments.
Figure 4B:
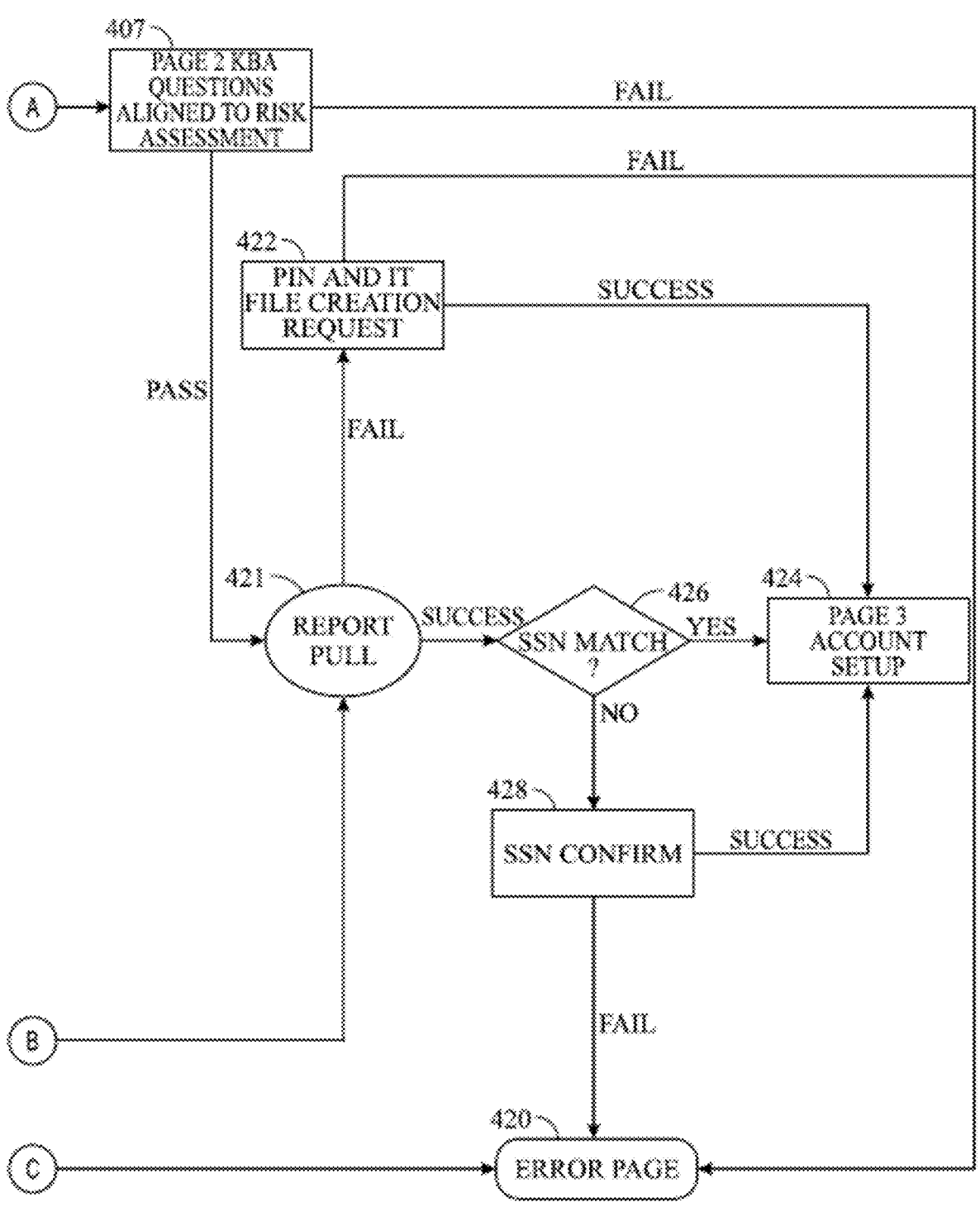

FIGS. 4A and 4B illustrate a flow diagram 400 for new to credit PIN creation according to some embodiments. At block 402, the credit system can request for information from the user, such as via a user interface on page 1. The user interface can request a consumer to provide Personal Identifiable Information (PII), such as a name, address, Social Security Number (SSN), Date of Birth (DOB), email, phone number, and/or the like, and/or the users can set up credentials for returning use. The pages and flow for data collection can differ between types of computing devices, such as between a web browser and a native application.

In some embodiments, the credit system can take this information and determine whether records exist for the user, such as by checking the credit database to see if a credit file exists. At block 404, the credit system can ask certain questions and perform authentication of the user, such as via Knowledge-based Authentication (KBA). The credit system can authenticate the user by using knowledge of private information of the user to prove that the person providing the identity information is in-fact the user.

In some embodiments, the credit system can determine whether the consumer is found, such as in block 406, by searching information related to the consumer in third-party databases, such as in public records databases. If the user is found, the credit system can proceed to block 407, where the credit system displays a user interface, such as page 2, where KBA can be performed to assess risk for the consumer. If the user fails the risk assessment, at block 420, the credit system can display an error page to the user and/or indicate that the user could not pass the risk assessment for a new credit file. If the user passes the risk assessment, at block 421, the credit system can attempt to pull a credit report of a user.

If a credit file is not found at block 406, the credit system can determine a fraud risk score by linking patterns in the PII to generate a fraud score. At block 408, the credit system can determine if the user is high or low risk by assessing the fraud score with a threshold score. If a fraud risk score is higher than a certain threshold, then at block 410, the credit system can redirect the user to a corrections page where more information from the consumer is requested to verify the user's identity or notify the user that the user is not eligible for a credit file.

At block 412, 414, and 416, the credit system can begin verifying the user. At block 412, the credit system can verify the user based on information provided by the consumer, such as by verifying that the PII of the user matches the information stored in public records. At block 414, the credit system can verify the user based on information from third party databases, such as by verifying the social security number of the user via government databases (e.g., Social Security Administration API verification).

At block 416, the credit system can verify documents or images provided by the user, such as by verifying that the individual on a selfie image or video stream is the individual on a government issued ID.

If at block 418, one or more of the processes are invalid, then the consumer can be considered not verified, and at block 420, the credit system can display an error page to the user and/or indicate that the user could not be authenticated.

If at least one or all three processes are valid, the user can be considered authenticated at block 418. If the user is authenticated, at block 421, the credit system can attempt to pull a credit report of a user and/or the credit system can request a credit score for the user via a credit bureau.

If the credit report request fails, at block 422, the credit system can determine that the user does not have a credit file. The credit system can generate (or initiate the generation of) a credit file for the user by creating a PIN and/or create the PIN to generate the credit file. If the creation of the PIN and/or the credit file fails, at block 420, the credit system can display an error page to the user and/or indicate that the credit file or PIN could not be generated.

Upon the creation of the PIN, at block 424, the credit system can display a user interface, such as page 3, that includes steps to generate or set up an account. The credit system can display additional user interfaces, such as information on how to add tradelines to the credit file or other steps for the user to input information to formally set up a credit file.

At block 421, if a credit report exists, the credit system can determine whether there is a match in the social security number of the user, such as by checking all 9 numbers or a subset of the numbers of the social security number, in block 426. If there is a social security match, then the credit system can display an account setup user interface, such as in block 424.

If not, then at block 428, the credit system can request further information, such as requesting the user to confirm their social security information. If then the social security number is confirmed, the credit system can display the account setup user interface, such as in block 424. If not, the credit system can display an error message and/or an indication that the social security could not be verified at block 420. It will be appreciated that depending on the country or jurisdiction in which the credit system operates, a different government identification number or personal identifier may be utilized rather than a social security number, which may be specific to the United States.

Example Illustrative Flow for Header Creation

Figure 4C:
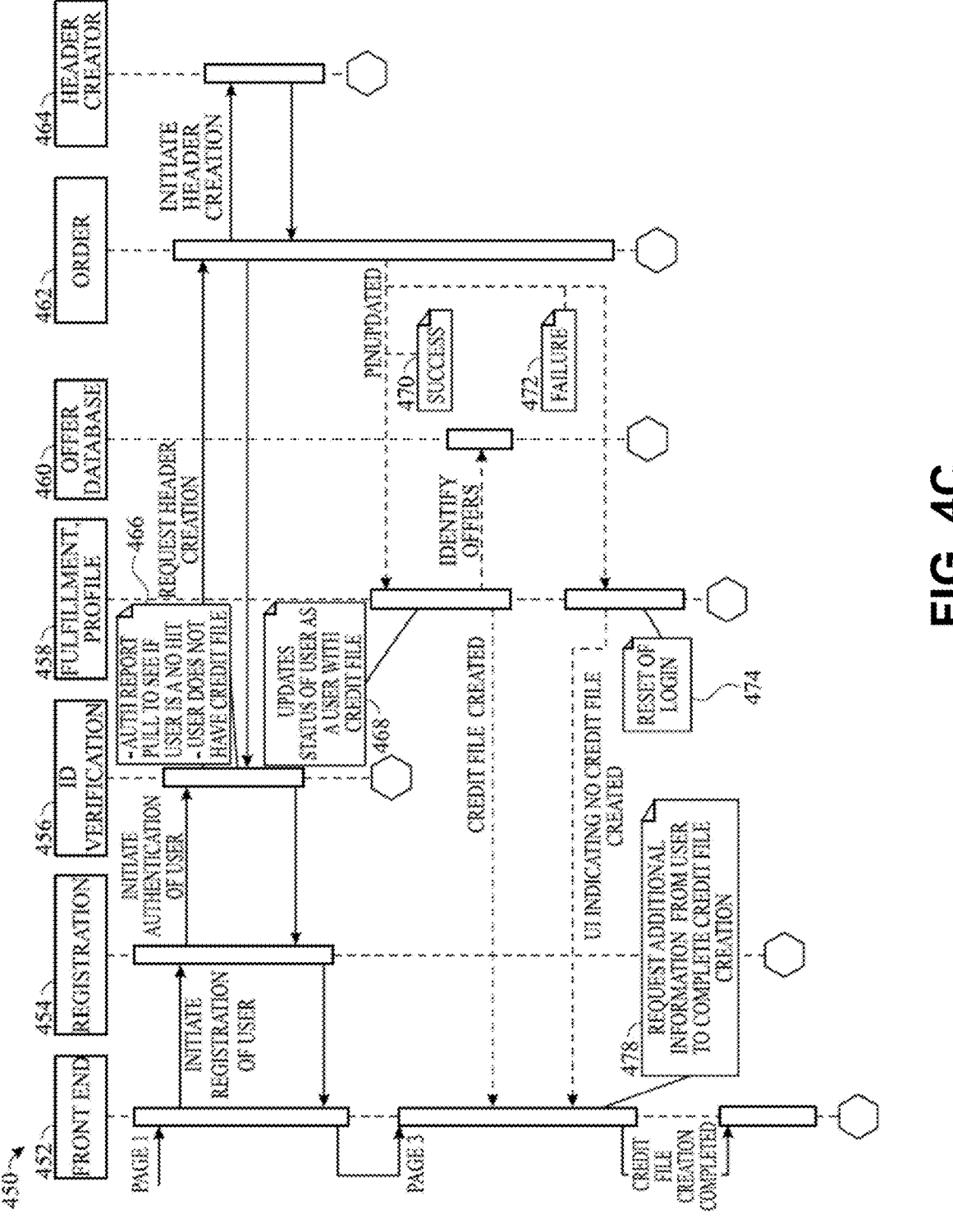
FIG. 4C illustrates a flow diagram for new to credit header creation according to some embodiments.

FIG. 4C illustrates a flow diagram 450 for new to credit header creation according to some embodiments. The credit system can display a user interface to a user computing system via the front end module 452. The credit system can receive user PII, a document to be verified, such as an image of a driver's license, a selfie image, or a selection to create a new credit file.

In some embodiments, the front end module 452 can initiate registration of the user by sending a message to a registration module 454. The registration module 454 can then begin registration of the user, such as by storing certain information of the user and/or determining what information is available of the user, such as information stored internally, information received by the user, and/or information located in third party databases.

In some embodiments, the registration module 454 can initiate authentication of the user by transmitting a signal to an ID verification module 456. The ID verification module 456 can attempt to retrieve an authentication report and/or perform authentication of the user at block 466. The ID verification module 456 can also determine whether the user has a credit file and/or request a credit file of the user in order to make that determination (e.g., if a request was denied for not being in the credit bureau database). The credit system can request verification of a document, such as a government issued ID, selfie, or user information to verify and/or authenticate the user.

In some embodiments, if the user does not have a credit file, the ID verification module 456 can transmit a request to create a header file for the user. The order module 462 can receive the request to create a header file and initiate header creation with a header creator module 464. The header creator module 464 can send a completion message back to the order module 462. The order module 462 can then assess whether the header was created and/or whether a PIN that was generated with the header is available for the user. The order module 462 can send a message to the ID verification module 456 with an indication of whether the header and/or the PIN was requested or created, such as in the message 470 if the credit file was created, or message 472 if the credit file was not created.

In some embodiments, the ID verification module 456 can send a message to the front end module 452, such as via various modules (e.g., the registration module 454), providing an indication on whether the credit file and/or PIN was created. The front end module 452 can display a user interface, such as page 3, indicating that a credit file has been opened for the user.

In some embodiments, if the PIN and/or the credit file was created, the order module 464 can receive this completion notice from the header creator module 464, the order module 462 can indicate that this has been completed to a fulfillment and profile module 458, and the fulfillment and profile module 458 can send a request to an offer database module 460 in order to identify whether offers are now available for the user. For example, the user may not have been qualified to receive certain credit card offers. But with the generation of the credit file via the header and/or PIN creation, the offer database module 460 may determine that the user is now be eligible. The fulfillment and profile module 458 can set a status of the user as a user with a credit file in process 468.

In some embodiments, the fulfillment and profile module 458 can send a message to the front end module 452 that the header and/or PIN was created. The fulfillment and profile module 458 can also send a message to the front end module of any new offers that are now available to the user. The front end module 452 can display new offers that the user is available, now that the credit file has been opened. The user can complete their user profile, such as setting up a password recovery option.

In some embodiments, the credit system can initiate other options for the user upon successful identity verification and credit file generation, such as by initiating a user experience. The credit system can then send the PIN to the individual, use the PIN for features such as credit monitoring, and/or send the PIN to third-parties (e.g., for third-parties to use when retrieving a credit file for the user). When the PIN is created, offers can be activated, such as syncing bank accounts to see if a tradeline can be added to the credit file, recommending credit cards based on the new credit file, providing additional information on credit, and/or the like that would not have been available to the user (e.g., the user may not have been eligible for these features) prior to the generation of the credit file.

In some embodiments, if the PIN and/or the credit file was not created, the fulfillment and profile module 458 can send a message to the front end module 452 providing an indication that the credit file and/or PIN was not created. The fulfillment and profile module 458 can reset the login of the user at process 474, requiring the user to login again and/or send an email to reset their password. The front end module

452 can display a user interface indicating that no credit file has been created and request the user to submit additional information to complete credit file creation in process 478. Upon successful completion of receiving additional information to complete the credit file creation, the front end module 452 can display a user interface indicating that the credit file has been successfully completed.

Example Illustrative Flow for Adding New Tradelines and Inferring Open Dates

Figure 5:
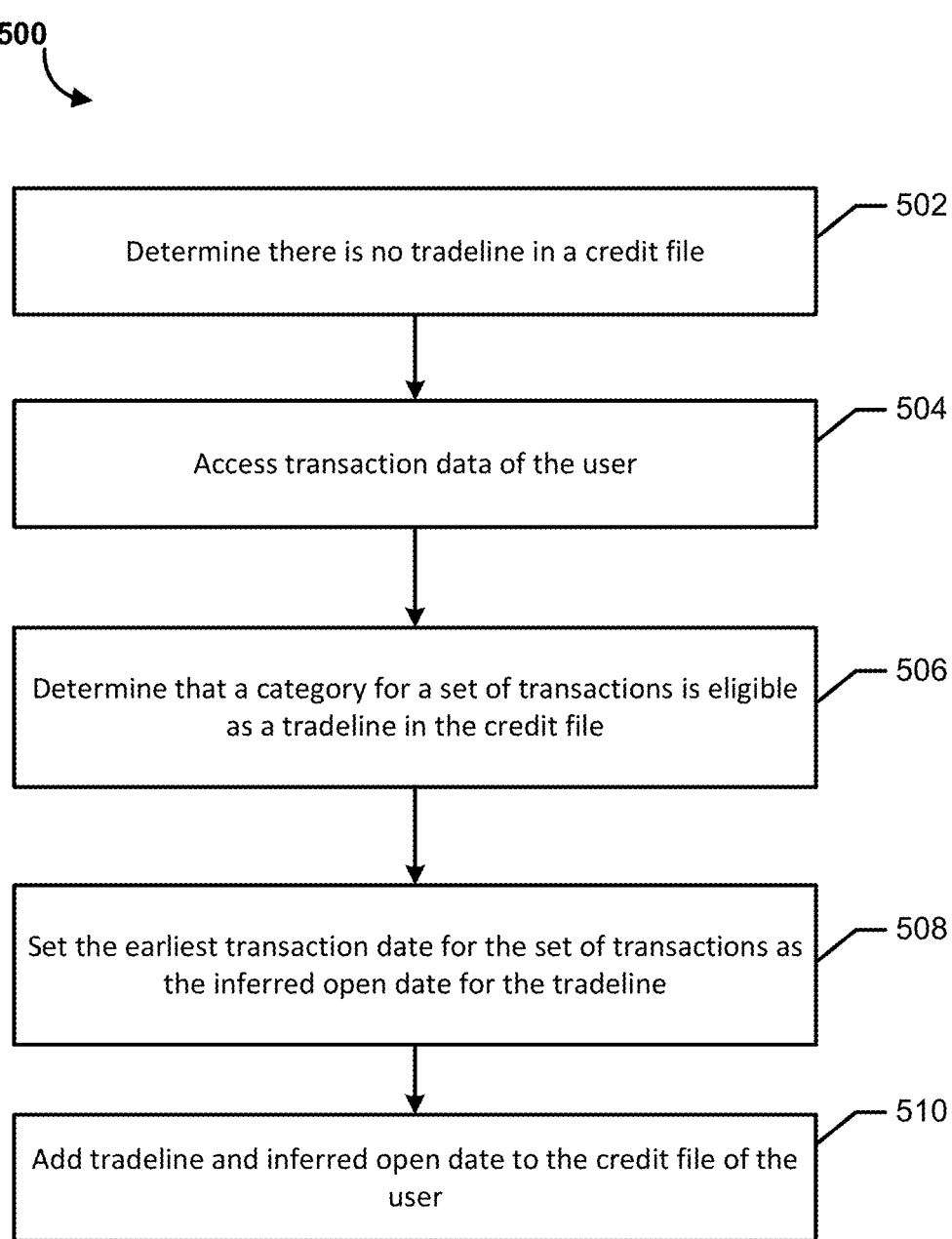
FIG. 5 provides a flow diagram for identifying a new tradeline and generating an inferred open date for transactions according to some embodiments.

FIG. 5 provides a flow diagram 500 for identifying a new tradeline and generating an inferred open date for transactions according to some embodiments. At block 502, the credit system can determine there is no tradeline in a credit file. For example, the credit system can generate a new credit file via the process described in FIG. 4C. The credit system can also communicate with a new or pre-existing user and determine that the user does not have any tradelines on their credit file. The user can be an "only credit file" status, such as block 104 in FIG. 1.

In some embodiments, at block 504, the credit system can access transaction data of the user via an API channel (as further described below). The transaction data may be standardized. The transaction data stored in a financial institution database can include transactions between the user and a payee (e.g., a streaming service, utility company, rental company, etc.). The credit system may standardize payee data for the particular payee, such as a standardized identifier for a particular payee that may be associated with various adaptations of payee information for that particular payee. For example, a standardized identifier for a payee (for example, "Southern California Power Co.") may be associated with multiple variations of payee information that could be used by different financial institutions in identifying transactions with that payee (for example, "SCP", "So Calif Power", and so forth). Thus, through standardizing payee information of transaction data items, matching of transaction, even from multiple financial institution accounts of the user, may be associated as payments to a particular account.

Because the transaction data is coming from an external database, the credit system can standardize information in the transaction data to conform with the format of the credit system database and/or a credit bureau database. As such, when a new tradeline is added, such as by sending a request to a credit bureau's system, the format can be aligned with the credit bureau's database for accurate addition of the tradeline. Moreover, the credit system can verify whether the newly identified tradeline is already in the credit file after standardization of the payee information. For example, the credit file may have "SCP" as a tradeline but the transaction data may have "Southern California Power." Performing standardization of the transaction data to "SCP" can help the credit system to identify that the tradeline already exists in the credit file.

At block 506, the credit system can determine a category for a set of transactions or determine for all transactions, corresponding categories. The credit system can determine that a set of transactions correspond to a category eligible to add as a tradeline in a credit report.

In some embodiments, the credit system may access the transaction data, and identity groupings (also referred to as "subsets") of data items each associated with a common entity. For example, multiple data items of a user stored in a third-party database may be included in a grouping. The credit system can then apply rules to the groupings of data items to identify groupings that match one or more patterns indicative of groupings of data items that could be a potential tradeline.

In some embodiments, the credit system trains and/or applies one or more models (such as machine learning models or neural networks) configured to categorize transactions. Such models can be trained to categorize transactions across multiple months or years of transactional data of the user. For example, in some embodiments, the credit system may identify transaction data items of a user that occur with a certain periodicity, within a certain monetary range of one another, with certain keywords or characters in the payee's name (or other information, such as a memo or "for:" information field provided by the user), and/or any other attributes that may be associated with transaction data for the user. Data item groupings may then be created to indicate sets of data items that are believed to be associated with a particular account of the user. In some embodiments, each data item groupings are associated with a different payee.

In some embodiments, the credit system may associate an account type with each identified account (for example, each grouping of data items for particular payees) in the user's transactional data. For example, a first identified account (for example, associated with 24 separate monthly payments identified in Bob's checking account data) may be indicated as a rental type account. Account types may include a general account type (for example, telecom, utility) and/or a specific account type, or may have additional levels of categorization. For example, telecom account types may be further categorized as mobile phone, phone, internet, cable, or satellite accounts, while utilities account types may be further categorized as gas, electric, water, power, solar, or trash account.

In some embodiments, the system may identify monthly recurring transactions made to the same payee as being categorized together and associated with a single account (for example, an electric, water, or wireless account). Additionally, the system may identify a second set of transaction data items made to another payee and, based on account identification rules, determines that the second set of transaction data items are associated with a rental account of the user.

In some embodiments, the credit system already knows that the credit file does not include any tradelines. In other embodiments, the credit system can check the credit file to determine whether a tradeline is already in the credit file that corresponds to the same category as the set of transactions and/or to the same merchant for the set of transactions.

Existing and common credit scoring algorithms typically have minimum criteria that must be met before a given individual's credit file is eligible for scoring. One example credit scoring algorithm may not generate a credit score unless a person's credit file includes at least one line of credit with an open date (e.g., the date indicating when the line of credit was opened with a financial institution) going back at least seven months from the current date.

However, tradelines added to a credit file by analyzing consumer permissioned data (CPD) according to prior methods do not include an open date (which would typically be provided by a reporting creditor in traditional credit reporting, but are not clearly listed in CPD transactions). As a solution to these issues, aspects of the present disclosure include setting an open date for certain CPD tradelines, such as if no other line of credit is available for the given user.

In some embodiments, at block 508, the credit system can identify the earliest transaction date for the set of transactions and set the earliest transaction date as the inferred open date. It will be appreciated that this is an inferred date and may not precisely be the actual open date for the account (e.g., because the retrieved transaction data may only go back a certain amount of time from the present date, or the consumer may have made earlier payments from a financial account that is not included in the available transaction data). At block 510, the credit system can then add or request the addition of a tradeline that corresponds to the category for the set of transactions. The credit system can request to add the inferred open date with the tradeline when the tradeline is added to the credit file of the user.

Figure 6:
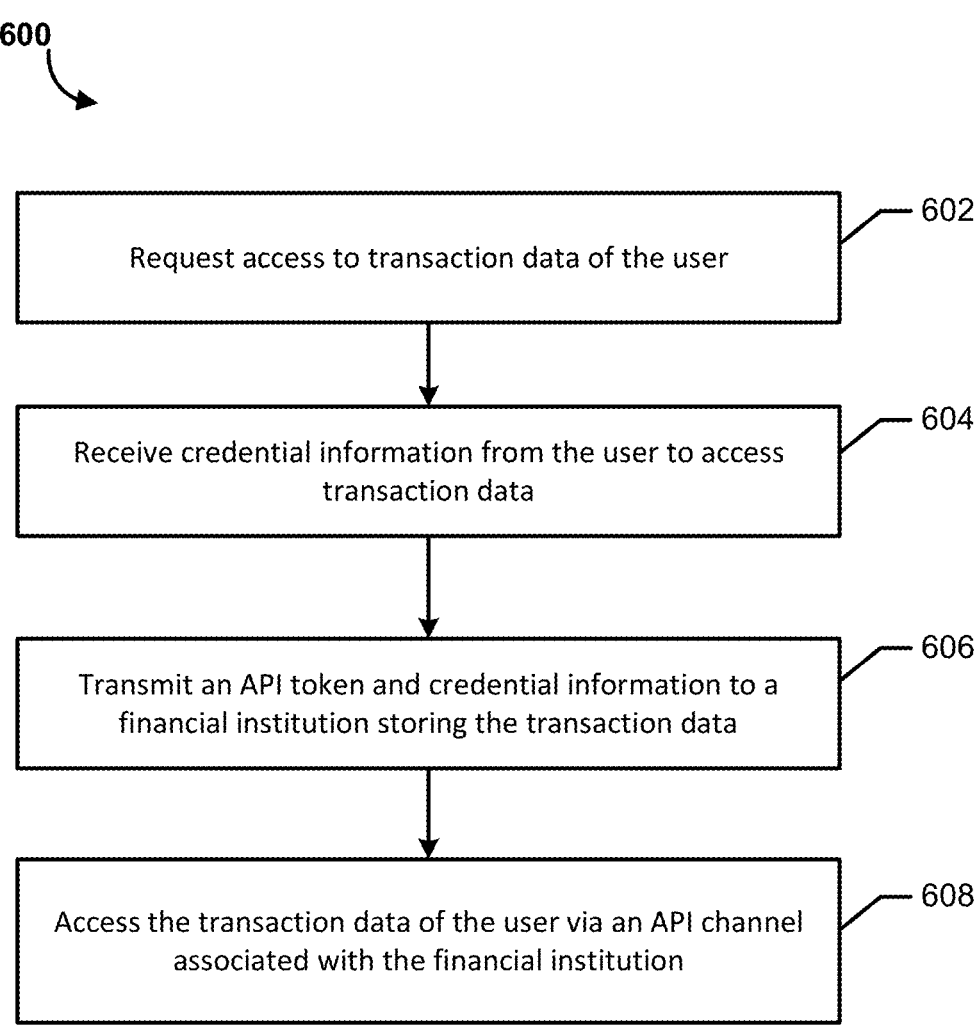
FIG. 6 illustrates a flow diagram for accessing transaction data of a user via an Application Programming Interface (API) channel according to some embodiments.

FIG. 6 illustrates a flow diagram 600 for accessing transaction data of a user via an Application Programming Interface (API) channel according to some embodiments. At block 602, the credit system can request access to transaction data of the user. The credit system can request that the user select one or more financial institutions where the user has an account (e.g., a checking or debit account).

In some embodiments, the credit system can request credential information from the user for the user's account with the financial institution, such as a login and password. At block 604, the credit system can receive credential information from the user to access the transaction data.

In some embodiments, at block 606, the credit system can transmit an API token and/or credential information to a financial institution storing the transaction data. Application Programming Interface (API) can include a defined communication channel, protocol, settings, and so forth that allows two devices to exchange information between one another in a more direct manner than might otherwise be possible. In some embodiments, an API registration module may be configured to register individual devices (for example, computing devices, Internet of things devices, sensors, and so forth) for communication with a particular computing device (for example, a central server that receives, processes, stores, provides, information to the individual devices) by issuing a security token (for example, such as an API token or an API key) to the individual devices that authorizes such direct communications. Thus, a computing system may establish secure and direct communication channels with multiple devices via APIs.

In some embodiments, financial institutions that are storing the transaction data can be in communication with the credit system via respective APIs. Thus, data permissioning may be performed via communications with financial institutions that is initiated and authenticated using API tokens, keys, and/or other similar secure communication credentials. For example, a financial institution may be a first financial institution that allows direct access to transactions of its customers via a secure communication channel that is initiated through use of an API token that has been issued to the credit system by the financial institution. In this way, the financial institution maintains security of consumer information by limiting access to the transaction information to only those with a pre-issued API token.

Similarly, communications with other financial institutions may be performed with unique API keys or tokens issues from those financial institutions. In some embodiments, the financial institutions may include, or may use third-party, API token service, which interfaces with external entities, receives authorizations from the external entities indicating that the credit system has sufficient rights to access transaction data items of consumers held by the financial institution, and issues a API token to the credit system usable to initiate a "backend" API communication channel with the financial institution to efficiently and quickly access data to which the credit system is authorized. Thus, in some embodiments the credit system provides the API token issued to the credit system in conjunction with a request for transaction data items of a particular consumer.

In some embodiments, at block 608, the credit system can access the transaction data of the user via an API channel associated with the financial institution storing the transaction data, as further described above.

Figure 7:
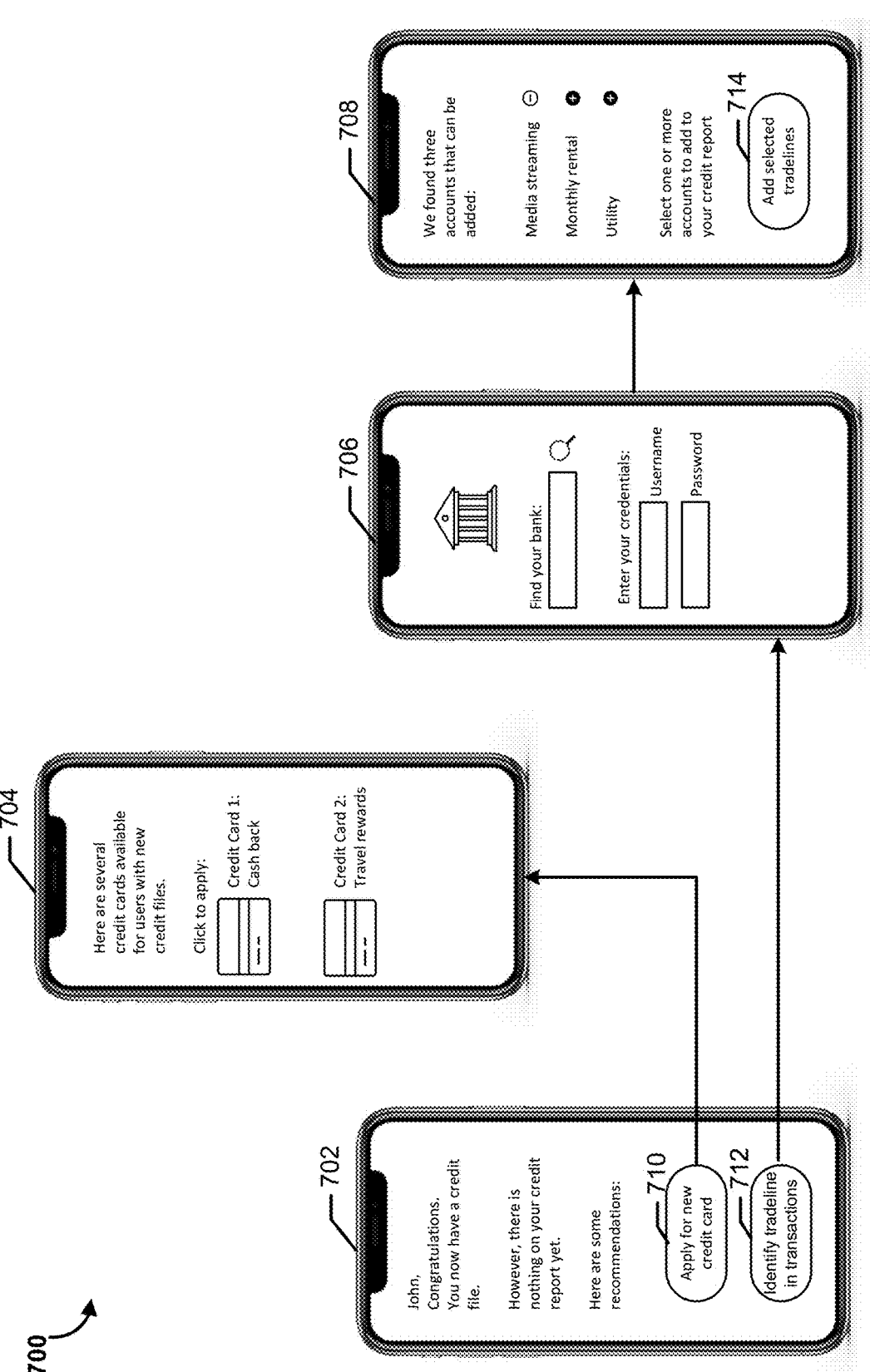
FIG. 7 illustrates user interfaces for providing user recommendations according to some embodiments.

Example Illustrative User Interfaces for Recommended Data Items Not Available Prior to Generation of Credit File FIG. 7 illustrates user interfaces 700 for providing user recommendations according to some embodiments. Upon completion of the creation of a credit file and/or PIN, the credit system can display a congratulatory user interface 702 for such creation of the credit file. The user interface 702 can display an indication that there is not enough credit history to generate a credit score or other score. The user interface 702 can provide useful information for the user, such as information related to credit data, links to best start building credit, blog articles of relevant content, and/or the like.

In some embodiments, the user interface 702 can provide recommended data items for the user, such as a first selectable user interface element 710 to apply for a new credit card and/or a second selectable user interface element 712 to identify potential tradelines in user transactions that may be eligible to add as new tradelines into the credit file. In some embodiments, the recommended data items are data items that were not available for the user prior to the generation of the credit file.

In some embodiments, the user interface 702 can display a flow of questions for the user to answer in input fields. In response to the user's answers, the credit system can determine whether the user has qualifying accounts to add to the credit file, whether the user is qualified for certain financial products, whether the user has or can become an authorized user, and/or the like. The user interface 702 can provide education on what users with new credit files should know and recommend habits on building a healthy credit file. The user interface 702 can display information that provide more focused and customized information to the individual.

In some embodiments, the user interface 702 can display information educating a user on why they do not have a credit score. The generation of a credit file may not be sufficient to generate a credit score. The credit score algorithm may require more of a credit file with a longer credit file history. The credit system can display user interfaces that explain to an individual why the user doesn't yet have a credit score, and other related information such as when the user can get a credit score or why the score is important.

In some embodiments, if the user selects the first user interface element 710, the credit system can display user interface 704 that includes several credit cards available for the user. The available credit cards can be credit cards that users with new credit files are eligible for, such as Credit Card 1 or Credit Card 2. Based on the user's new to credit status or credit file, the credit system can provide explanatory text on why certain recommended financial features, such as credit cards, are aligned with the user's credit status.

In some embodiments, the user interface 704 can display a marketplace hub for individuals with new credit files that help users build credit. The credit system can display offers such as credit card offers that can help build credit faster. The user interface 702 can display financial products that the user can get approved even with a limited credit file.

In some embodiments, if the user selects the second user interface element 712, the credit system can display user interface 706 that requests the user to identify the financial institution where the user has an account. The user interface 706 can display a request for a user's credentials, such as login or password, to access the transaction data.

In some embodiments, the credit system can access the transaction data, identify one or more potential tradelines to add to the credit file, and display the identified tradelines in user interface 708. For example, potential tradelines can be in the category of media streaming accounts, monthly rental payment accounts, utility accounts, and/or the like.

In some embodiments, the user interface 708 can enable the user to select one or more of the potential tradelines. The user interface 708 can include a user selectable interface element 714 that enables the credit system to add the selected tradelines to the credit file.

Example Illustrative Flow for Inferring Open Dates and Nulling Open Dates

FIG. 8 provides a flow diagram 800 for inferring and nulling open dates according to some embodiments. The credit system can determine whether the user meets one or more of the following criteria: whether the user has no tradelines in the credit file, does not have a credit line, or only has collection trades on their record.

In some embodiments, if the user does not have a credit file, the credit system can initiate processes to recommend opening a credit file to the user. If the user opens a credit file or already has a credit file, the credit system can request to assess transaction data of the user to identify a potential tradeline to add to the credit file.

In some embodiments, at block 802, the credit system can access transaction data of a user, such as via an API channel to a financial institution storing such transaction data and identify a set of transactions that are in a category eligible to add as a tradeline in a credit file. In some instances where a user is already scorable by a credit scoring algorithm, the credit system may be configured not to set an open date for a newly added CPD trade line because the open date may lead to less favorable scores relative to leaving the open date as a null value.

In some embodiments, at block 804, the credit system can determine whether there are other tradelines already in the credit file. If there are other tradelines already in the credit file, at block 806, the credit system can add the tradeline and set the open date as NULL.

In some embodiments, if there are no tradelines in the credit file, at block 808, the credit system can infer an open date for the tradeline by identifying the earliest date for the set of transaction data and add the tradeline to the credit file with the inferred open date.

In some embodiments, this open date for a given trade line or account may be set based on the transactions found for each trade, and the oldest transaction may drive the open date. For example, if the oldest transaction in the set of transactions is from 12 months ago, then that date 12 months ago may be set as the open date for the newly stored line of credit in a credit database (such as a credit database maintained by a credit bureau).

In some embodiments, at block 810, the credit system can monitor the credit file to check whether a new tradeline is opened. At block 812, if no new tradeline is opened, the credit system can check again after a predetermined time period, such as daily, weekly, monthly, quarterly, etc.

In some embodiments, if the credit system identifies a new tradeline in the credit file, at block 814, the credit system can change the previously stored inferred open date to NULL or otherwise delete the stored open date, which may improve credit scoring results in some embodiments.

In some embodiments, the open date can be associated with and/or part of a unique key generated for a tradeline. If the consumer later (whether in the same session or some longer time later) opens a new line of credit (such as signing up for a credit card), the system may subsequently add additional CPD-based tradelines to the credit file without setting an open date on the subsequently added account(s) (e.g., setting a null value for an "open date" field).

In some embodiments, the open date for previously added CPD-based tradelines may be kept even though a new line of credit is opened. In other embodiments, the system may overwrite the previously added CPD-based tradeline's open date to be null (such as if the consumer now has a traditional credit card account on file resulting in the consumer having a scorable credit score).

Example Illustrative Flow for Steps to Make the User Eligible for a Credit Score FIG. 9 provides a flow diagram 900 for adding tradelines until the user has a credit score according to some embodiments. At block 902, the credit system may have added a tradeline to a credit file of a user, such as via the other flow diagrams described herein. The credit system may input user credit information, such as information on a user credit file, into a scoring algorithm to determine whether the user is scorable, such as for a credit score.

In some embodiments, at block 904, the credit system can transmit an alert to the user that the user is still not eligible for a credit score. At block 906, the credit system can send a request and the user can accept to add another tradeline corresponding to a category of transaction data that is different than that of the tradeline added in block 902.

In some embodiments, at block 908, the credit system can add the other tradeline to the credit file of the user. At block 910, the credit system can input user information, such as information on a user credit file with the new second tradeline, into a scoring algorithm to determine whether the user is scorable for a credit score. The credit system can determine that the user is eligible for a credit score based on the scoring algorithm, and at block 912, the credit system can transmit an alert to the user indicating that the user is now eligible for a credit score.

FIG. 10 provides a flow diagram 1000 for alerting the user that the user is no longer scorable after deletion of the tradeline according to some embodiments. At block 1002, the credit system can apply a scoring algorithm and generate a credit score for a user. At block 1004, the credit system can receive a request to delete a tradeline from a credit file of a user and can initiate deletion of the tradeline.

In some embodiments, at block 1006, the credit system can apply a scoring algorithm and determine that the user is no longer qualified for a credit score. For example, with the deletion of the tradeline, the credit file may not have enough history for the scoring algorithm to provide a credit score for the user.

In some embodiments, at block 1008, the credit system can send an alert indicating that the user is no longer scorable and/or providing recommendations such as to reading the deleted tradeline, applying for a new credit card, or reviewing transactions to identify a new tradeline to add to the credit file.

The alerts described herein (including the alerts of FIGS. 9 and 10) can be transmitted over a wireless communication channel. The alerts can activate an installed electronic file (e.g., a mobile application) on the user's mobile device to connect the electronic file in a communication channel with the credit system and/or to initiate a notification on the user's mobile device, such as an SMS message.

Advantageously, the dynamic generation of the alert improves an Internet-centric technical problem that is necessarily rooted in computer technology. In the example of dynamically generating the alert based on identifying that the user is no longer scorable, the user can be immediately notified of this status when the status could be the most relevant to the user, such as if the user is applying for a loan. The alert can also be immediate and real-time of when the user becomes unscorable, providing the user the ability to perform actions to become scorable right away, such as by adding new tradelines via assessing transaction data. Thus, the user can be alerted of the unscorable status when the user is away from the user's home desktop. Moreover, the alert could initiate the user to look at the user's mobile phone (e.g., due to the SMS message) when the user is not currently using the user's mobile phone, providing a practical solution to the technical problem of the user being away from a home desktop or not using the mobile phone.

Example System Implementation and Architecture

Figure 11:
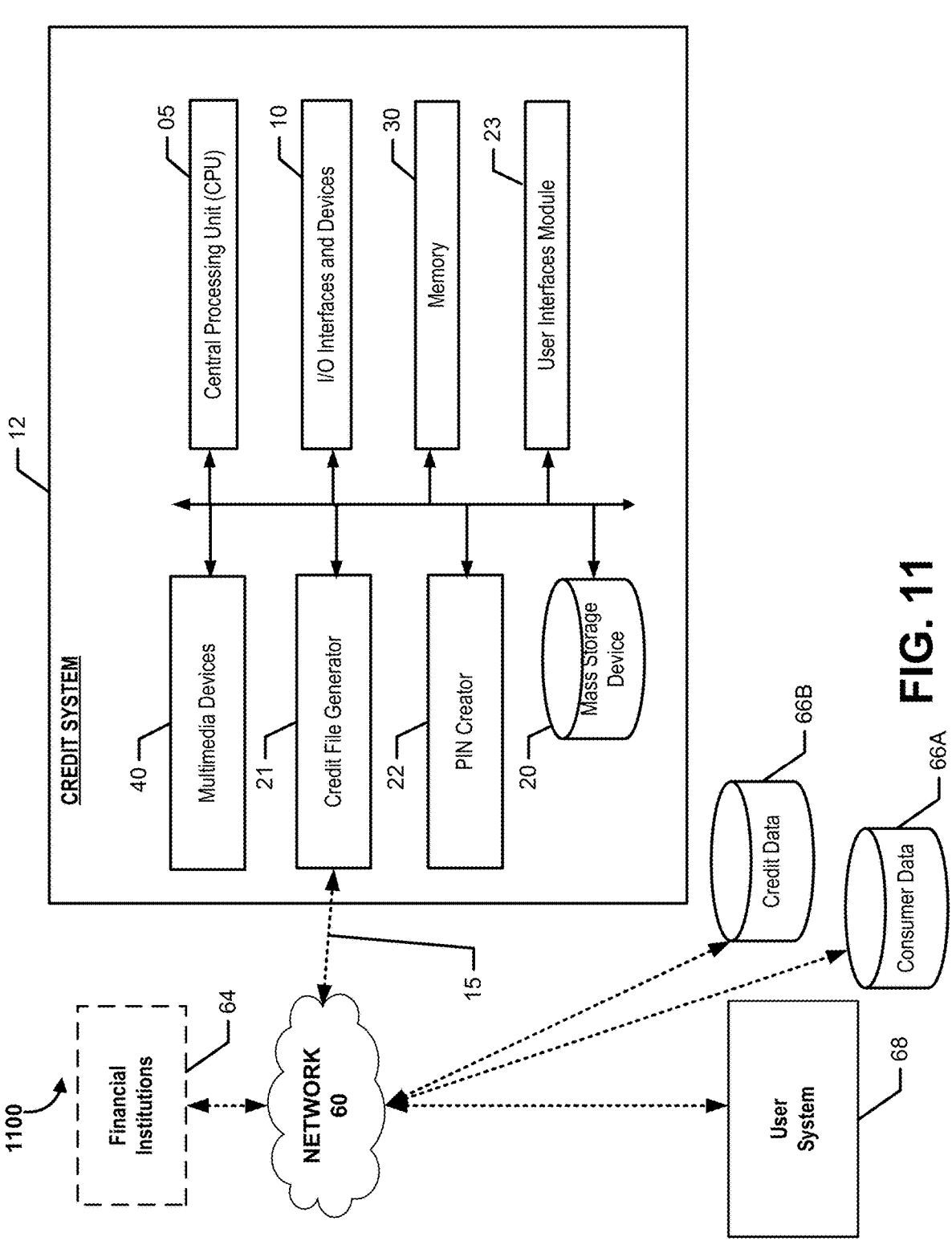
FIG. 11 is a block diagram of an example implementation of a credit system in communication with a network and various systems, according to some embodiments.

FIG. 11 is a block diagram 1100 of an example implementation of a credit system in communication with a network 60 and various systems, such as financial institution systems 64, user systems 68, and data sources 66A and 66B. The credit system 12 may be used to implement systems and methods described herein.

The credit system 12 includes, for example, a personal computer that is IBM, Macintosh, or Linux/Unix compatible or a server or workstation. In one embodiment, the credit system 12 comprises a server, a laptop computer, a smart phone, a personal digital assistant, a kiosk, or a media player, for example. In one embodiment, the exemplary credit system 12 includes one or more central processing unit ("CPU") 05, which may each include a conventional or proprietary microprocessor. The credit system 12 further includes one or more memory 30, such as random-access memory ("RAM") for temporary storage of information, one or more read only memory ("ROM") for permanent storage of information, and one or more mass storage device 20, such as a hard drive, diskette, solid state drive, or optical media storage device. Typically, the modules of the credit system 12 are connected to the computer using a standard based bus system 80. In different embodiments, the standard based bus system could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of credit system 12 may be combined into fewer components and modules or further separated into additional components and modules.

The credit system 12 is generally controlled and coordinated by operating system software, such as Windows XP, Windows Vista, Windows 7, Windows 8, Windows Server, Unix, Linux, SunOS, Solaris, iOS, Blackberry OS, or other compatible operating systems. In Macintosh systems, the operating system may be any available operating system, such as MAC OS X. In other embodiments, the credit system 12 may be controlled by a proprietary operating system.

Conventional operating systems control and schedule computer processes for execution, perform memory management, provide file system, networking, I/O services, and provide a user interface, such as a graphical user interface ("GUI"), among other things.

The exemplary credit system 12 may include one or more commonly available input/output (I/O) devices and interfaces 10, such as a keyboard, mouse, touchpad, and printer. In one embodiment, the I/O devices and interfaces 10 include one or more display devices, such as a monitor, that allows the visual presentation of data to a user. More particularly, a display device provides for the presentation of GUIs, application software data, and multimedia presentations, for example. The credit system 12 may also include one or more multimedia devices 40, such as speakers, video cards, graphics accelerators, and microphones, for example.

In the embodiment of FIG. 11, the I/O devices and interfaces 10 provide a communication interface to various external devices. In the embodiment of FIG. 11, the credit system 12 is electronically coupled to a network 60, which comprises one or more of a LAN, WAN, and/or the Internet, for example, via a wired, wireless, or combination of wired and wireless, communication link 15. The network 60 communicates with various computing devices and/or other electronic devices via wired or wireless communication links.

According to FIG. 11, in some embodiments information may be provided to the credit system 12 over the network 60 from one or more targeting criteria data sources 66A and/or digital identifiers data source 66B. The consumer data sources 66A and credit data sources 66B may include one or more internal and/or external data sources. In some embodiments, one or more of the databases or data sources may be implemented using a relational database, such as Sybase, Oracle, CodeBase and Microsoft® SQL Server as well as other types of databases such as, for example, a flat file database, an entity-relationship database, and object-oriented database, and/or a record-based database.

In the embodiment of FIG. 11, the credit system 12 includes a credit file generator 21, a PIN generator 22, and a user interface module 23 that may be stored in the mass storage device 20 as executable software codes that are executed by the CPU 05. This and other modules in the credit system 12 may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 11, the credit system 12 is configured to execute the credit file generator 21, the PIN generator 22, and/or the user interface module 23 to perform the various methods and/or processes for credit file generation and PIN generation as described herein.

Other Embodiments

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the credit system 12, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into submodules despite their physical organization or storage.

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A system comprising:
one or more mass storage devices comprising a plurality of executable software code;
a credit file generator, wherein the credit file generator is stored in the one or more mass storage devices;
a PIN generator, wherein the PIN generator is stored in the one or more mass storage devices; and
one or more hardware processors comprising a credit file generation processor and a PIN generation processor, configured to execute the executable software code to:
receive, from a user computing device via a secure communication link, Personal Identifiable Information ("PII") and digital image data comprising a government issued identification document ("ID"), wherein the PII includes a name and an address of a user associated with the user computing device;
extract, by the credit file generation processor, identification information from the digital image data;
determine, by the credit file generation processor, that the extracted identification information corresponds to the received PII;
compare, by the credit file generation processor, the PII with credit files in a credit file database to determine that there is no match;
determine, by the credit file generation processor, that the digital image data corresponds to the user by:

generating and sending, to the user computing device by a secure communication link, display instructions configured to, when executed, display a user interface that comprises a live camera view to capture first image data of the user using a camera corresponding to the user computing device;
receiving, from the user computing device by the secure communication link, a data packet comprising the first image data;
inputting, into a machine learning model, input data comprising the first image data and at least a portion of the digital image data; and
receiving, from the machine learning model, an output that indicates a likelihood that the first image data and the digital image data correspond to a same person;
generate, by the PIN generation processor, an alphanumeric personal identifier;
generate, by the credit file generation processor, a credit file for the user;
assign, by the credit file generation processor, the alphanumeric personal identifier to the credit file;
identify, by the credit file generation processor, a new tradeline from a set of transactions within transaction data that collectively relate to a tradeline category; and
generate, by the credit file generation processor, an updated credit file for the user comprising the new tradeline that corresponds to the tradeline category.

2. The system of claim 1, wherein the machine learning model is trained by:
obtaining a training dataset comprising a plurality of data pairs, wherein each data pair comprises (i) first image data corresponding to a government issued ID that includes a first photographic depiction of a face of a person, and (ii) second image data corresponding to a face of the person, wherein the second image data originates from a source other than the government issued ID, wherein each data pair corresponds to a different person; and
training, using the training dataset, the machine learning model to determine that third image data corresponding to a government issued ID that includes a second photographic depiction of a first face and fourth image data of a second face depict a same person.

3. The system of claim 1, wherein the transaction data includes transactions between a user and one or more payees, and wherein the one or more hardware processors are further configured to:
access the transaction data from one or more databases associated with one or more third-party entities storing the transaction data;
store the transaction data in at least one database stored in the one or more mass storage devices; and
standardize payee data for at least one payee, wherein standardizing the payee data for the at least one payee comprises associating a standardized identifier for the at least one payee with one or more adaptations of payee information for the at least one payee.

4. The system of claim 1, wherein the identification information comprises a name and an address of an individual associated with the government issued ID.

5. The system of claim 1, wherein the one or more hardware processors are further configured to:
transmit the alphanumeric personal identifier to a third-party entity;

receive a request for the credit file from the third-party entity, wherein the request comprises the alphanumeric personal identifier; and transmit the credit file to the third-party entity.

6. The system of claim 1, wherein the digital image data is captured by the camera of the user computing device.

7. The system of claim 1, wherein the at least the portion of the digital image data comprising the government issued ID provided as input to the machine learning model comprises a depiction of a photograph of a human face appearing on the government issued ID.

8. The system of claim 1, wherein the one or more hardware processors are further configured to recommend one or more data items to the user for which the user was not eligible prior to the generation of the credit file.

9. The system of claim 8, wherein the one or more data items comprise a feature to provide additional information related to improving the credit file.

10. The system of claim 8, wherein the one or more data items comprise a feature to monitor the credit file.

11. The system of claim 1, wherein the one or more hardware processors are further configured to provide the alphanumeric personal identifier to a third party for identity verification of the user by the third party.

12. The system of claim 1, wherein the one or more hardware processors are further configured to verify that the name and a social security number provided by the user via the user computing device matches a name and social security number in a government database.

13. A non-transitory computer storage medium storing a credit file generator and PIN generator as computer-executable code that when executed by one or more hardware processors comprising a credit file generation processor and a PIN generation processor, causes the one or more hardware processors to:

receive, from a user computing device via a secure communication link, Personal Identifiable Information ("PII") and digital image data comprising a government issued identification document ("ID"), wherein the PII includes a name and an address of a user associated with the user computing device;

extract, by the credit file generation processor, identification information from the digital image data;

determine, by the credit file generation processor, that the extracted identification information corresponds to the received PII;

compare, by the credit file generation processor, the PII with credit files in a credit file database to determine that there is no match;

determine, by the credit file generation processor, that the digital image data corresponds to the user by:

generating and sending, to the user computing device by a secure communication link, display instructions configured to, when executed, display a user interface that comprises a live camera view to capture first image data of the user using a camera corresponding to the user computing device;

receiving, from the user computing device by the secure communication link, a data packet comprising the first image data;

inputting, into a machine learning model, input data comprising the first image data and at least a portion of the digital image data; and receiving, from the machine learning model, an output that indicates a likelihood that the first image data and the digital image data correspond to a same person;

generate, by the PIN generation processor, an alphanumeric personal identifier;

generate, by the credit file generation processor, a credit file for the user;

assign, by the credit file generation processor, the alphanumeric personal identifier to the credit file;

identify, by the credit file generation processor, a new tradeline from a set of transactions within transaction data that collectively relate to a tradeline category; and generate, by the credit file generation processor, an updated credit file for the user comprising the new tradeline that corresponds to the tradeline category.

14. The non-transitory computer storage medium of claim 13, wherein the machine learning model is trained by:

obtaining a training dataset comprising a plurality of data pairs, wherein each data pair comprises (i) first image data corresponding toa government issued ID that includes a first photographic depiction of a face of a person, and (ii) second image data corresponding to a face of the person, wherein the second image data originates from a source other than the government issued ID, wherein each data pair corresponds to a different person; and training, using the training dataset, the machine learning model to determine that third image data corresponding to a government issued ID that includes a second photographic depiction of a first face and fourth image data of a second face depict a same person.

15. The non-transitory computer storage medium of claim 13, wherein the digital image data is captured by the camera of the user computing device.

16. The non-transitory computer storage medium of claim 13, wherein the at least the portion of the digital image data of the government issued ID provided as input to the machine learning model comprises a depiction of a photograph of a human face appearing on the ID.

17. The non-transitory computer storage medium of claim 13, wherein the one or more hardware processors are further configured to recommend one or more data items to the user for which the user was not eligible prior to the generation of the credit file.

18. The non-transitory computer storage medium of claim 17, wherein the one or more data items comprise a feature to provide additional information related to improving the credit file.

19. A method comprising:

receiving, from a user computing device via a secure communication link, Personal Identifiable Information ("PII") and digital image data comprising a government issued identification document ("ID"), wherein the PII includes a name and an address of a user associated with the user computing device;

extract, by a credit file generator on a credit file generation processor, identification information from the digital image data;

determining, by the credit file generation processor, that the extracted identification information corresponds to the received PII;

comparing, by the credit file generation processor, the PII with credit files in a credit file database to determine that there is no match;

determining, by the credit file generation processor, that the digital image data corresponds to the user by:

generating and sending, to the user computing device by a secure communication link, display instructions configured to, when executed, display a user interface that comprises a live camera view to capture first image data of the user using a camera corresponding to the user computing device;

receiving, from the user computing device by the secure communication link, a data packet comprising the first image data;

inputting, into a machine learning model, input data comprising the first image data and at least a portion of the digital image data; and receiving, from the machine learning model, an output that indicates a likelihood that the first image data and the digital image data correspond to a same person;

generating, by a PIN generator on a PIN generation processor, an alphanumeric personal identifier;

generating, by the credit file generation processor, a credit file for the user;

assigning, by the credit file generation processor, the alphanumeric personal identifier to the credit file;

identifying, by the credit file generation processor, a new tradeline from a set of transactions within transaction data that collectively relate to a tradeline category; and generating, by the credit file generation processor, an updated credit file for the user comprising the new tradeline that corresponds to the tradeline category.

20. The method of claim 19, wherein the machine learning model is trained by:

obtaining a training dataset comprising a plurality of data pairs, wherein each data pair comprises (i) first image data corresponding to a government issued ID that includes a first photographic depiction of a face of a person, and (ii) second image data corresponding to a face of the person, wherein the second image data originates from a source other than the government issued ID, wherein each data pair corresponds to a different person; and training, using the training dataset, the machine learning model to determine that third image data corresponding to a government issued ID that includes a second photographic depiction of a first face and fourth image data of a second face depict a same person.

* * * * *